US011863594B2

(12) United States Patent
Lee et al.

(10) Patent No.: US 11,863,594 B2
(45) Date of Patent: Jan. 2, 2024

(54) ELECTRONIC DEVICE AND METHOD FOR PROCESSING CALL REQUEST IN ELECTRONIC DEVICE

(71) Applicant: SAMSUNG ELECTRONICS CO., LTD., Suwon-si (KR)

(72) Inventors: Kyunghoon Lee, Suwon-si (KR); Namkyeom Kim, Suwon-si (KR); Seonmi Kim, Suwon-si (KR); Moongyo Bae, Suwon-si (KR); Soomin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 17/570,777

(22) Filed: Jan. 7, 2022

(65) Prior Publication Data

US 2022/0217184 A1     Jul. 7, 2022

Related U.S. Application Data

(63) Continuation of application No. PCT/KR2022/000060, filed on Jan. 4, 2022.

(30) Foreign Application Priority Data

Jan. 7, 2021   (KR) .................. 10-2021-0002229

(51) Int. Cl.
*H04L 12/16*      (2006.01)
*H04L 65/1066*   (2022.01)
*H04L 65/1016*   (2022.01)

(52) U.S. Cl.
CPC ...... *H04L 65/1066* (2013.01); *H04L 65/1016* (2013.01)

(58) Field of Classification Search
CPC ............. H04L 65/1066; H04L 65/1016; H04L 65/1073; H04L 29/06027; H04L 12/66;
(Continued)

(56) References Cited

U.S. PATENT DOCUMENTS 8,861,703 B2 * 10/2014 Labrador ................ H04M 3/56
                                                          379/202.01
10,455,637 B1    10/2019 Youtz et al.
(Continued)

FOREIGN PATENT DOCUMENTS

CA    2916217 A1 *   5/2008    ....... A61K 39/39558
EP    3 761 706       1/2021
(Continued)

OTHER PUBLICATIONS

Search Report and Written Opinion dated Apr. 11, 2022 in counterpart International Patent Application No. PCT/KR2022/000060.

*Primary Examiner* — Phuongchau Ba Nguyen
(74) *Attorney, Agent, or Firm* — Nixon & Vanderhye P.C.

(57) ABSTRACT

According to various embodiments, an electronic device may comprise: a memory, at least one antenna module comprising at least one antenna, and at least one communication processor. The at least one communication processor may be configured to: control the electronic device to perform a call by voice communication connection through a second communication network, in response to receiving a first call request, based on identifying that the call is disconnected, identify information related to a call disconnected cause, based on identifying that the identified information related to the call disconnected cause corresponds to a designated condition, start a timer for deferring connection to a first communication network, and in response to receiving a second call request before the timer expires, control the electronic device to perform a voice communication con- (Continued)

nection through the second communication network currently connected the electronic device.

18 Claims, 32 Drawing Sheets

(58) Field of Classification Search
CPC ........ H04L 29/06; H04M 7/006; H04Q 11/04; H04W 80/04; H04W 36/18; H04W 36/0011; H04W 36/14; H04W 36/08
See application file for complete search history.

(56) References Cited

U.S. PATENT DOCUMENTS

| | | | | |
|---|---|---|---|---|
| 2003/0187940 | A1* | 10/2003 | Ludwig | G06Q 10/10 709/227 |
| 2004/0162061 | A1* | 8/2004 | Abrol | H04L 69/163 455/414.1 |
| 2009/0104909 | A1* | 4/2009 | Vesely | H04W 36/08 455/436 |
| 2011/0110302 | A1* | 5/2011 | Faurie | H04W 68/02 370/328 |
| 2012/0027059 | A1* | 2/2012 | Zhao | H04W 76/18 375/222 |
| 2013/0029698 | A1 | 1/2013 | Higashide | |
| 2013/0107863 | A1* | 5/2013 | Faccin | H04W 36/14 370/331 |
| 2013/0329567 | A1 | 12/2013 | Mathias et al. | |
| 2014/0206353 | A1 | 7/2014 | Kim et al. | |
| 2015/0350984 | A1 | 12/2015 | Thota et al. | |
| 2016/0309540 | A1 | 10/2016 | Zhang et al. | |
| 2019/0166525 | A1* | 5/2019 | Chinthalapudi | H04L 9/40 |
| 2020/0015128 | A1 | 1/2020 | Stojanovski et al. | |
| 2020/0112892 | A1 | 4/2020 | Shi et al. | |
| 2020/0314702 | A1 | 10/2020 | Rahman | |
| 2020/0323008 | A1 | 10/2020 | Pal et al. | |
| 2020/0351726 | A1 | 11/2020 | Chauhan et al. | |
| 2020/0383010 | A1 | 12/2020 | Zhu et al. | |
| 2022/0022109 | A1* | 1/2022 | Shi | H04L 65/1104 |

FOREIGN PATENT DOCUMENTS

| | | | | |
|---|---|---|---|---|
| JP | 2002027558 A | * | 1/2002 | ............ H04Q 7/38 |
| JP | 2013-048407 | | 3/2013 | |
| WO | 2016/160177 | | 8/2020 | |

* cited by examiner

ELECTRONIC DEVICE AND METHOD FOR PROCESSING CALL REQUEST IN ELECTRONIC DEVICE

CROSS-REFERENCE TO RELATED APPLICATIONS

This application is a continuation of International Application No. PCT/KR2022/000060 designating the United States, filed on Jan. 4, 2022, in the Korean Intellectual Property Receiving Office and claiming priority to Korean Patent Application No. 10-2021-0002229, filed on Jan. 7, 2021, the disclosures of which are incorporated by reference herein in their entireties.

BACKGROUND

Field

The disclosure relates to an electronic device and a method for processing a call request in the electronic device.

Description of Related Art

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on an mmWave band, such as, e.g., a band ranging from 6 GHz to 60 GHz. To mitigate pathloss on the mmWave band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

As wireless communication systems advance, the wireless communication system may provide Internet protocol (IP)-based multimedia services (e.g., voice, video, and data) to the electronic device. For example, an electronic device may receive voice, video, or other media services through an IP multimedia subsystem (IMS) network.

According to various embodiments, when it is impossible to use an IMS voice call in an electronic device connected with a 5G communication network, the electronic device may use an IMS voice call (e.g., VoLTE) by performing EPS fallback to the LTE communication network. For example, the electronic device may perform a tracking area update (TAU) procedure including redirection or handover in a process of moving to an LTE communication network by the EPS fallback, and this may result in communication delays and/or call drops.

Further, if a call is connected through the LTE communication network by EPS fallback and is then terminated regardless of the user's intention, it would be highly likely that the user reattempts to call immediately after call termination. If the call is terminated regardless of the user's intention, the electronic device may return to the 5G communication network from the LTE communication network and, upon call reattempt, goes through the EPS fallback procedure again, causing a call drop again.

SUMMARY

Embodiments of the disclosure provide an electronic device and a method for processing a call request in the electronic device, which may prevent or minimize and/or reduce call drops due to EPS fallback by maintaining the state registered in the LTE communication network rather than returning to the 5G communication network for a set time when the VoLTE call is terminated by EPS fallback.

Embodiments of the disclosure provide an electronic device and a method for processing a call request in the electronic device, which may prevent or minimize and/or reduce call drops due to EPS fallback by storing information for the cell corresponding to the LTE communication network for a set time when the VoLTE call is terminated due to EPS fallback and connecting to the LTE communication network using the stored cell information upon a next call request.

According to various example embodiments, an electronic device may comprise: a memory, at least one antenna module comprising at least one antenna, and at least one communication processor configured to communicate with a first communication network, a second communication network, and an IMS network, through the at least one antenna module. The at least one communication processor may be configured to: control the electronic device to perform a call by voice communication connection through the second communication network in response to receiving a first call request, based on identifying that the call is disconnected, identify information related to a call disconnected cause, based on identifying that the identified information related to the call disconnected cause corresponds to a designated condition, start a timer for deferring connection to the first communication network, and in response to receiving a second call request before the timer expires, control the electronic device to perform a voice communication connection through the second communication network currently connected the electronic device.

According to various example embodiments, an electronic device may comprise: a memory, at least one antenna module comprising at least one antenna, and at least one communication processor configured to receive a communication service from a first communication network, a second communication network, and an IP multimedia subsystem (IMS) network, through the at least one antenna module. The at least one communication processor may be configured to: control the electronic device to perform a call by voice communication connection through the second communication network in response to reception of a first call request, based on the call being disconnected, start a first timer and store information for a cell of the second communication network as first cell information in the memory, connect to the first communication network in response to the disconnection of the call, and based on a second call request being received before the first timer expires, control the electronic device to perform connection with the second communication network based on the first cell information stored in the memory.

According to various embodiments, a method for processing a call request by an electronic device may comprise: performing a call by voice communication connection through a second communication network in response to reception of a first call request based on the call being disconnected, identifying information related to a call disconnected cause, based on the identified information related to the call disconnected cause corresponding to a designated condition, starting a timer for deferring connection to a first communication network, and based on a second call request being received before the timer expires, performing voice communication connection through the currently connected second communication network.

According to various example embodiments, a method for processing a call request by an electronic device may comprise: performing a call by a voice communication connection through a second communication network, in response to reception of a first call, based the call being disconnected, starting a first timer, storing information for a cell of the second communication network, as first cell information, in the memory, connecting to the first communication network, in response to the disconnection of the call, and based on a second call request being received before the first timer expires, performing connection with a second communication network based on the first cell information stored in the memory.

According to various example embodiments, the electronic device may delay the time of returning to the 5G communication network after a call is terminated due to EPS fallback, according to the reason of call termination or immediately camp on the cell corresponding to the existing LTE communication network upon a next call attempt after quickly returning to the 5G communication network, thereby removing or reducing call time delay and/or call drop period.

According to various example embodiments, it is possible to enhance the call quality, the user feels, by addressing a call drop at the initial time of the call which occurs in the network environment where IMS voice call needs to be supported by EPS fallback.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
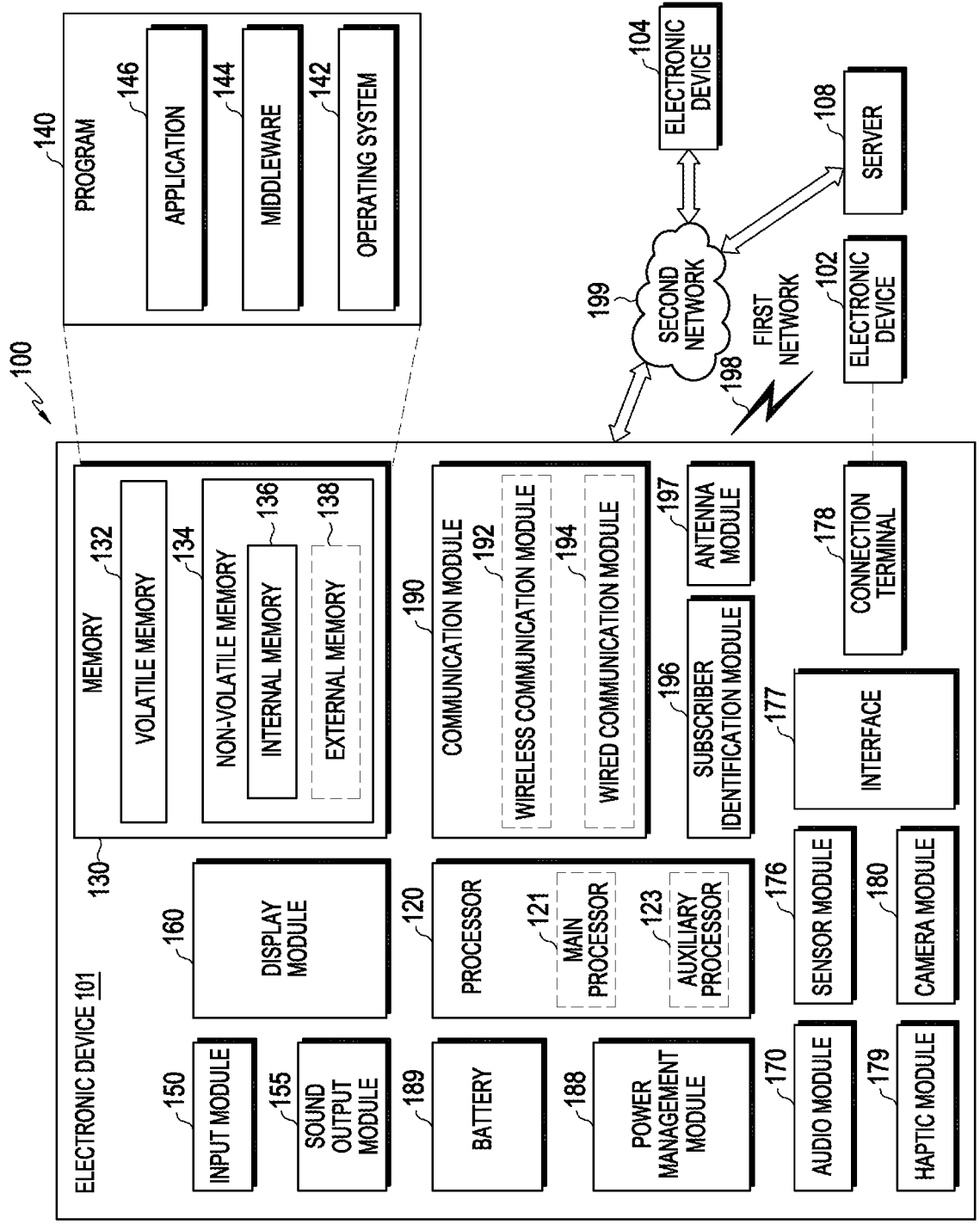
FIG. 1 is a block diagram illustrating an example electronic device in a network environment according to various embodiments.

Hereinafter, various example embodiments of the present disclosure are described in greater detail with reference to the accompanying drawings. When determined to make the subject matter of the present disclosure unclear, the detailed description of the known art or functions may be skipped. The terms as used herein are defined considering the functions in the present disclosure and may be replaced with other terms according to the intention or practice. Therefore, the terms should be defined based on the overall disclosure.

The terms as used herein are provided merely to describe various example embodiments thereof, but not to limit the present disclosure. The terms as used herein are provided merely to describe various example embodiments thereof, but not to limit the scope of embodiments of the present disclosure. Unless otherwise defined, all terms including technical and scientific terms used herein have the same meaning as commonly understood by one of ordinary skill in the art to which the embodiments of the present disclosure pertain and should not be interpreted as overly broad or narrow. General terms as used herein should be interpreted in the context of the disclosure or as defined in dictionaries.

As used herein, the singular forms "a," "an," and "the" are intended to include the plural forms as well, unless the context clearly indicates otherwise. As used herein, the term "comprise," "include," or "have" should be appreciated not to preclude the presence or addability of features, numbers, steps, operations, components, parts, or combinations thereof as set forth herein.

As used herein, the terms "first" and "second" may be used to describe various components, but the components should not be limited by the terms. The terms may be used to distinguish one component from another. For example, a first component may be denoted a second component, and vice versa without departing from the scope of the present disclosure.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

Hereinafter, various example embodiments of the disclosure will be described in greater detail with reference to the accompanying drawings. The same reference denotations may be used to refer to the same or substantially the same elements throughout the disclosure and the drawings. Duplicate description of the same elements may not be given herein. When determined to make the subject matter of the present disclosure unclear, the detailed description of the known art or functions may be skipped. The accompanying drawings are provided to aid in understanding of the spirit of the reception but the present disclosure should not be limited thereby. It should be interpreted that the spirit and scope of the disclosure may encompasses all other changes, equivalents, or replacements of those shown in the drawings.

A terminal is described herein with reference to the drawings. However, the mobile station may also be referred to as an electronic device, mobile station (MS), mobile equipment (ME), user equipment (UE), user terminal (UT), subscriber station (SS), wireless device, handheld device, access terminal (AT), or the like. Further, the terminal may be a device with communication functionality, such as a mobile phone, personal digital assistant (PDA), smartphone, wireless modem, laptop computer, or the like.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134.

According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
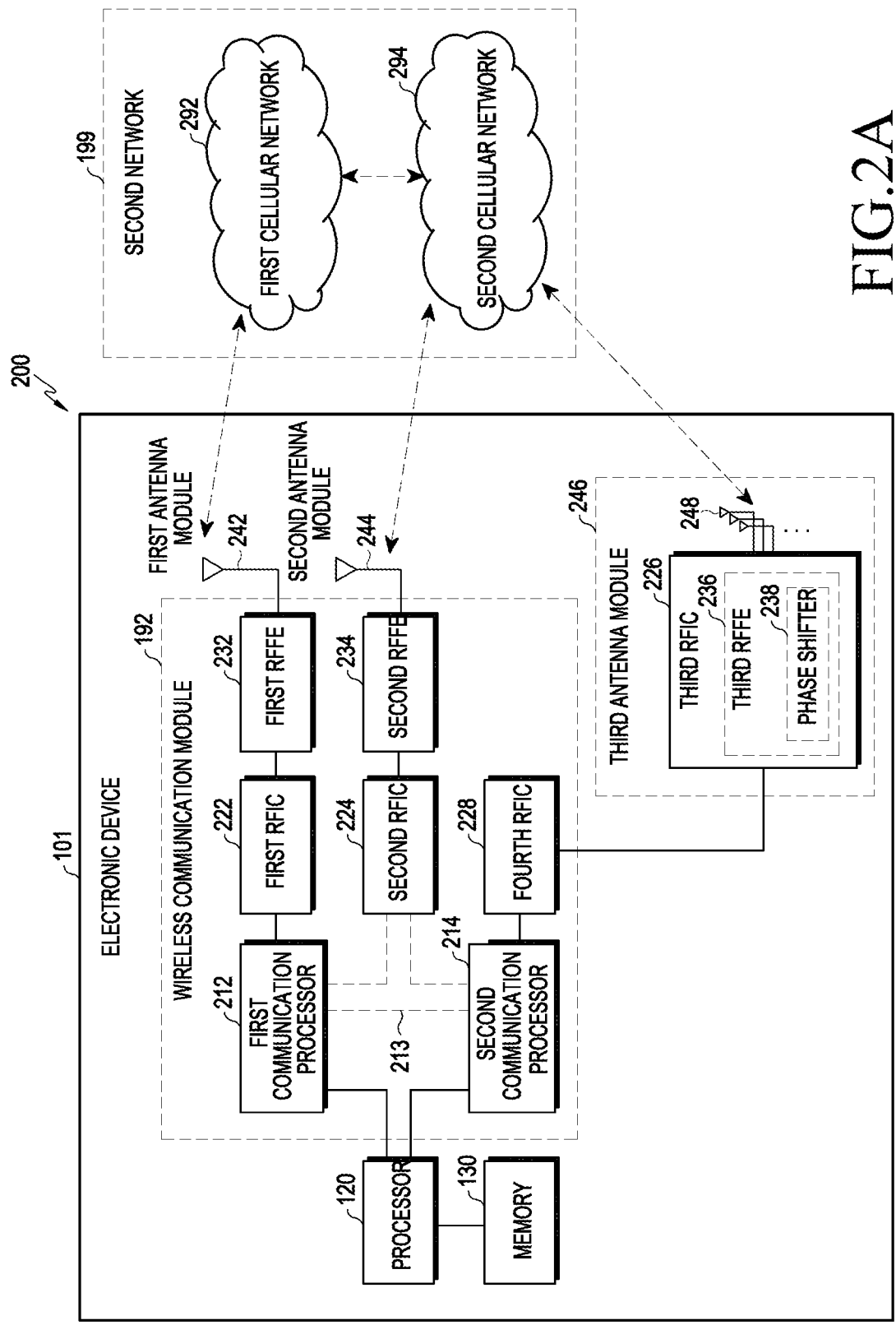
FIG. 2A is a block diagram illustrating an example configuration of an electronic device for supporting legacy network communication and 5G network communication according to various embodiments.
Figure 2B:
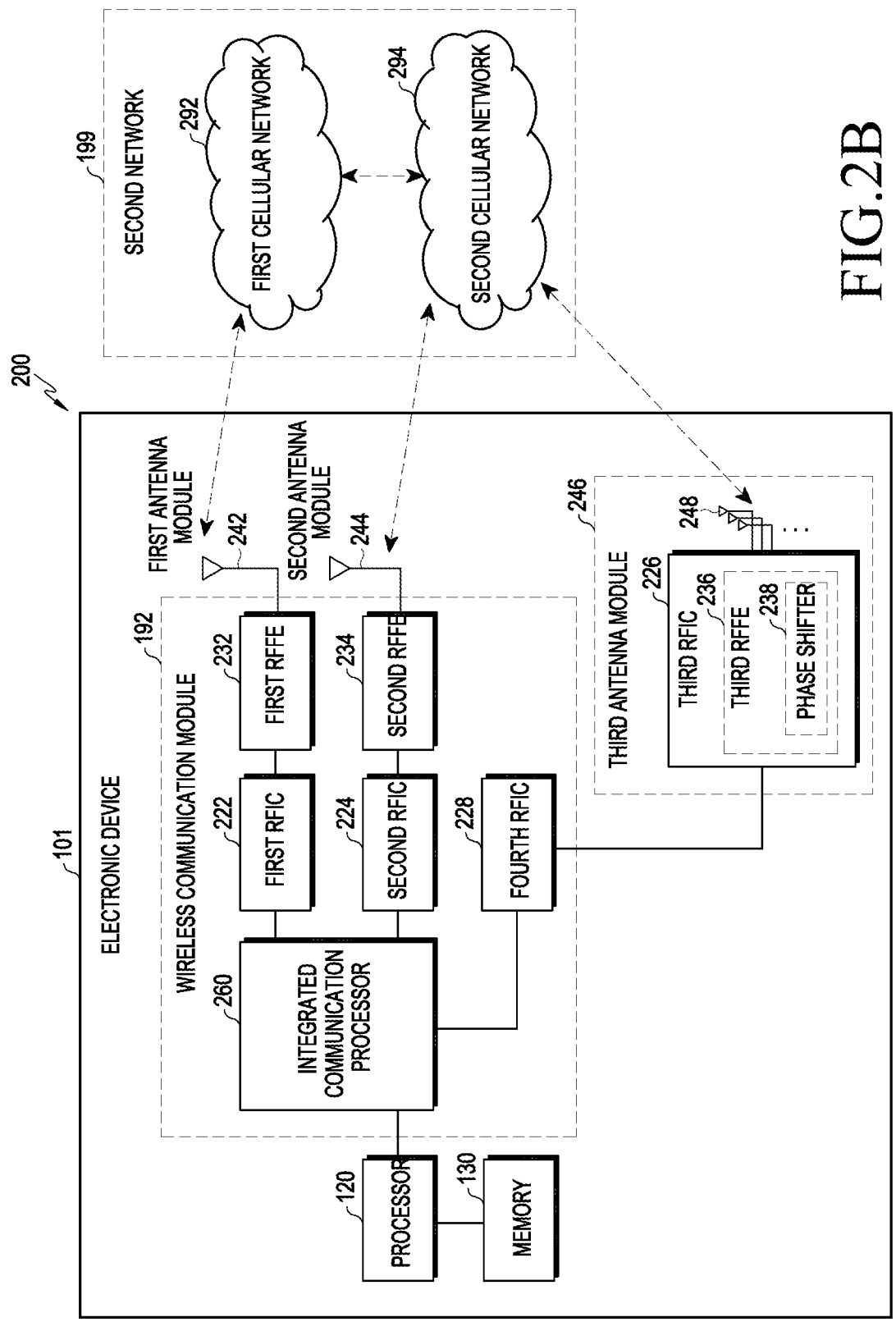
FIG. 2B is a block diagram illustrating an example configuration of an electronic device for supporting legacy network communication and 5G network communication according to various embodiments.

FIG. 2A is a block diagram 200a illustrating an example configuration of an electronic device 101 for supporting legacy network communication and 5G network communication according to various embodiments. FIG. 2B is a block diagram 200b illustrating an example configuration of an electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor (e.g., including processing circuitry) 120 and a memory 130. The network 199 may include a first network 292 and a second network 294. According to an embodiment, the electronic device 101 may further include at least one component among the components of FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first communication processor (CP) 212 may include various processing circuitry and establish a communication channel of a band that is to be used for wireless communication with the first network 292 or may support legacy network communication via the established communication channel According to an embodiment, the first network may be a legacy network that includes second generation (2G), third generation (3G), fourth generation (4G), or long-term evolution (LTE) networks. The second communication processor (CP) 214 may include various processing circuitry and establish a communication channel corresponding to a designated band (e.g., from about 6 GHz to about 60 GHz) among bands that are to be used for wireless communication with the second network 294 or may support fifth generation (5G) network communication via the established communication channel According to an embodiment, the second network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

According to an embodiment, the first communication processor 212 and the second communication processor 214 may be implemented in a single chip or a single package. According to an embodiment, the first communication processor 212 or the second communication processor 214, along with the processor 120, an assistance processor 123, or communication module 190, may be formed in a single chip or single package. For example, as shown in FIG. 2B, an integrated communication processor 260 may include various processing circuitry and support all of the functions for communication with the first cellular network and the second cellular network.

Upon transmission, the first RFIC 222 may convert a baseband signal generated by the first CP 212 into a radio frequency (RF) signal with a frequency ranging from about 700 MHz to about 3 GHz which is used by the first network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first CP 212 or the second CP 214 into a Sub6-band (e.g., about 6 GHz or less) RF signal (hereinafter, "5G Sub6 RF signal") that is used by the second network 294 (e.g., a 5G network). Upon receipt, the 5G Sub6 RF signal may be obtained from the second network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., from about 6 GHz to about 60 GHz) RF signal (hereinafter, "5G Above6 RF signal") that is to be used by the second network 294 (e.g., a 5G network). Upon receipt, the 5G Above6 RF signal may be obtained from the second network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, the second RFIC 224 may be omitted. In this case, the first RFIC 222 may be connected to the first RFFE 232 and the second RFFE 234, and the first RFIC 222 may convert a baseband signal into a signal of a band supported by the first RFFE 232 and/or the second RFFE 234 and transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second network 294 (e.g., a 5G network) may be operated independently (e.g., as standalone (SA)) from, or in connection (e.g., as non-standalone (NSA)) with the first network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3A:
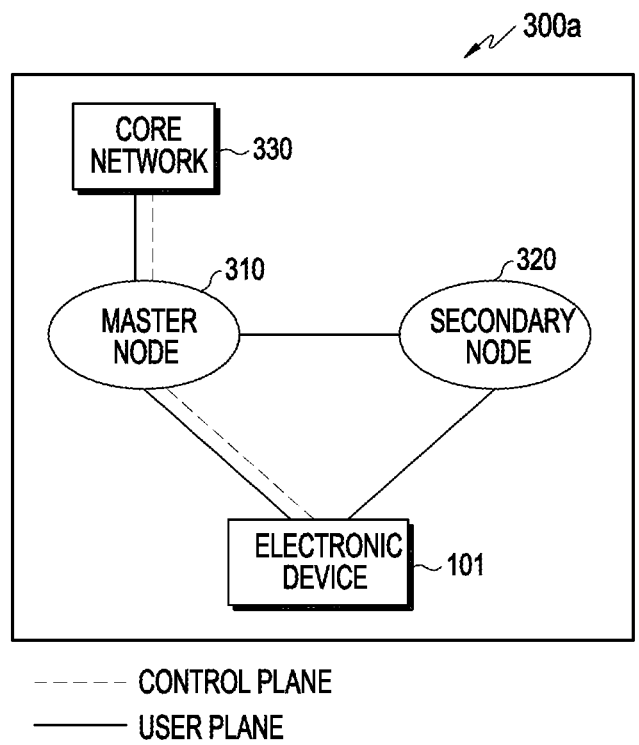
FIGS. 3A, 3B, and 3C are diagrams illustrating wireless communication systems providing legacy communication and/or 5G communication networks according to various embodiments.
Figure 3B:
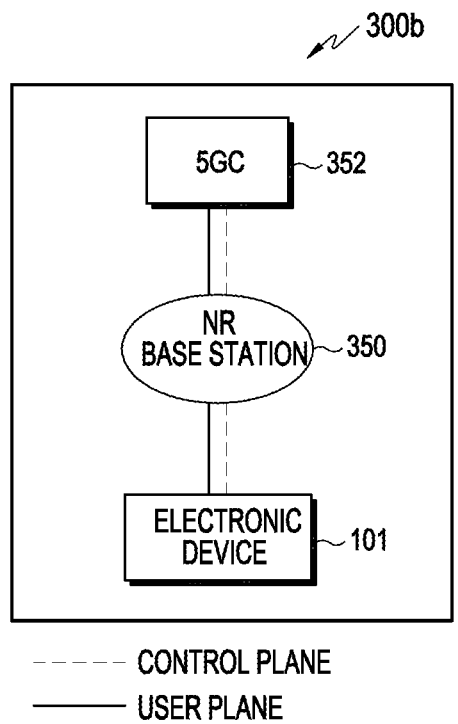
Figure 3C:
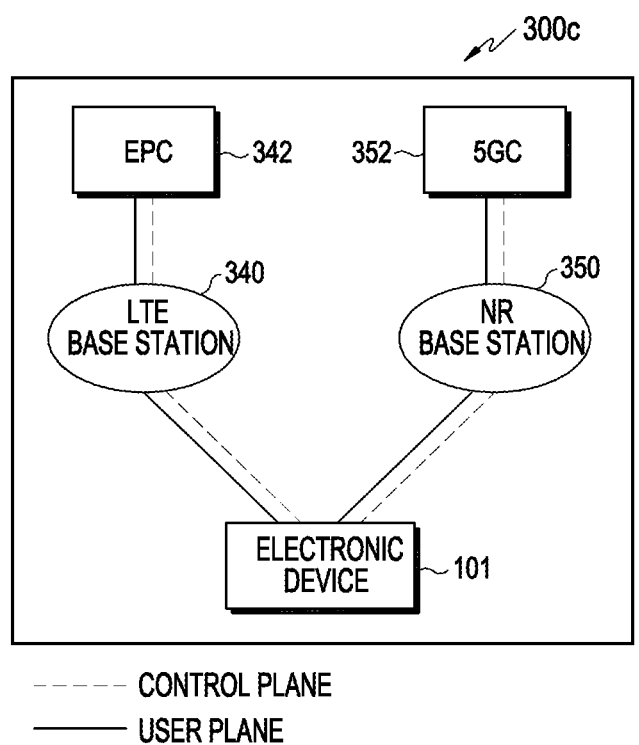

FIGS. 3A, 3B, and 3C are diagrams illustrating example wireless communication systems providing legacy communication and/or 5G communication networks according to various embodiments. Referring to FIGS. 3A, 3B, and 3C, the network environment 300a to 300c may include at least one of a legacy network and a 5G network. The legacy network may include, e.g., a 3GPP-standard 4G or LTE base station 340 (e.g., an eNodeB (eNB)) that supports radio access with the electronic device 101 and an evolved packet core (EPC) 342 that manages 4G communication. The 5G network may include, e.g., a new radio (NR) base station 350 (e.g., a gNodeB (gNB)) that supports radio access with the electronic device 101 and a 5th generation core (5GC) 352 that manages 5G communication for the electronic device 101.

According to various embodiments, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may refer, for example, to user data except for control messages transmitted or received between the electronic device 101 and the core network 330 (e.g., the EPC 342).

Referring to FIG. 3A, according to an embodiment, the electronic device 101 may transmit or receive at least one of a control message or user data to/from at least part (e.g., the NR base station 350 or 5GC 352) of the 5G network via at least part (e.g., the LTE base station 340 or EPC 342) of the legacy network.

According to various embodiments, the network environment 300a may include a network environment that provides wireless communication dual connectivity (DC) to the LTE base station 340 and the NR base station 350 and transmits or receives control messages to/from the electronic device 101 via one core network 330 of the EPC 342 or the 5GC 352.

According to various embodiments, in the DC environment, one of the LTE base station 340 or the NR base station 350 may operate as a master node (MN) 310, and the other as a secondary node (SN) 320. The MN 310 may be connected with the core network 330 to transmit or receive control messages. The MN 310 and the SN 320 may be connected with each other via a network interface to transmit or receive messages related to radio resource (e.g., communication channel) management therebetween.

According to an embodiment, the MN 310 may include the LTE base station 340, the SN 320 may include the NR base station 350, and the core network 330 may include the EPC 342. For example, control messages may be transmitted/received via the LTE base station 340 and the EPC 342, and user data may be transmitted/received via at least one of the LTE base station 340 or the NR base station 350.

According to an embodiment, the MN 310 may include the NR base station 350, and the SN 320 may include the LTE base station 340, and the core network 330 may include the 5GC 352. For example, control messages may be transmitted/received via the NR base station 350 and the 5GC 352, and user data may be transmitted/received via at least one of the LTE base station 340 or the NR base station 350.

Referring to FIG. 3B, according to an embodiment, the 5G network may include the NR base station 350 and the 5GC 352 and transmit or receive control messages and user data independently from the electronic device 101.

Referring to FIG. 3C, according to an embodiment, the legacy network and the 5G network each may provide data transmission/reception independently. For example, the electronic device 101 and the EPC 342 may transmit or receive control messages and user data via the LTE base station 340. As another example, the electronic device 101 and the 5GC 352 may transmit or receive control messages and user data via the NR base station 350.

According to various embodiments, the electronic device 101 may be registered in at least one of the EPC 342 or the 5GC 352 to transmit or receive control messages.

According to various embodiments, the EPC 342 or the 5GC 352 may interwork with each other to manage communication for the electronic device 101. For example, mobility information for the electronic device 101 may be transmitted or received via the interface (e.g., N26) between the EPC 342 and the 5GC 352.

As set forth above, dual connectivity via the LTE base station 340 and the NR base station 350 may be referred to as E-UTRA new radio dual connectivity (EN-DC).

Figure 4:
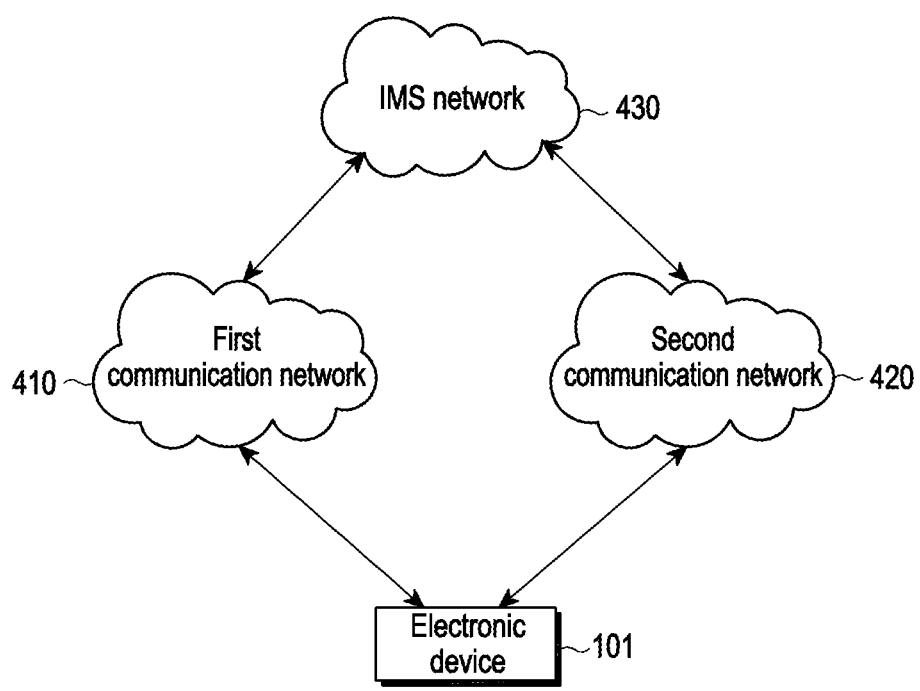
FIG. 4 is a diagram illustrating an example communication system including an IMS network according to various embodiments.

FIG. 4 is a diagram illustrating an example communication system including an IMS network according to various embodiments. Referring to FIG. 4, the electronic device 101 may individually or simultaneously access a first communication network 410 (e.g., a 5G NR communication network) or a second communication network 420 (e.g., a 4G LTE communication network). Further, the electronic device 101 may access an IMS network 430 through the first communication network 410 or an IMS network 430 through the second communication network 420.

According to various embodiments, the electronic device 101 may provide a communication service (e.g., a voice call service) with another electronic device. According to an embodiment, the communication system may include a plurality of access networks (e.g., the first communication network 410 or the second communication network 420) provided by each of a plurality of communication carriers.

According to an embodiment, the electronic device 101 may modulate or demodulate the signal for communicating with at least one communication network (e.g., the first communication network 410) through the communication module 190. For example, the electronic device 101 may be connected with at least one communication network through wireless or wired communication to communicate with other electronic devices. The electronic device 101 may control communication with at least one communication network or at least one IP service network. According to an embodiment, the electronic device 101 may include hardware including at least one processor and software for controlling the hardware. The electronic device 101 may receive a communication service through the first communication network 410 and the second communication network 420 or the IMS network 430.

According to an embodiment, the first communication network 410 and the second communication network 420 may include a communication network operated by a communication carrier.

For example, the first communication network 410 and the second communication network 420 may use at least one of a new radio (NR) network, a long term evolution (LTE) network, or a mobile world interoperability for microwave access (Wimax) network. Alternatively, the first communication network 410 and the second communication network 402 may include a code division multiple access (CDMA) lx network, a wideband code division multiple access (WCDMA) network, or a global system for mobile communications (GSM) network. For example, the first communication network 410 and the second communication network 420 may provide a communication service to the electronic device 101 or another electronic device through a wired or wireless interface. According to an embodiment, the first communication network 410 and the second communication network 420 may be heterogeneous communication networks operated by the same communication carrier but using different types of protocols. For example, the first communication network 410 may be an NR communication network operated by a specific communication carrier, and the second communication network 420 may be an LTE communication network operated by the specific communication carrier. According to an embodiment, the first communication network 410 and the second communication network 420 may be communication networks operated by different communication carriers and using different types of protocols. For example, the first communication network 410 may be an NR communication network operated by a first communication carrier, and the second communication network 420 may be an LTE communication network operated by a second communication carrier.

According to an embodiment, the IMS network 430 may include an IP-based service network operated by a communication carrier (or service provider). The IMS network 430 may provide an IP-based communication service (e.g., a multimedia service) to the electronic device 101 and other electronic devices. For example, the IMS network 430 may include an IMS network operated by a communication carrier. According to an embodiment, the IMS network 430 may include an IP service network operated by another service provider related to (e.g., entered into an agreement with) the communication carrier of the IMS network.

According to an embodiment, the electronic device 101 may attach to a plurality of communication networks operated by different communication carriers or may register the electronic device 101 in the plurality of communication networks. The electronic device 101 may obtain a plurality of pieces of subscriber information each corresponding to a plurality of communication networks. For example, the electronic device 101 may obtain a plurality of pieces of subscriber identification module (SIM) information through a plurality of SIM card slots. For example, the electronic device 101 may include a first SIM card corresponding to the first communication carrier and a second SIM card corresponding to the second communication carrier. The communication module 190 of the electronic device 101 may access the first communication network 410 of the first communication carrier based on information of the first SIM card (or first subscriber information). The communication module 190 may access the second communication network 420 of the second communication carrier based on information of the second SIM card (or second subscriber information).

According to an embodiment, if the electronic device 101 supports a plurality of wireless connections, the electronic device 101 may concurrently access the first communication network 410 and the second communication network 420. If the electronic device 101 cannot concurrently support a plurality of wireless connections, the electronic device 101 may access one of the first communication network 410 or the second communication network 420. According to an embodiment, even when the electronic device 101 includes a plurality of subscriber information and supports a plurality of wireless connections, if only the first communication network 410 of the first communication carrier is served in an area in which the electronic device 101 is located, the communication module 190 may access the first communication network 410 to receive the communication service. According to an embodiment, each of the plurality of pieces of subscriber information may include, e.g., a plurality of pieces of identification information of different types used in heterogeneous communication networks of the same communication carrier. Each of the subscriber information may include one or a combination of an international mobile subscriber identity (IMSI), which is identification information corresponding to the LTE network of a specific communication carrier, or a public user identity (PUI), which is identification information corresponding to the IMS network of the specific communication carrier. Further, the plurality of subscriber information may be stored in one SIM card, stored in an internal storage space (e.g., a memory) of the electronic device 101, or stored in another electronic device (e.g., a server) that may be connected with the electronic device 101.

According to an embodiment, the electronic device 101 may obtain a plurality of subscriber information from an internal storage space or from the outside, and register subscriber information corresponding to each IP service network (e.g., the IMS network 430). For example, if the electronic device 101 concurrently supports a plurality of wireless connections, the communication module 190 may obtain (or be allocated) a first address (e.g., an IP address) through the first communication network 410 and may register with the IMS network 430 based on the first address. According to an embodiment, if the electronic device 101 supports only one wireless connection at the same time, the communication module 190 may obtain (or be allocated) an address through one of the first communication network 410 or the second communication network 420 and register with the IMS network 430 based on the address. According to an embodiment, even when the electronic device 101 supports a plurality of wireless connections, if only the first communication network 410 of the first communication carrier is served in an area in which the electronic device 101 is located, the communication module 190 may obtain the address through the first communication network 410 and register with the IMS network 430 based on the address. Additional information related to an operation in which the electronic device 101 accesses or registers with a communication network and an IP service network is provided through FIG. 5 to be described in greater detail below.

According to an embodiment, the second communication network 420 may include entities, such as an evolved node B (eNB), a mobility management entity (MME), and a gateway. The eNB may be a device (e.g., a base station) that provides a wireless interface (or wireless connection) between at least one user device and an LTE network. For example, the eNB may control the wireless connection of the electronic device 101 and may control radio resources (e.g., frequencies) allocated to the radio connection. The MME may manage a connection to at least one electronic device 101 connected through the eNB. For example, the MME may provide authentication for the electronic device 101 or track or manage mobility of the electronic device 101 and provide a communication service when the electronic device 101 attaches to the LTE communication network. The gateway may include a serving gateway (S-GW) and a public data network gateway (PGW). For example, the gateway may route packets communicating with the LTE communication network and an external communication network (e.g., the Internet or IMS network 430), provide a firewall, or allocate an address (e.g., IP address) to at least one user device. According to some embodiments, the LTE communication network may include a plurality of entities, e.g., one or more of an evolved node B (eNB), a mobility management entity (MME), or a gateway.

According to an embodiment, the IMS network 430 may include entities, such as a call session control function (CSCF) and an application server (AS). For example, the IMS network 430 is an IP service network operated by the first communication carrier and may provide IP-based multimedia services to subscribers. The CSCF may include at least one of, e.g., a proxy call session control function (P-CSCF), a serving call session control function (S-CSCF), or an interrogating call session control function (I-CSCF). For example, the CSCF may register the electronic device 101 with the IMS network 430 in response to a registration request from the electronic device 101. Further, the CSCF may provide a function related to a call connection of the IMS network 430. The AS is a device for supporting the service provided through the IMS network 430 and may include, e.g., a telephony application server (TAS) or a voice call continuity (VCC) server. The TAS may provide a multimedia additional service (e.g., caller ID display or ring tone) to at least one electronic device 101. The VCC server may provide seamless handover between heterogeneous networks (e.g., a CDMA network and an IMS network) to at least one user device.

According to an embodiment, the electronic device 101 may access the first communication network 410 or the second communication network 420. For example, the electronic device 101 may request access (e.g., attach) to the first communication network 410 or the second communication network 420 through a wireless connection with the gNB or eNB. The MME may perform an authentication procedure associated with the electronic device 101 in response to the access request (or registration request) of the electronic device 101 and transmit a registration request (e.g., a create session request) associated with the electronic device 101 to the gateway. The gateway may allocate at least one address (e.g., an IP address) to the electronic device 101 in response to the registration request. For example, the second communication network 420 may provide a connection between the electronic device 101 and an external communication network (e.g., Internet or IMS network 430) based on at least one address assigned to the electronic device 101.

According to an embodiment, the electronic device 101 may register the electronic device 101 with the IMS network 430 through the first communication network 410 or the second communication network 420. For example, the electronic device 101 may transmit a registration request (e.g., attach) to the second communication network 420 (e.g., P-GW) corresponding to the first subscriber information. The second communication network 420 may allocate at least one address (e.g., an IP address) to the electronic device 101 in response to the registration request. The electronic device 101 may transmit a registration request (e.g., a session initiation protocol (SIP) register) to the IMS network 430 according to the at least one address. According to an embodiment, the second communication network 420 and the IMS network 430 may be operated by different communication carriers.

According to various embodiments, the electronic device 101 may obtain at least one piece of address information (e.g., an IP address or an identifier for the electronic device) from the communication networks and may transmit, via the communication network, a registration request (e.g., SIP register) for the IMS network 430 including the at least one address information to the IMS network 430. For example, the IMS network 430 may register the electronic device 101 with the IMS network 430 and provide a service in response to the registration request.

Figure 5:
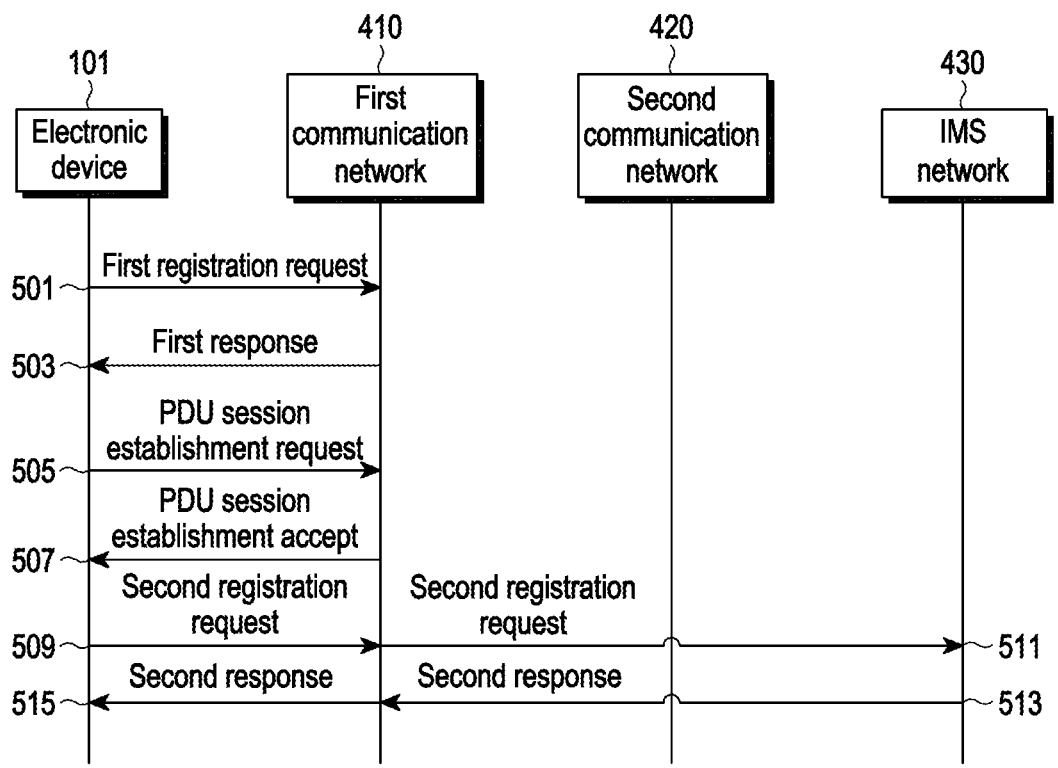
FIG. 5 is a signal flow diagram illustrating example IMS network registration operations according to various embodiments.

FIG. 5 is a signal flow diagram illustrating an example IMS network registration procedure according to various embodiments.

Referring to FIG. 5, according to an embodiment, in operation 501, the electronic device 101 may register with the IMS network 430 through the first communication network 410.

In operation 501, the electronic device 101 may transmit a first registration request (e.g., registration request) including first identification information corresponding to the first subscriber information to the first communication network 410. The first communication network 410 may register the electronic device 101 with the first communication network 410 based on first identification information (e.g., IMSI) corresponding to the first subscriber information included in the first registration request. According to an embodiment, the first communication network 410 may be a communication network (e.g., an NR communication network) operated by the communication carrier corresponding to the first subscriber information. For example, if the electronic device 101 is a subscriber of the communication carrier or a subscriber of another communication carrier that has entered into an agreement with the communication carrier, the first communication network 410 may register the electronic device 101 with the first communication network 410 and provide a communication service. In operation 503, the first communication network 410 may transmit a first response (e.g., registration accept) to the first registration request to the electronic device 101. If the electronic device 101 completes the registration procedure with the first communication network 410, the electronic device 101 may perform a protocol data unit (PDU) session establishment procedure. For example, if the electronic device 101 transmits a PDU session establishment request message to the first communication network 410 in operation 505, the first communication network 410 may transmit a PDU session establishment accept message to the electronic device 101 in operation 507. According to various embodiments, the PDU session establishment accept message may include address information (e.g., an IP address) allocated to the electronic device 101 by the first communication network 410. Further, the PDU session establishment accept message may include address information corresponding to the IMS network 430.

In operations 509 and 511, the electronic device 101 may transmit, to the IMS network 430 (e.g., a proxy call state control function (PCSCF)), a second registration request (e.g., an SIP register) based on the second identification information corresponding to the first subscription information (e.g., the public user identity (PUI) which is identification information corresponding to the IMS network of the specific communication carrier). According to an embodiment, the electronic device 101 may receive protocol configuration options (PCO) from the first communication network 410. The electronic device 101 may obtain address information (e.g., an IP address) corresponding to the IMS network 430 based on the protocol configuration option. The electronic device 101 may transmit a second registration request to the first communication network 410 based on the address information. The first communication network 410 may transmit the second registration request received from the electronic device 101 to the IMS network 430, based on the address, e.g., through the gateway of the first communication network 410. In operations 513 and 515, the IMS network 430 may register the electronic device 101 with the IMS network 430 based on the second registration request and may transmit a second response (e.g., OK) to the second registration request to the electronic device 101.

Thus, the electronic device 101 may use the IMS network 430 through the first communication network 410. For example, the electronic device 101 may receive a VoNR service or a VoLTE service through EPS fallback by registering with the IMS network through the NR communication network.

Hereinafter, methods of processing a call request in an electronic device according to various example embodiments are described in greater detail below with reference to FIGS. 6 to 28. Each operation of the electronic device described below in connection with FIGS. 6 to 28 may be performed through at least one component included in FIG. 1, 2A, or 2B.

In the embodiments described below, the electronic device (e.g., the electronic device 101 of FIG. 1) may be referred to as user equipment (UE) for convenience of description. The 'UE' may be referred to as a mobile station (MS), terminal, user terminal (UT), wireless terminal, access terminal (AT), subscriber unit, subscriber station (SS), wireless device, wireless communication device, wireless transmit/receive unit (WTRU), mobile node, mobile or may be denoted by other terms.

According to various embodiments, the electronic device may operate as a standalone (SA) (e.g., the network environment of FIG. 3B) through a 5G communication network. If the electronic device supports an IMS voice call in the 5G communication network but fails to connect to voice of NR (VoNR), the electronic device may perform evolved packet system (EPS) fallback that transitions to the LTE communication network to perform voice of LTE (VoLTE) and connect a call.

According to the 3GPP standard documents, if the 5G network supports an IMS voice call through the new generation radio access network (NG-RAN) connected to the 5G core (5GC) or if it does not support an IMS voice call through the NG-RAN connected to the 5GC but is able to redirect or hand it over to the EPS or other radio access technology (RAT) supporting it, the 5G network may set the IMS voice over packet switched (PS) session indication to 'supported' in the electronic device (e.g., a UE) and transmit it. In this case, the NG-RAN connected to the electronic device and the 5GC should be able to support EPS fallback to move the E-UTRAN connected to the EPC or the RAT fallback to move to the E-UTRA connected to the 5GC. According to various embodiments, if the electronic device, which has completed IMS registration through the NG-RAN connected to 5GC under the above conditions, attempts a call, the NG-RAN may receive a quality-of-service (QoS) flow generation request for IMS voice call and, if the NG-RAN fails to support the QoS flow, it may perform the EPS fallback of FIG. 6 or the RAT fallback of FIG. 7 described in greater detail below. The electronic device may proceed with the call after completing the EPS fallback or RAT fallback.

Figure 6:
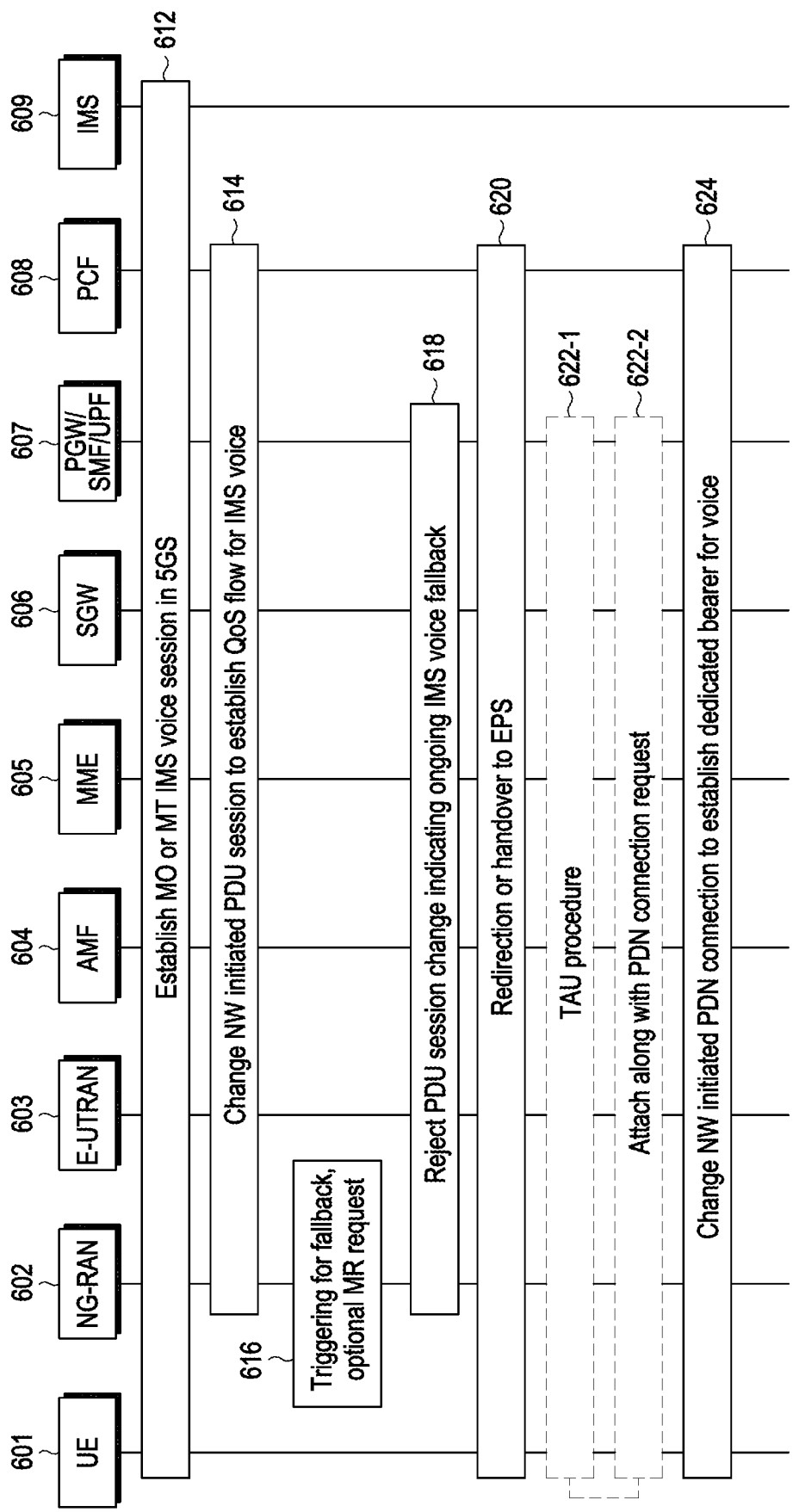
FIG. 6 is a signal flow diagram illustrating example EPS fallback operations according to various embodiments.

FIG. 6 is a signal flow diagram illustrating example EPS fallback operations according to various embodiments. Referring to FIG. 6, the 5G communication network may include an NG-RAN 602, an access and mobility management function (AMF) 604, a session management function (SMF)/user plane function (UPF) 607, and a policy control function (PCF) 608. The LTE communication network may include an E-URTAN 603, a mobility management entity (MME) 605, a serving gateway (SGW) 606, an IMS network 609 and a PDN gateway (PGW) 607.

According to various embodiments, if a call is requested from the electronic device, in operation 612, the UE 601 (e.g., the electronic device 101 of FIG. 1) may establish a mobile originated (MO) or mobile terminated (MT) IMS voice session with the IMS network 609 in the 5G communication network. The 5G communication network may perform the initiated PDU session modification to establish a QoS flow for IMS voice in operation 614.

According to various embodiments, as described above, if the NG-RAN 602 of the 5G communication network does not support the corresponding QoS flow, the NG-RAN 602 may trigger fallback in operation 616 and may request (or solicit) an optional measurement report (MR) for the UE 601. In operation 618, the NG-RAN 602 may reject the PDU session change indicating the ongoing IMS voice fallback. According to various embodiments, the UE 601 and the NG-RAN 602 may perform redirection or handover to the EPS in operation 620. According to the redirection or handover to the EPS, the UE 601 may perform operation 622-1 or operation 622-2. For example, in operation 622-1, the UE 601 may perform a tracking area update (TAU) procedure with an LTE communication network (e.g., E-UTRAN 603, MME 605, SGW 606, or PGW 607). In operation 622-2, the UE 601 may request a PDN connection to the LTE communication network and may attach to the LTE communication network. In operation 624, the UE 601 and the LTE communication network may change a network initiated PDN connection to establish a dedicated bearer for voice. After completing the EPS fallback, the UE 601 may proceed with a call through the LTE communication network and the IMS network 609.

Figure 7:
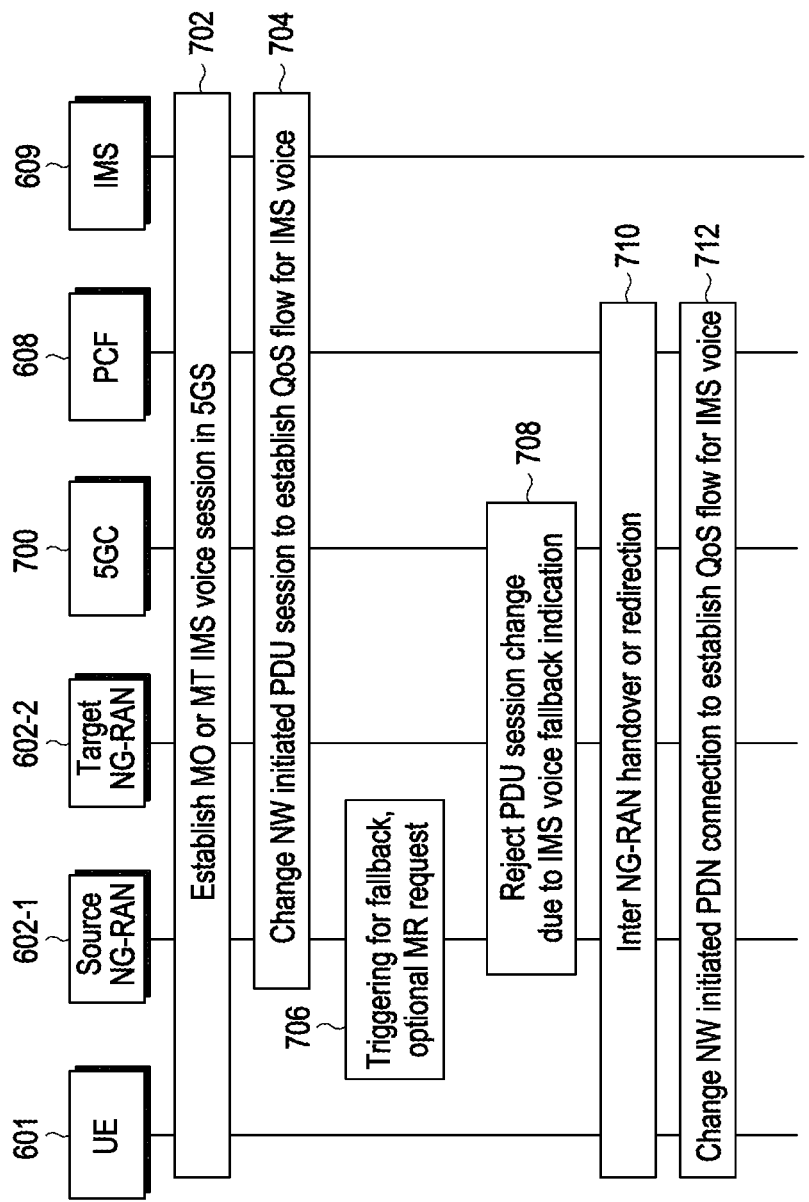
FIG. 7 is a signal flow diagram illustrating example RAT fallback operations according to various embodiments.

FIG. 7 is a signal flow diagram illustrating example RAT fallback operations according to various embodiments. Referring to FIG. 7, according to various embodiments, if a call is requested from the electronic device (e.g., an MO terminal), in operation 702, the UE 601 (e.g., the electronic device 101 of FIG. 1) may establish a mobile originated (MO) or mobile terminated (MT) IMS voice session with the IMS network 609 in the 5G communication network. The 5G communication network may perform the network initiated PDU session modification to establish a QoS flow for IMS voice in operation 704. According to various embodiments, as described above, if the source NG-RAN 602-1 connected to 5GC does not support the IMS voice call, but the target NG-RAN 602-2 supports the IMS voice call, the source NG-RAN 602-1 may trigger RAT fallback to the target NG-RAN in operation 706 and may request (solicit) an optional measurement report (MR) for the UE 601. In operation 708, the source NG-RAN 602-1 may reject the PDU session change with mobility due to the IMS voice fallback indication. According to various embodiments, the UE 601 and the source NG-RAN 602-1 may redirect or hand over to the target NG-RAN 602-2 in operation 710. According to the redirection or handover to the target NG-RAN 602-2, in operation 712, the UE 601 and the 5G communication network may change the network-initiated PDN connection for establishing a QoS flow for IMS voice. After completing the RAT fallback, the UE 601 may proceed with a call through the target NG-RAN 602-2.

According to various embodiments, according to the 3GPP standard document, the UE 601 that initiates an IMS voice call by the EPS fallback described above in connection with FIG. 6 or the RAT fallback described in connection with FIG. 7 may maintain the current state without performing any handover to the 5GC or existing NG-RAN while performing the IMS voice call. Thereafter, if the UE 602 terminates the call, it may be moved to the NG-RAN 602 before the EPS fallback or the NG-RAN 602 or 602-1 before the RAT fallback by the E-UTRAN 603 (e.g., eNB) or NG-RAN 602-2. The EPS fallback or RAT fallback may be performed in the form of a handover as shown in FIG. 8 or redirection as shown in FIG. 9 according to network implementation and operator policy.

Figure 8:
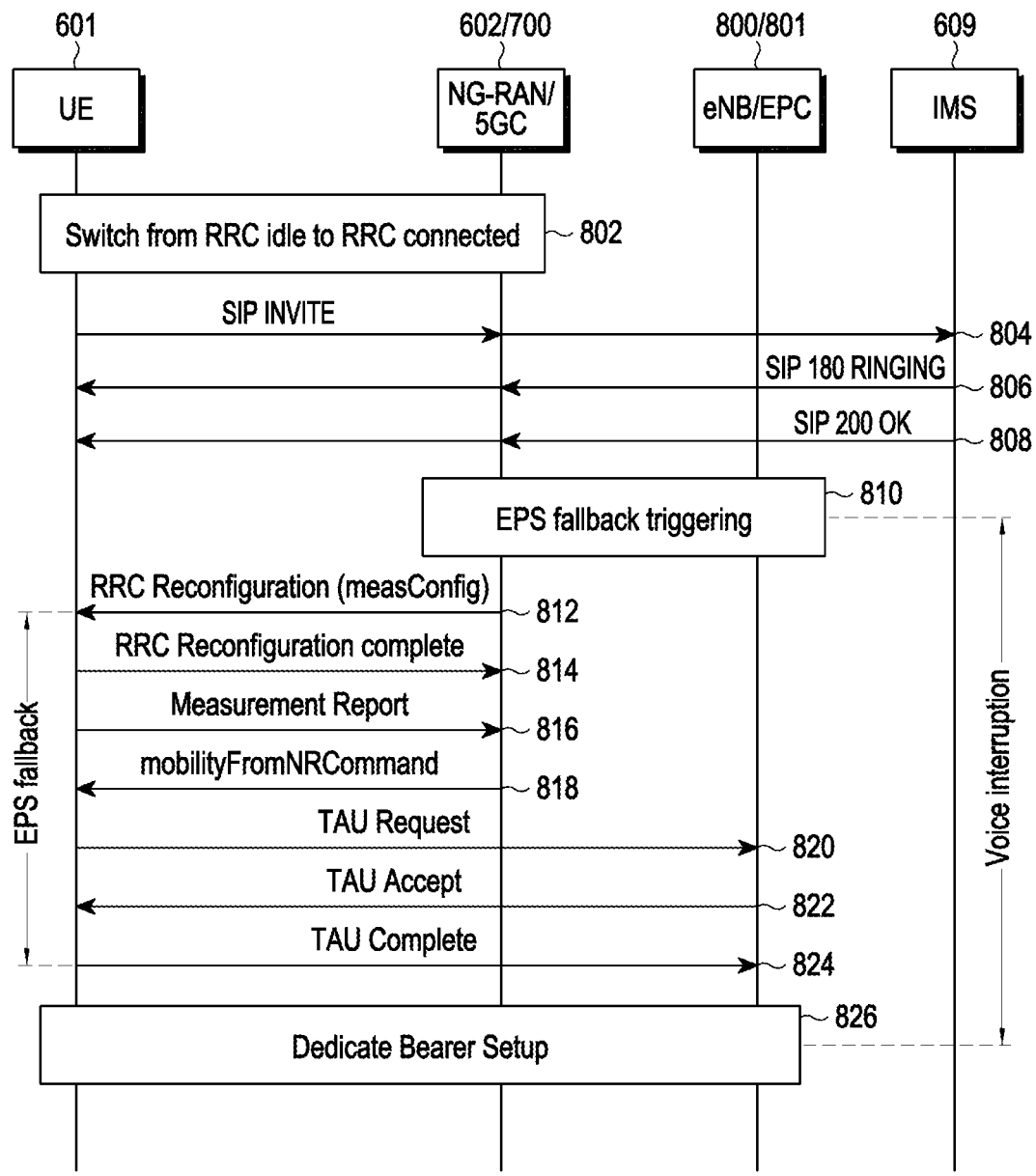
FIG. 8 is a signal flow diagram illustrating example handover-based EPS fallback operations according to various embodiments.
Figure 9:
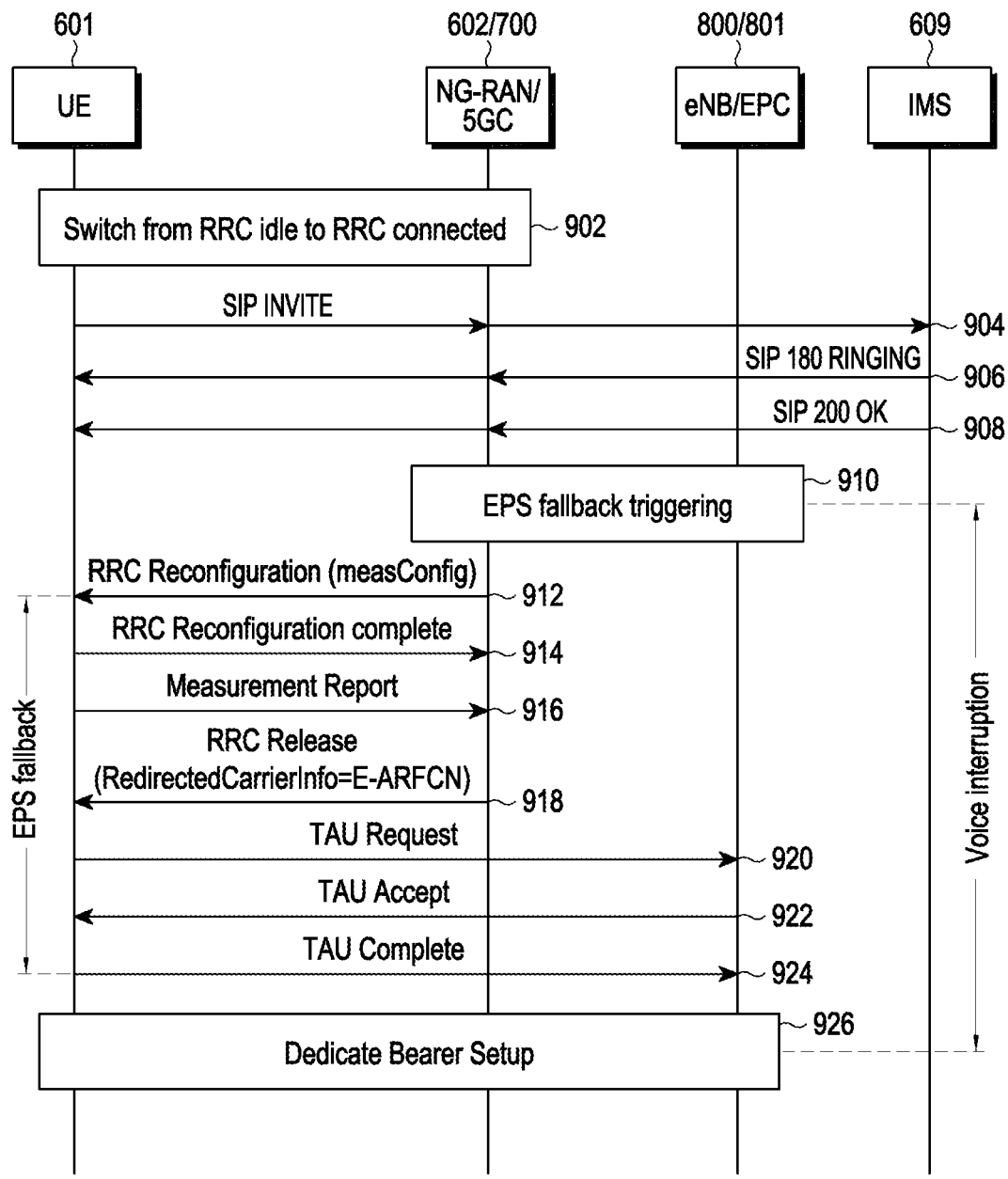
FIG. 9 is a signal flow diagram illustrating example redirection-based EPS fallback operations according to various embodiments.

FIG. 8 is a signal flow diagram illustrating example handover-based EPS fallback operations according to various embodiments. Referring to FIG. 8, according to the user's call request, the UE 601 (e.g., the transmitting terminal (MO terminal)) and the 5G communication network (e.g., the NG-RAN 602/5GC 700) may be switched from the RRC idle state to the RRC connected state in operation 802. According to various embodiments, the UE 601 may transmit a SIP INVITE message to the IMS network 609 through the 5G communication network in operation 804. Although not shown in FIG. 8, the 5G communication network may transmit a paging signal to a receiving UE (e.g., an MT terminal). The receiving UE may be switched from the idle state to the active state according to the reception of the paging signal and may receive the SIP INVITE message sent from the transmitting UE 601. The receiving UE may receive the SIP INVITE message and may transmit a SIP 180 RINGING message to the IMS network 609. In operation 806, the IMS network 609 may transmit the SIP 180 RINGING message transmitted from the receiving UE to the UE 601, which is the transmitting terminal, through the 5G communication network. According to various embodiments, if the receiving UE (MT terminal) answers, a SIP 200 OK message may be transmitted to the IMS network 609. In operation 808, the IMS network 609 may transmit the SIP 200 OK message to the UE 601 through the 5G communication network.

According to various embodiments, the 5G communication network may trigger EPS fallback as described above in FIG. 6 in operation 810. When handover-based EPS fallback is configured in the 5G communication network (e.g., gNB), the 5G communication network may transmit an measConfig for LTE band measurement to the UE 601 through RRC reconfiguration in operation 812. According to the reception of the RRC reconfiguration in operation 812, the UE 601 may transmit a RRC reconfiguration complete to the 5G communication network in operation 814. According to various embodiments, the UE 601 may report the LTE measurement information measured based on information included in the RRC reconfiguration (e.g., measurement object (MO)) to the NG-RAN 602 through the measurement report (MR) message in operation 816. Based on the received MR, the NG-RAN 602 and the 5GC 700 may transmit information for the LTE band and cell to which the UE 601 is to be handed over to the UE 601 through a mobilityFromNRCommand in operation 818.

According to various embodiments, the UE 601 may perform a tracking area update (TAU) procedure with the LTE communication network (e.g., the eNB 800/EPC 801) based on the corresponding LTE band and cell information. For example, the UE 601 may transmit a TAU request to the LTE communication network in operation 820 and, in operation 822, may receive a TAU accept from the LTE communication network. The UE 601 may receive the TAU accept and, in operation 824, may complete the inter-RAT handover process for EPS fallback by transmitting a TAU complete to the LTE communication network. According to various embodiments, after the EPS fallback procedure is completed, the UE 601 and the LTE communication network (e.g., the eNB 800/EPC 801) may set up a dedicated bearer for VoLTE call and start the call in operation 826. According to various embodiments, a call drop, meaning that call cannot proceed due to voice interruption, may occur from the time when EPS fallback is triggered in operation 810 to the time when the dedicated bearer is set up in operation 826.

FIG. 9 is a signal flow diagram illustrating example redirection-based EPS fallback operations according to various embodiments. Referring to FIG. 9, according to the user's call request, the UE 601 (e.g., the transmitting terminal (MO terminal)) and the 5G communication network (e.g., the NG-RAN 602/5GC 700) may be switched from the RRC idle state to the RRC connected state in operation 902. According to various embodiments, the UE 601 may transmit a SIP INVITE message to the IMS network 609 through the 5G communication network in operation 904. Although not shown in FIG. 9, the 5G communication network may transmit a paging signal to a receiving UE (e.g., an MT terminal). The receiving UE may be switched from the idle state to the active state according to the reception of the paging signal and may receive the SIP INVITE message sent from the transmitting UE 601. The receiving UE may receive the SIP INVITE message and may transmit a SIP 180 RINGING message to the IMS network 609. In operation 906, the IMS network 609 may transmit the SIP 180 RINGING message transmitted from the receiving UE to the UE 601, which is the transmitting terminal (MO terminal), through the 5G communication network. According to various embodiments, if the receiving UE (MT terminal) answers, a SIP 200 OK message may be transmitted to the IMS network 609. In operation 908, the IMS network 609 may transmit the SIP 200 OK message to the UE 601 through the 5G communication network.

According to various embodiments, the 5G communication network may trigger EPS fallback as described above in FIG. 6 in operation 810. The 5G communication network may transmit a measConfig for LTE band measurement to the UE 601 through RRC reconfiguration in operation 912. According to the reception of the RRC reconfiguration in operation 912, the UE 601 may transmit a RRC reconfiguration complete to the 5G communication network in operation 914. According to various embodiments, the UE 601 may report the LTE measurement information measured based on information included in the RRC reconfiguration (e.g., measurement object (MO)) to the NG-RAN 602 through the measurement report (MR) message in operation 916. According to various embodiments, if redirection-based EPS fallback is configured in the 5G communication network (e.g., gNB), the 5G communication network may include a specific LTE E-ARFCN (absolute radio frequency channel number) in an RRC release message and transmit it to the UE 601 in operation 918. The UE 601 may move to the LTE communication network, perform a cell scan on the corresponding E-ARFCN, and then proceed with a TAU procedure for camping on any one cell. For example, the UE 601 may perform a TAU procedure with the corresponding LTE communication network (e.g., the eNB 800/EPC 801) according to the cell scan. For example, the UE 601 may transmit a TAU request to the LTE communication network in operation 920 and, in operation 922, may receive a TAU accept from the LTE communication network. The UE 601 may receive the TAU accept and, in operation 924, may complete the inter-RAT handover process for EPS fallback by transmitting a TAU complete to the LTE communication network. According to various embodiments, after the EPS fallback procedure is completed, the UE 601 and the LTE communication network may set up a dedicated bearer for VoLTE call and start the call in operation 926. According to various embodiments, a call drop, meaning that call cannot proceed due to voice interruption, may occur from the time when EPS fallback is triggered in operation 910 to the time when the dedicated bearer is set up in operation 926.

Figure 10:
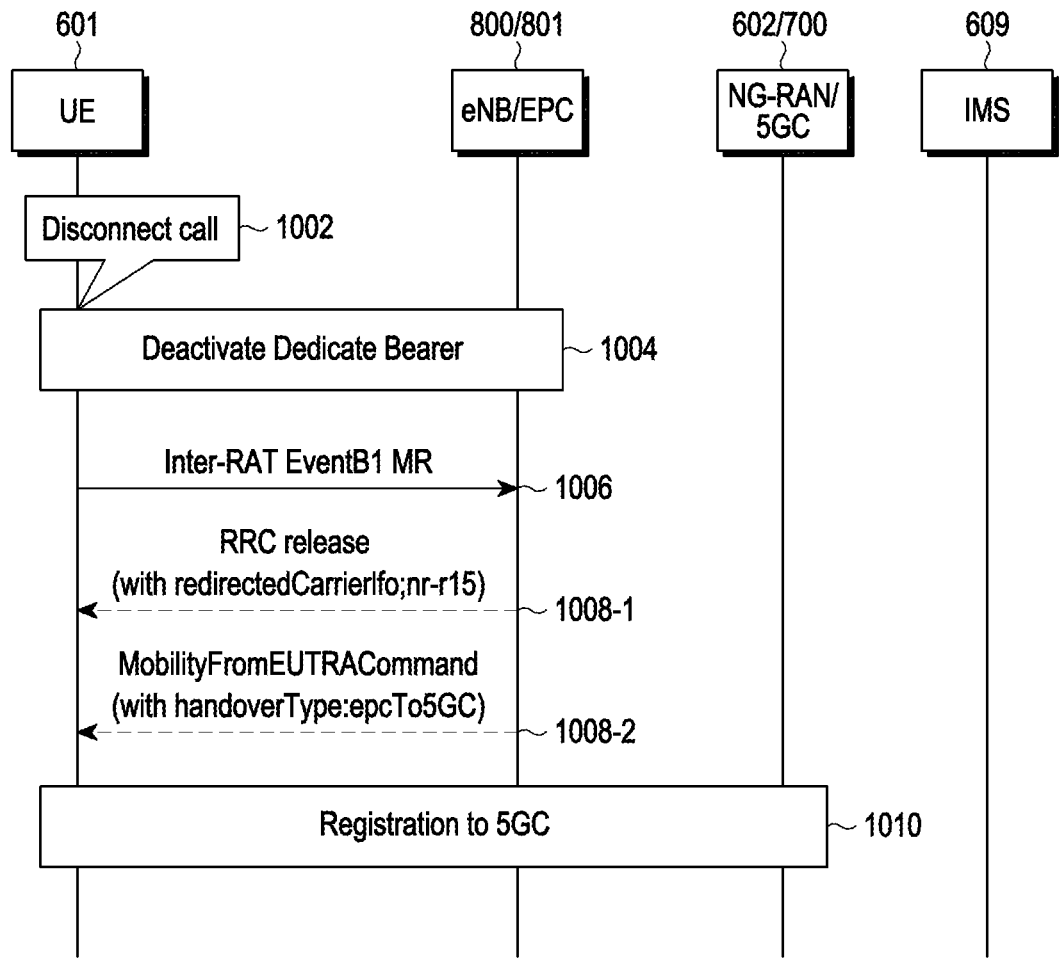
FIG. 10 is a signal flow diagram illustrating example operations of regression to a 5G communication network after an IMS voice call termination according to various embodiments.

FIG. 10 is a signal flow diagram illustrating example operations of regression to a 5G communication network after an IMS voice call termination according to various embodiments. Referring to FIG. 10, EPS fallback may be performed by FIG. 8 or 9 described above to proceed with a call. As the call is terminated, it may return to the 5G communication network before fallback.

According to various embodiments, if the call is terminated for various reasons in operation 1002, the dedicated bearer between the UE 601 and the LTE communication network (e.g., eNB 800/EPC 801) may be deactivated in operation 1004. The UE 601 may transmit an MR of a B1 event (e.g., an MR of an inter-RAT B1 event) to the LTE communication network in operation 1006. If the LTE communication network that has received the MR in operation 1006 is set as redirection, the LTE communication network may release the connection with the LTE communication network by transmitting an RRC release message including "redirectedCarrierlfo; nr-r15" to the UE 601 in operation 1008-1. On the other hand, if the LTE communication network that has received the MR in operation 1006 is set as handover, the LTE communication network may transmit a MobilityFromEUTRACommand including "handoverType:epcTo5GC" to the UE 601 in operation 1008-2. The UE 601 may register with the 5G communication network (e.g., NG-RAN 602/5GC 700) by the redirection or handover in operation 1010.

According to various embodiments, the call termination in operation 1002 may be caused by various factors (e.g., call drop) as well as by the user directly terminating the call on a phone application. For example, if the call is terminated regardless of the user's intention, the user may determine that the connection is disconnected during the call and retry the call immediately after the call ends. As illustrated in FIG. 10, when the user reattempts a call after the procedure of returning to 5GC after the call is terminated, the EPS fallback or RAT fallback procedure described above with reference to FIGS. 8 and 9 may be re-performed, causing repeated call disconnections.

In various embodiments described below, a timer may be started according to the call end cause when the call is terminated by EPS fallback or RAT fallback and, without returning to the 5G communication network during a set time, the registration with the LTE communication network may be maintained. Further, in various embodiments described below, although returning to the 5G communication network when the call is terminated by EPS fallback or RAT fallback, information for the previous LTE cell may be stored and, if a next call request is received in the 5G communication network within a set time, it is possible to register with the LTE cell based on the LTE cell information stored in the memory. According to embodiments described below, for additional call requests attempted within a set time, it is possible to prevent or minimize and/or reduce call disconnections due to EPS fallback or RAT fallback.

Figure 11:
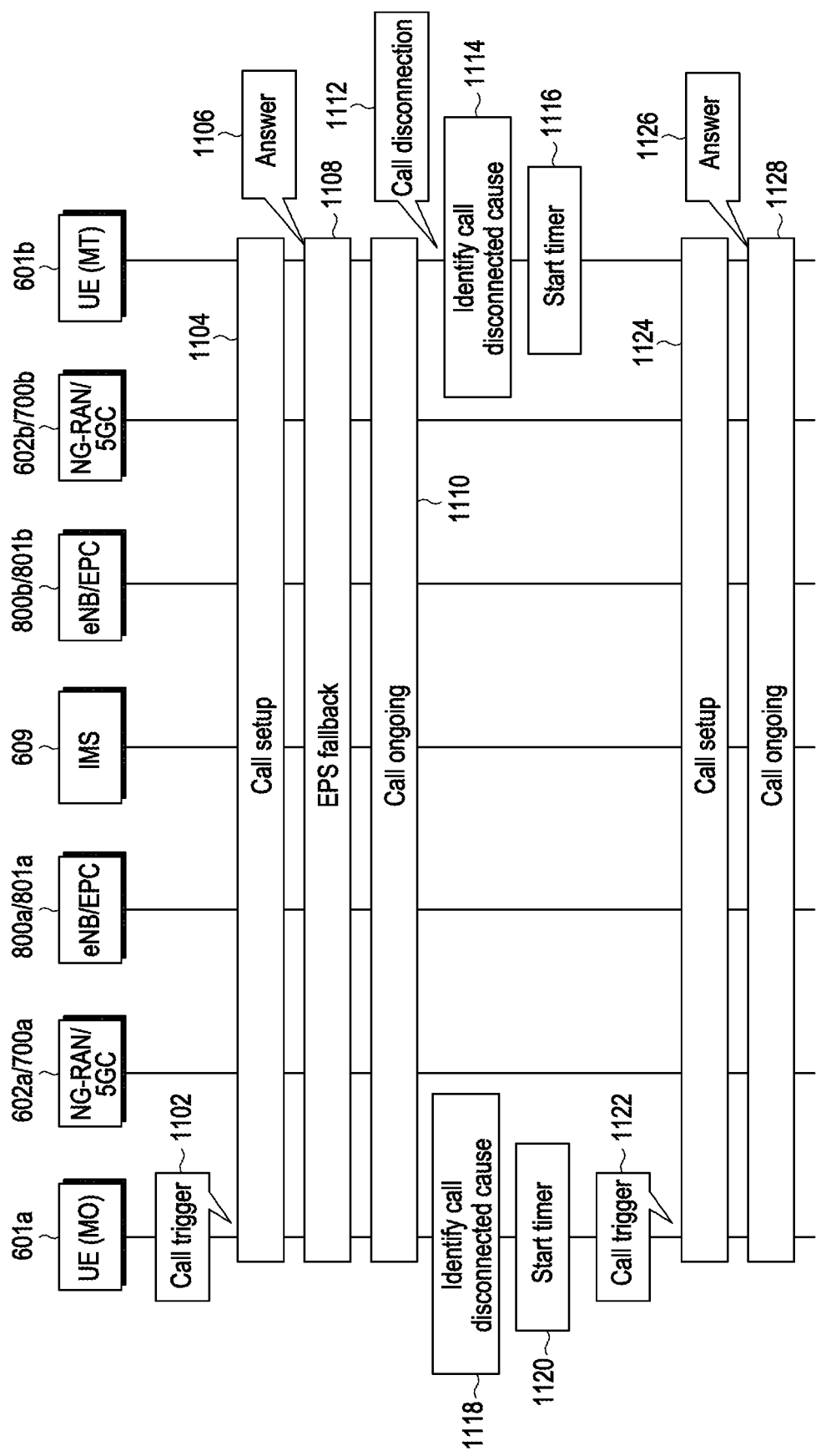
FIG. 11 is a signal flow diagram illustrating example call connection operations according to various embodiments.

FIG. 11 is a signal flow diagram illustrating example call connection operations according to various embodiments. Referring to FIG. 11, if a first UE 601a makes a call to a second UE 601b, a call may be triggered in operation 1102, and a call may be set up in operation 1104. The first UE 601a requesting the call may be referred to as an MO terminal, and the second UE 601b receiving the call according to the call request may be referred to as an MT terminal. According to various embodiments, the call setup in operation 1104 may include the operations of transmitting the SIP INVITE (804, 904), SIP 180 RINGING (806, 906), and SIP 200 OK (808, 908) according to answering call in operation 1106, as described above in connection with FIGS. 8 and 9. According to various embodiments, the call setup may further include receiving an ACK from the first UE 601a after the second UE 601b transmits a SIP 200 OK. The message transmitted/received between the first UE 601a and the second UE 601b may be transmitted through a first NG-RAN 602a/first 5GC 700a, an IMS 609, and a second NG-RAN 602b/second 5GC 700b. According to various embodiments, as described above with reference to FIGS. 8 and 9, when the electronic device (e.g., the first UE 601a), which has completed registration with the IMS network 609 through the first NG-RAN 602a connected to the first 5GC 700a attempts a call, the first NG-RAN 602a may receive a quality-of-service (QoS) flow generation request for IMS voice call and, if the first NG-RAN 602a cannot support the QoS flow, it may perform EPS fallback or RAT fallback. According to various embodiments, after completing the EPS fallback in operation 1108, the first UE 601a may perform a call ongoing in operation 1110. According to various embodiments, the EPS fallback of operation 1108 may include the redirection or handover and TAU operations described above with reference to FIGS. 8 and 9. The call ongoing operation in operation 1110 may refer, for example, to the call setup being completed and the user is on the phone or may refer, for example, to the state before the call is terminated.

According to various embodiments, if a call disconnected situation occurs in operation 1112 while the call is ongoing, the second UE 601*b* may identify a call disconnected cause in operation 1114. The call disconnected cause may be set as shown in Table 1 below but is not limited thereto.

TABLE 1

| Types of call disconnected cause | SIP BYE Reason |
|---|---|
| 1 USER presses the end button | Reason: USER; cause = 101; text = "User triggered"; |
| 2 End of call at RTP timeout | Reason: RTP; cause = 102; text = "RTP timeout"; |
| 3 End of call if Session Expires | Reason: SIP; cause = 103; text = "Session-Expire"; |
| 4 switch to 3G during call | Reason: eHRPD; cause = 105; text = "Inter-RAT"; |
| 5 End of video due to low battery | Reason: Power; cause = 106; text = "Low battery"; |
| 6 End of voice due to battery exhaustion | Reason: Power; cause = 107; text = "Out of battery"; |
| 7 Other cases | Reason: ETC; cause = 104; text = "Unknown"; |

Referring to Table 1, the call disconnected causes may include when the user presses the end button, when the call is terminated due to a real-time transport protocol (RTP) timeout, when the call is terminated as the session expires, switch to the 3G communication network during the call, the end of video due to low battery, the end of voice due to battery exhaustion, or other cases. According to various embodiments, the call disconnection causes in Table 1 above may correspond to the reasons described in 3GPP TS 24.008. Each of the types in Table 1 may be included in the BYE reason of the SIP message used when the VoLTE call is terminated.

According to various embodiments, if the identified call disconnected cause corresponds to a designated type, the second UE 601*b* may drive a timer in operation 1116. During the timer operation, the second UE 601*b* does not return to the second 5GC 700*b* but may stay on the second EPC 801*b* while maintaining the LTE registration state. For example, if the identified call disconnected cause corresponds to a type related to abnormal termination (e.g., call end due to RTP timeout or call end due to session expiration), the second UE 601*b* may drive the timer in operation 1116.

According to various embodiments, the time set in the timer may be set to a fixed value or may be set to a different value depending on the type of each call disconnected cause. For example, the time set in the timer may be reset considering the time it takes for the user to retry a call. The method for resetting the time set in the timer may be performed through software update of the UEs 601*a* and 601*b*. According to various embodiments, the time set in the timer may be reset when receiving a registration accept message in the process of registering the UE 601*a* or 601*b* with the 5GC 700*a* or 700*b* or when receiving a UE configuration update command message in the process of updating the policy of the UE 601*a* or 601*b*. According to various embodiments, the time set in the timer may be updated according to the time and area through a separate information element (IE) in non-access stratum (NAS) signaling with the 5GC 700*a* or 700*b*. For example, in the case where the user presses the end button in Table 1, it may be determined that the possibility of retrying a call is low, so that a relatively short time (e.g., 10 seconds) may be set. If the call is disconnected due to the RTP timeout, since the call is terminated due to a call drop, it is determined that the possibility of retrying a call is high, so that a relatively long time (e.g., 30 seconds) may be set.

According to various embodiments, if a call disconnected situation occurs in operation 1112 while the call is ongoing, the first UE 601*a* may identify a call disconnected cause in operation 1118. The call disconnected cause may be set as shown in Table 1 above but is not limited thereto. According to various embodiments, if the identified call disconnected cause corresponds to a designated type, the first UE 601*a* may drive a timer in operation 1120. During the timer operation, the first UE 601*a* does not return to the first 5GC 700*a* but may stay on the first EPC 801*a* while maintaining the LTE registration state.

According to various embodiments, if a call is retried by the user before the running timer expires so that a call is triggered in operation 1122, a call setup may be performed. According to various embodiments, if a call is retried before the timer expires, a call setup operation for VoLTE may be performed in the state of being connected to the LTE communication network in operation 1124. According to various embodiments, the call setup in operation 1124 may include the operations of transmitting the SIP INVITE, SIP 180 RINGING, and SIP 200 OK according to answering call in operation 1126. According to various embodiments, the call setup may further include receiving an ACK from the first UE 601*a* after the second UE 601*b* transmits a SIP 200 OK. If the call setup is completed, the first UE 601*a* and the second UE 601*b* may proceed with a call (call ongoing) in operation 1128. According to various embodiments, if a call is not retried until the timer driven in operation 1116 or operation 1120 expires, the first UE 601*a* or the second UE 601*b* may perform a procedure for returning to the first 5GC 700*a* or second 5GC 700*b* after the timer expires.

Figure 12:
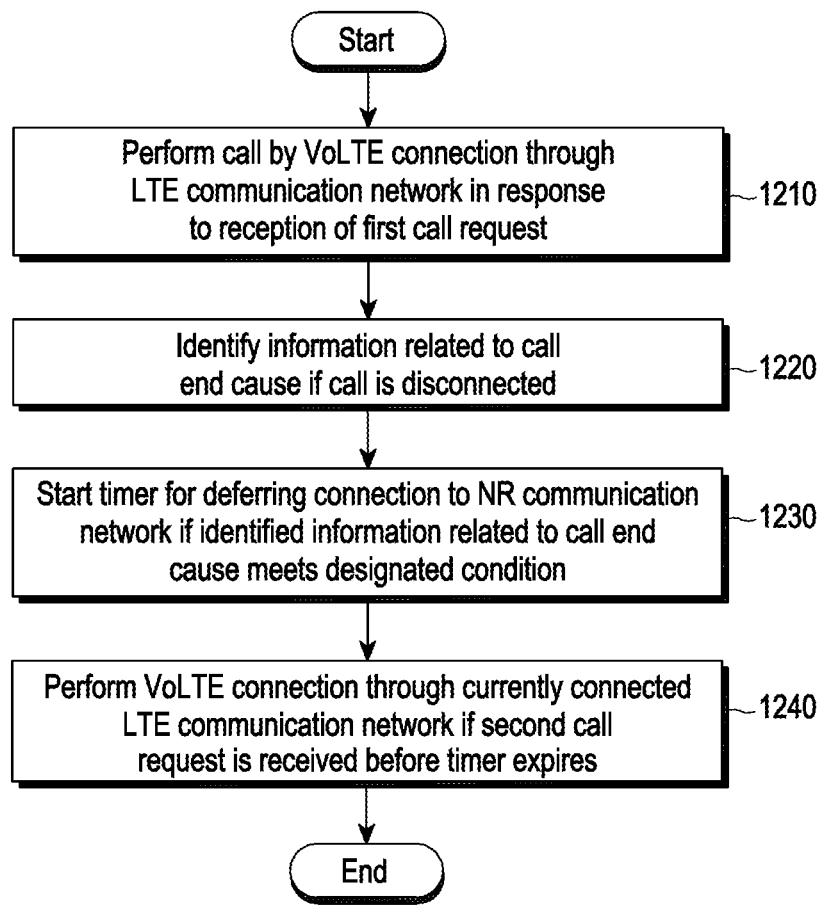
FIG. 12 is a flowchart illustrating example operations of an electronic device according to various embodiments.

FIG. 12 is a flowchart illustrating example operations of an electronic device according to various embodiments. Referring to FIG. 12, an electronic device (e.g., the electronic device 101 of FIG. 1 or the first UE 601*a* of FIG. 11) may receive a first call request in the state of being connected to the first communication network (e.g., an NR communication network). According to various embodiments, in operation 1210, in response to the reception of the first call request, the electronic device may make a call by connecting an IMS voice service (e.g., VoLTE) through a second communication network (e.g., an LTE communication network). The operation of switching from the first communication network to the second communication network to perform an IMS voice service may include an EPS fallback operation. For example, if the connection of VoNR fails, the electronic device may proceed with EPS fallback to conduct a call by connection of VoLTE.

According to various embodiments, if the call connection is interrupted (e.g., if the call is terminated) in operation 1220, the electronic device may identify information related to the call disconnected cause. For example, the information related to the call disconnected cause may include at least part of Table 1 described above. If the identified information related to the call disconnected cause meets a designated condition (e.g., if corresponding to a specific call disconnected cause) in operation 1230, the electronic device may drive the timer for deferring connection to the first communication network (e.g., the NR communication network). According to various embodiments, in operation 1240, if a second call request is received before the timer expires, the electronic device may perform an IMS voice service (e.g., VoLTE) connection through the currently connected second communication network (e.g., the LTE communication network).

Figure 13:
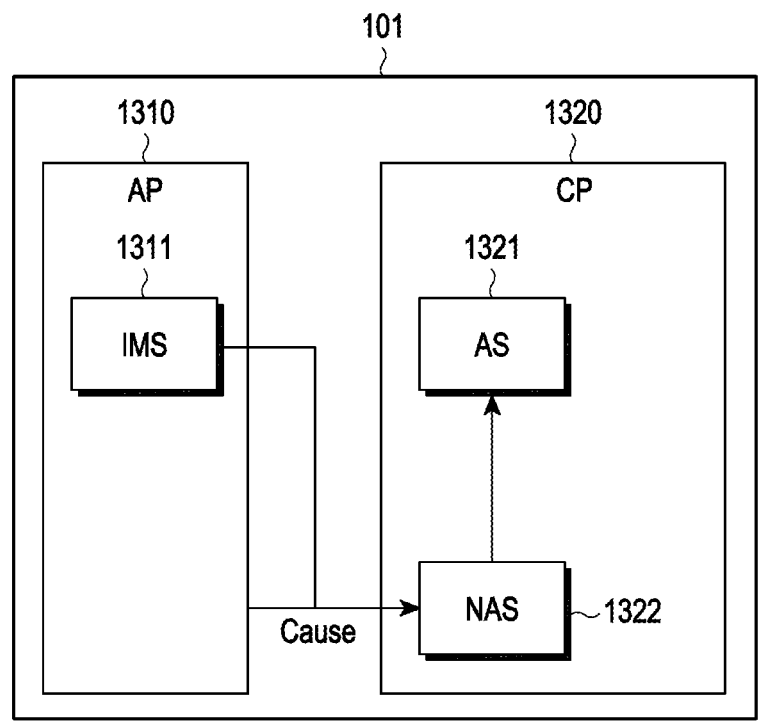
FIG. 13 is a block diagram illustrating an example configuration of an electronic device according to various embodiments.
Figure 14:
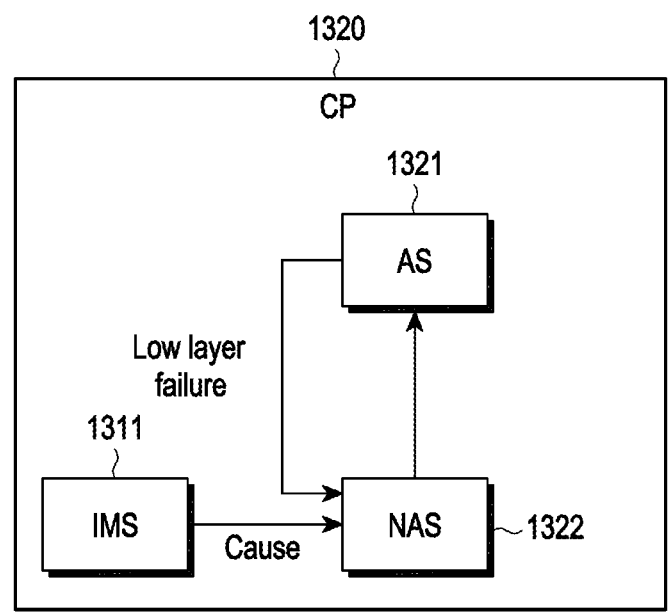
FIG. 14 is a block diagram illustrating an example configuration of an electronic device according to various embodiments.

FIGS. 13 and 14 are block diagrams illustrating example configurations of an electronic device according to various embodiments. Referring to FIGS. 13 and 14, according to various embodiments, the CP (e.g., including processing circuitry) 1320 of the electronic device 101 may identify information related to the call disconnected cause through the SIP message exchanged with the IMS protocol stack 1311 included in the AP (e.g., including processing circuitry) 1310. According to various embodiments, the IMS protocol stack 1311 may be included in the CP 1320 as illustrated in FIG. 14.

According to various embodiments, the CP 1320 (e.g., non access stratum (NAS) protocol layer (1322)) of the electronic device 101 may identify the information related to the call disconnected cause through a message transferred from the AP 1310. The CP 1320 may determine a normal call end or abnormal call end by identifying the information related to the call disconnected cause through the message transferred from the IMS protocol stack 1311 or the AP 1310.

For example, if the user presses the end button, the CP 1320 may determine that it is a normal call end and disable the timer from being driven. If the call is ended due to RTP timeout or session expiration, the CP 1320 may determine that it is an abnormal call end and thus drive the timer. According to various embodiments, the RTP timeout or session expiration may occur when a radio link failure (RLF) occurs in a weak electric field environment or data packet processing is not normally performed in the UE or the network, and this may most likely cause a call drop. Thus, if a SIP BYE message having the cause occurs, it may be determined that the call is abnormally terminated.

According to various embodiments, as illustrated in FIG. 14, the call disconnected cause may be determined by internal information of the CP 1320. For example, the call drop may be determined considering, not the SIP BYE message but access stratum (AS) protocol layer (1321) (e.g., low layer failure (e.g., radio link failure (RLF))) information, and the timer may be driven. In this case, the UE may determine that it may experience the same occasion upon retrying a call in the LTE cell where a low layer failure is detected in the next call attempt process and search for another LTE cell where it may camp. If another LTE cell is discovered, the UE may hand over to the cell and conduct a call. If there is no LTE cell, the UE may retry a call in the existing cell. According to various embodiments, the operation of the timer may be rendered to be performed in all cases where the call is terminated regardless of the call disconnected cause depending on the operator's policy and implementation. In such a case, the CP 1320 may determine that the call has been terminated and immediately drive the timer irrespective of the call disconnected cause.

According to various embodiments, in operation 1230 of FIG. 12, if the timer is driven and an LTE to NR (L2N) redirection or handover command is received from the eNB, which is an LTE base station, before the timer expires, it may initialize the timer and immediately return to the 5GC 700 through L2N redirection or handover operation.

According to various embodiments, in operation 1240 of FIG. 12, if a second call request is received before the timer expires (e.g., if a call attempt is identified through the SIP INVITE message), the electronic device (e.g., the UE 601) may initialize the running timer and then identify whether the call setup is successfully completed. If it is identified that the call setup fails or even call start is not normally performed by the user, the electronic device may restart the timer and identify whether a new call is attempted until before the timer expires. In contrast, if the call setup is normally completed (e.g., if the user of the receiving UE answers, so that the call begins), a call proceeding procedure may be performed as described above.

According to various embodiments, the electronic device (e.g., the UE 601) may identify whether use of the 5G app is tried by the user while the timer operates or whether the 5G app has been used before EPS fallback. The 5G app may refer, for example, to an application using the QoS and network slice selection assistance information (NSSAI) that may be supported only in the 5GC (700) registration state. For example, if the user was using an app using the NSSAI with a slice service type (SST) of ultra-reliable low latency communication (URLLC) before EPS fallback in the electronic device, or an attempt is made to use the app during the timer operation, the electronic device may initialize the timer to return directly to the 5GC 700 and perform an operation for LTE to NR (L2N) redirection or handover, considering that the user prioritizes the use of the 5G app rather than the voice call. According to various embodiments, upon registering with the 5GC 700, the electronic device may obtain information for the 5G app through a packet data unit (PDU) session creation process for using the corresponding application or UE route selection policy (URSP) information. According to various embodiments, while the timer operates, the electronic device may obtain the information from the AP 1310 at the time when the user attempts to use the 5G app. According to various embodiments, the electronic device may control to stop the currently running timer and perform the L2N redirection or handover operation to return to the 5GC 700 even under other specific conditions set by the communication carrier or the user, not the 5G app.

According to various embodiments, the electronic device may identify whether a new NG-RAN, not the NG-RAN which the electronic device camped on upon registration with the 5GC 700 before EPS fallback, is discovered. Since EPS fallback may be triggered if the NG-RAN where the electronic device is currently camping cannot support the QoS for establishing a PDU session for VoNR, if a new NG-RAN is discovered in the state of fallback in the LTE communication network, the electronic device may identify whether the NG-RAN supports the QoS of VoNR. For example, if the new NG-RAN is discovered, the electronic device may immediately return to the 5GC 700 even before the timer expires to identify whether the discovered NG-RAN supports QoS. To this end, the electronic device may perform the operation of measuring a determined NR band for periodically searching for an NG-RAN. For example, the electronic device may identify the physical cell ID (PCI) through the NR synchronization signal block (NR SSB) transmitted from the NG-RAN or determine whether a new NG-RAN is present using the cellIdentity in the NR SIB 1 message. If a new NG-RAN is not discovered, the electronic device may maintain timer operation.

According to various embodiments, if the timer driven in operation 1230 expires, the electronic device may initialize the timer and then perform an operation for returning to the 5GC 700. The operation of returning to the 5GC 700 may be performed upon receiving an L2N redirection or handover command from the LTE communication network. In this case, the electronic device may be in the state of having received the measObjectConfig and reportConfig for NR cell measurement from the network before performing a VoLTE call and, if the timer expires, transfer the NR cell information measured based on the config to the LTE communication network (e.g., the eNB 800) through an LTE RRC measurementReport message. For example, after determining whether there is L2N redirection or handover, the eNB 800 may transmit an RRC release message for redirection or a MobilityFromEUTRACommand message for handover to the electronic device as described above. The electronic device may camp on for a designated NR frequency or NR cell ID through the message received from the eNB 800 and perform a process for registration with the 5GC 700. Upon failing to receive a request for performing L2N redirection or handover from the LTE communication network after the timer expires, the electronic device may scan the NR frequency band and switch to the 5GC 700 through a cell reselection process or may forcedly camp on the NR cell based on the NR cell scan information stored in the electronic device. According to various embodiments, even when failing to receive the measObjectConfig and reportConfig for NR cell measurement before EPS fallback, the electronic device may scan the NR frequency band and switch to the 5GC 700 through a cell reselection process or may attach to the NR cell using the NR cell scan information stored in the electronic device.

Examples of operation procedures according to each call disconnected cause are described below with reference to FIGS. 15A to 23, according to various embodiments.

Figure 15A:
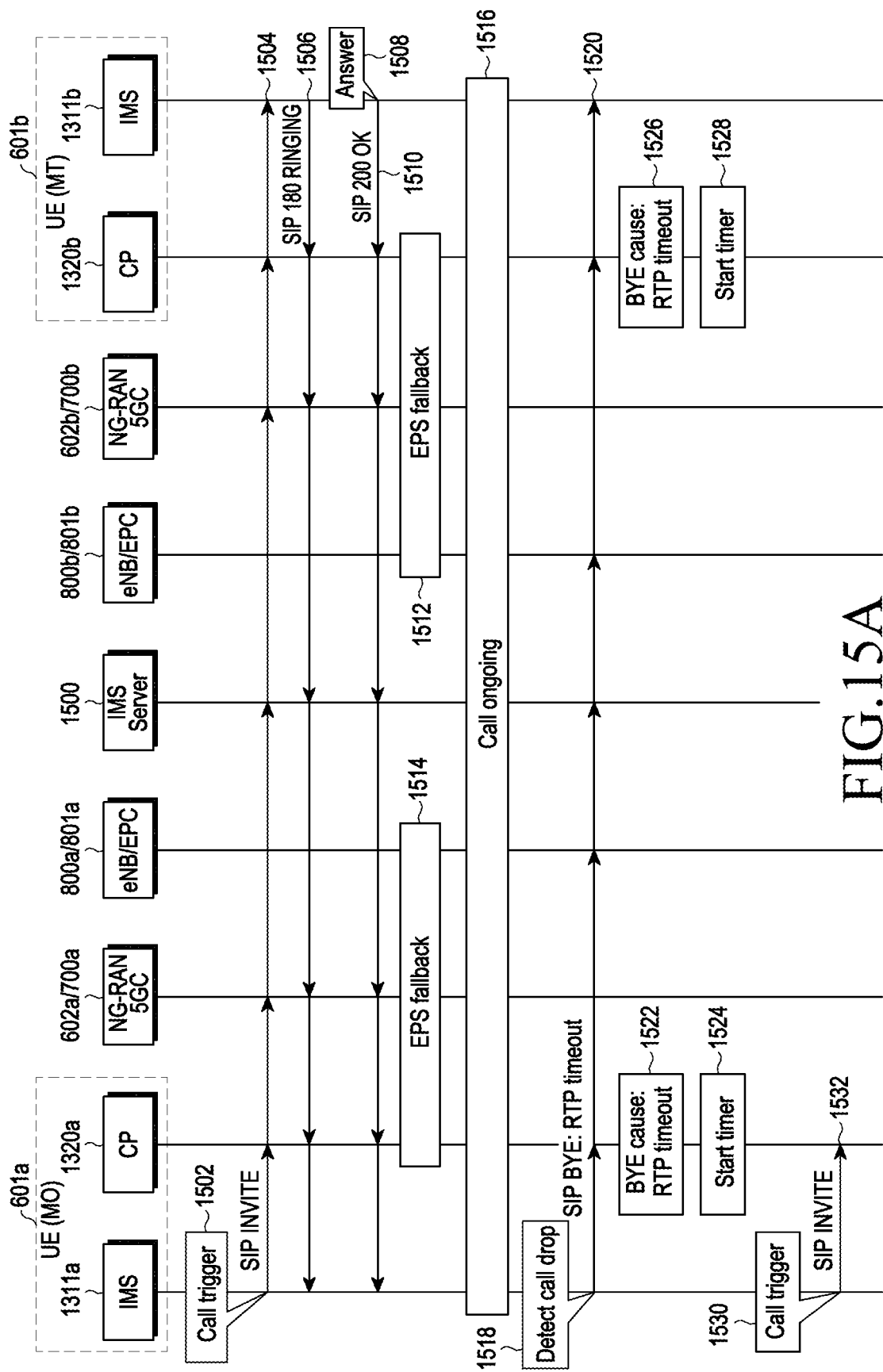
FIGS. 15A and 15B are signal flow diagrams illustrating example call connection operations according to various embodiments.
Figure 15B:
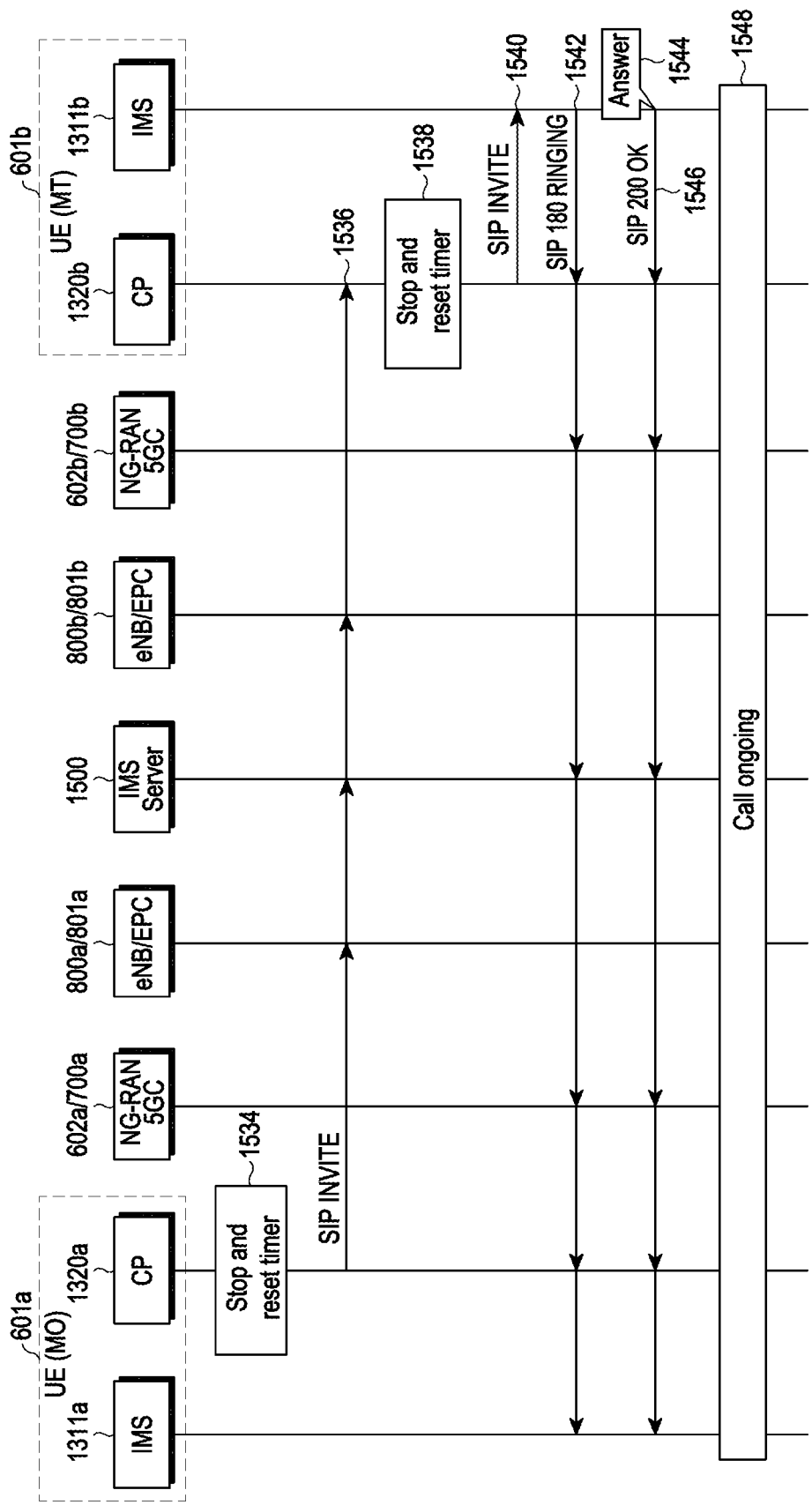

FIGS. 15A and 15B are signal flow diagrams illustrating example call connection operations according to various embodiments. Referring to FIGS. 15A and 15B, if a call is made from the first UE 601*a* to the second UE 601*b*, a call may be triggered through the IMS protocol stack 1311*a*, and a call setup may be performed in operation 1502. The first UE 601*a* requesting the call may be referred to as an MO terminal, and the second UE 601*b* receiving the call according to the call request may be referred to as an MT terminal. According to various embodiments, in the call setup procedure, the IMS protocol stack 1311*a* of the first UE 601*a* may transmit a SIP INVITE message to the second UE 601*b* in operation 1504, and the IMS protocol stack 1311*b* of the second UE 601*b* may transmit a SIP 180 RINGING message to the first UE 601*a* according to the reception of the SIP INVITE message in operation 1506. According to various embodiments, the IMS protocol stack 1311*b* of the second UE 601*b* may transmit a SIP 200 OK message to the first UE 601*a* in operation 1510 according to call answering in operation 1508. The message transmitted/received between the first UE 601*a* and the second UE 601*b* may be transmitted through a first NG-RAN 602*a*/first 5GC 700*a*, an IMS 609, and a second NG-RAN 602*b*/second 5GC 700*b*. According to various embodiments, as described above with reference to FIGS. 8 and 9, when the electronic device (e.g., the first UE 601*a*), which has completed registration with the IMS network 609 through the first NG-RAN 602*a* connected to the first 5GC 700*a* attempts a call, the first NG-RAN 602*a* may receive a quality-of-service (QoS) flow generation request for IMS voice call and, if the first NG-RAN 602*a* cannot support the QoS flow, it may perform EPS fallback or RAT fallback.

According to various embodiments, the second UE 601*b* may complete EPS fallback in operation 1512, and the first UE 601*a* may complete EPS fallback in operation 1514. If the EPS fallback is completed, the first UE 601*a* and the second UE 601*b* may proceed with a call (e.g., VoLTE call) (call ongoing) in operation 1516. According to various embodiments, the EPS fallback of operation 1512 or 1514 may include the redirection or handover and TAU operations described above with reference to FIGS. 8 and 9. The call ongoing operation in operation 1516 may refer, for example, to the call setup being completed and the user is on the phone or may refer, for example, to the state before the call is terminated.

According to various embodiments, a call drop may occur due to an RTP timeout while the call is ongoing, and the first UE 601*a* may detect the call drop in operation 1518 and determine whether to drive the timer according to the call disconnected cause. For example, the IMS protocol stack 1311*a* of the first UE 601*a* may transmit a SIP BYE message including the RTP timeout to the second UE 601*b* in operation 1520. The IMS protocol stack 1311*a* of the first UE 601*a* may transmit the SIP BYE message through the CP 1320*a*, and the CP 1320*a* may identify that the call disconnected cause is RTP timeout through the SIP BYE message in operation 1522.

According to various embodiments, the first UE 601*a* may determine that the RTP timeout, which is the call disconnected cause, meets a condition set for driving the timer and may drive the timer for the set time in operation 1524. According to various embodiments, in operation 1526, the second UE 601*b* may identify that the call disconnected cause is the RTP timeout through the SIP BYE message transmitted from the first UE 601*a*. The second UE 601*b* may determine that the RTP timeout, which is the call disconnected cause, meets a condition set for driving the timer and may drive the timer for the set time in operation 1528. According to various embodiments, since the time set in the timer has been described with reference to FIG. 11, a detailed description thereof will be omitted.

According to various embodiments, during the timer operation, the first UE 601*a* does not return to the first 5GC 700*a* but may stay on the first EPC 801*a* while maintaining the LTE registration state. According to various embodiments, if a call is retried by the user before the running timer expires so that a call is triggered in operation 1530, a call setup may be performed. According to various embodiments, if a call is retried before the timer expires, a call setup operation for VoLTE may be performed in the state of being connected to the LTE communication network. For example, the IMS protocol stack 1311*a* of the first UE 601*a* may transmit a SIP INVITE message to the second UE 601*b* through the CP 1320*a* according to the call triggering in operation 1532. The CP 1320*a* may receive the SIP INVITE message from the IMS protocol stack 1311*a* and stop and reset the running timer in operation 1534. The CP 1320*a* may transmit the SIP INVITE message received from the IMS protocol stack 1311*a* to the second UE 601*b* in operation 1536.

According to various embodiments, the CP 1320*b* of the second UE 601*b* receiving the SIP INVITE message transmitted from the first UE 601*a* may stop and reset the currently running timer in operation 1538. The CP 1320*b* of the second UE 601*b* may transmit the received SIP INVITE message to the IMS protocol stack 1311*b* in operation 1540. In response to reception of the IMS INVITE message, the IMS protocol stack 1311*b* of the second UE 601*b* may transmit a SIP 180 RINGING message to the first UE 601*a* in operation 1542. According to various embodiments, the IMS protocol stack 1311*b* of the second UE 601*b* may transmit a SIP 200 OK message to the first UE 601*a* in operation 1546 according to call answering in operation

1544. The message transmitted/received between the first UE 601*a* and the second UE 601*b* may be transmitted through a first NG-RAN 602*a*/first 5GC 700*a*, an IMS 609, and a second NG-RAN 602*b*/second 5GC 700*b*. According to various embodiments, the call setup may further include receiving an ACK from the first UE 601*a* after the second UE 601*b* transmits a SIP 200 OK. If the call setup is completed, the first UE 601*a* and the second UE 601*b* may proceed with a call (call ongoing) in operation 1548.

Figure 16:
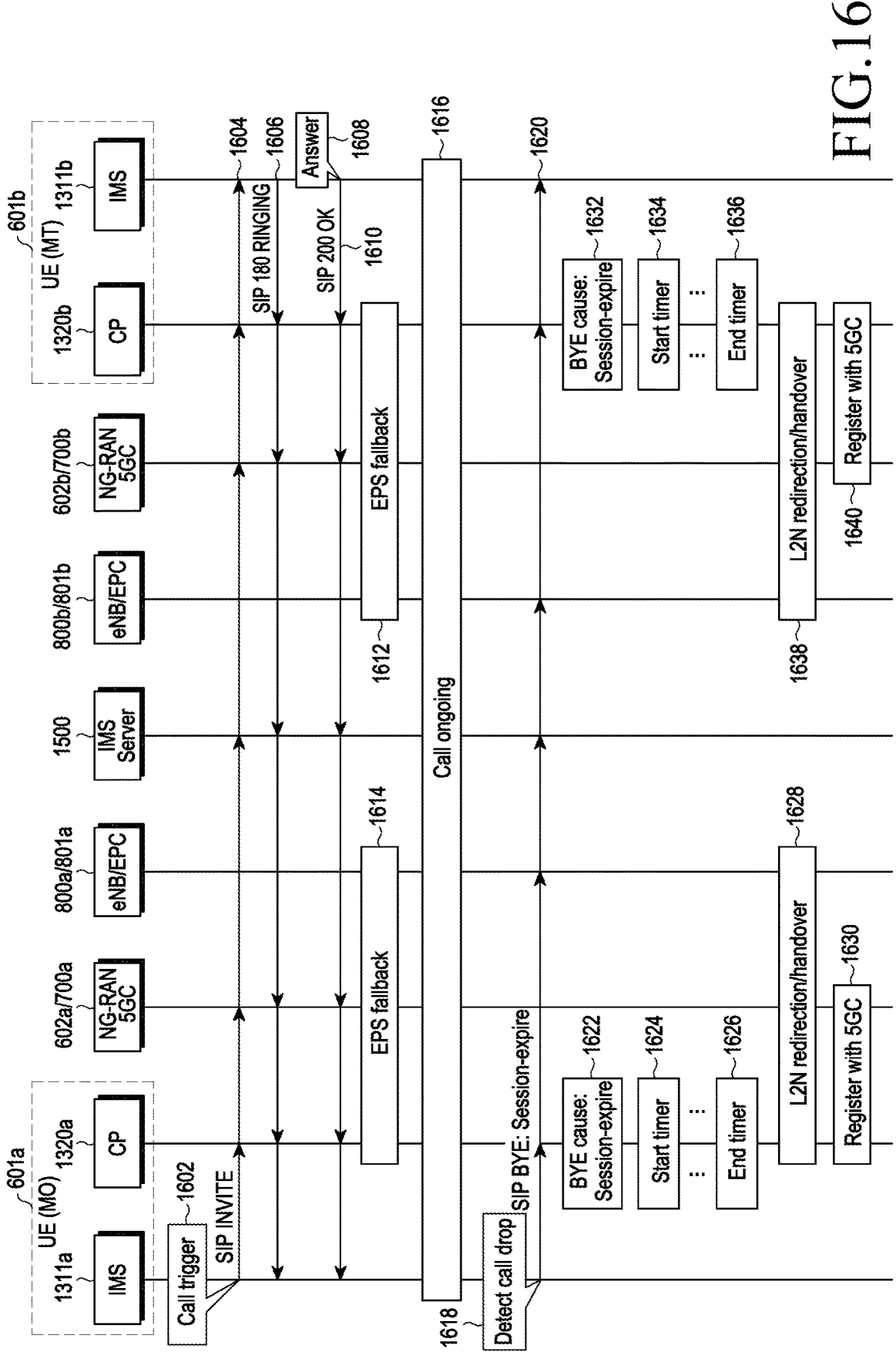
FIG. 16 is a signal flow diagram illustrating example call connection operations according to various embodiments.

FIG. 16 is a signal flow diagram illustrating example call connection operations according to various embodiments. Referring to FIG. 16, if a call is made from the first UE 601*a* to the second UE 601*b*, a call may be triggered through the IMS protocol stack 1311*a*, and a call setup may be performed in operation 1602. The first UE 601*a* requesting the call may be referred to as an MO terminal, and the second UE 601*b* receiving the call according to the call request may be referred to as an MT terminal. According to various embodiments, in the call setup procedure, the IMS protocol stack 1311*a* of the first UE 601*a* may transmit a SIP INVITE message to the second UE 601*b* in operation 1604, and the IMS protocol stack 1311*b* of the second UE 601*b* may transmit a SIP 180 RINGING message to the first UE 601*a* according to the reception of the SIP INVITE message in operation 1606. According to various embodiments, the IMS protocol stack 1311*b* of the second UE 601*b* may transmit a SIP 200 OK message to the first UE 601*a* in operation 1610 according to call answering in operation 1608. The message transmitted/received between the first UE 601*a* and the second UE 601*b* may be transmitted through a first NG-RAN 602*a*/first 5GC 700*a*, an IMS 609, and a second NG-RAN 602*b*/second 5GC 700*b*. According to various embodiments, as described above with reference to FIGS. 8 and 9, when the electronic device (e.g., the first UE 601*a*), which has completed registration with the IMS network 609 through the first NG-RAN 602*a* connected to the first 5GC 700*a* attempts a call, the first NG-RAN 602*a* may receive a quality-of-service (QoS) flow generation request for IMS voice call and, if the first NG-RAN 602*a* cannot support the QoS flow, it may perform EPS fallback or RAT fallback.

According to various embodiments, the second UE 601*b* may complete EPS fallback in operation 1612, and the first UE 601*a* may complete EPS fallback in operation 1614. If the EPS fallback is completed, the first UE 601*a* and the second UE 601*b* may proceed with a call (e.g., VoLTE call) (call ongoing) in operation 1616. According to various embodiments, the EPS fallback of operation 1612 or 1614 may include the redirection or handover and TAU operations described above with reference to FIGS. 8 and 9. The call ongoing operation in operation 1616 may refer, for example, to the call setup being completed and the user is on the phone or may refer, for example, to the state before the call is terminated.

According to various embodiments, a call drop may occur due to session expiration while the call is ongoing, and the first UE 601*a* may detect the call drop in operation 1618 and determine whether to drive the timer according to the call disconnected cause. For example, the IMS protocol stack 1311*a* of the first UE 601*a* may transmit a SIP BYE message including the session expiration to the second UE 601*b* in operation 1620. The IMS protocol stack 1311*a* of the first UE 601*a* may transmit the SIP BYE message through the CP 1320*a*, and the CP 1320*a* may identify that the call disconnected cause is session expiration through the SIP BYE message in operation 1622.

According to various embodiments, the first UE 601*a* may determine that the session expiration, which is the call disconnected cause, meets a condition set for driving the timer and may drive the timer for the set time in operation 1624. According to various embodiments, if a new call request is not received until the driven timer expires, the timer may expire in operation 1626, and the first UE 601*a* may perform L2N redirection or handover in operation 1628. The first UE 601*a* may register with the 5GC 700*a* according to the redirection or handover in operation 1630.

According to various embodiments, in operation 1632, the second UE 601*b* may identify that the call disconnected cause is the session expiration through the SIP BYE message transmitted from the first UE 601*a*. The second UE 601*b* may determine that the session expiration, which is the call disconnected cause, meets a condition set for driving the timer and may drive the timer for the set time in operation 1634. According to various embodiments, if a new call request is not received until the driven timer expires, the timer may expire in operation 1636, and the second UE 601*b* may perform L2N redirection or handover in operation 1638. The second UE 601*b* may register with the 5GC 700*b* according to the redirection or handover in operation 1640.

Figure 17:
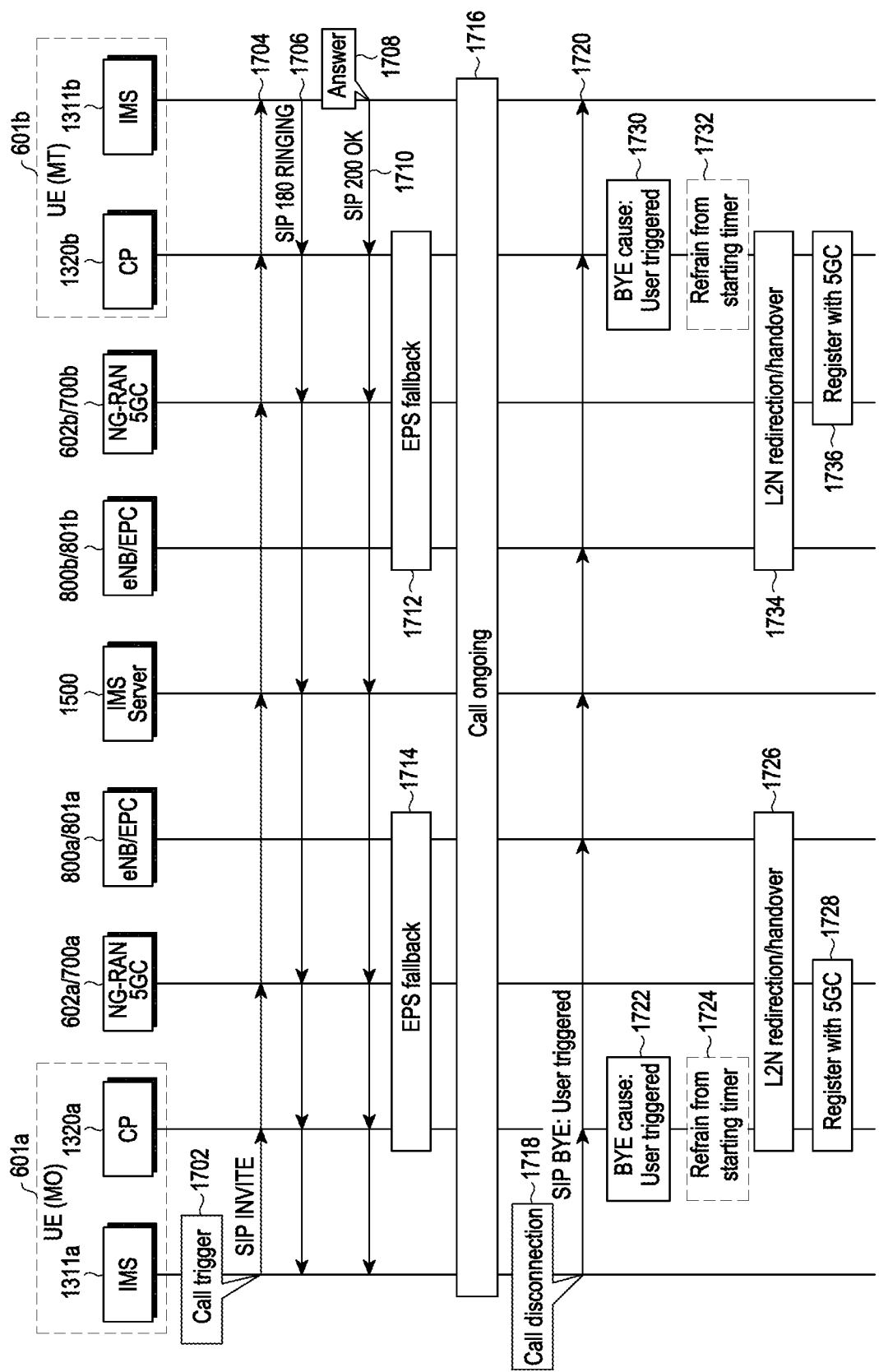
FIG. 17 is a signal flow diagram illustrating example call connection operations according to various embodiments.

FIG. 17 is a signal flow diagram illustrating example call connection operations according to various embodiments. Referring to FIG. 17, if a call is made from the first UE 601*a* to the second UE 601*b*, a call may be triggered through the IMS protocol stack 1311*a*, and a call setup may be performed in operation 1702. The first UE 601*a* requesting the call may be referred to as an MO terminal, and the second UE 601*b* receiving the call according to the call request may be referred to as an MT terminal. According to various embodiments, in the call setup procedure, the IMS protocol stack 1311*a* of the first UE 601*a* may transmit a SIP INVITE message to the second UE 601*b* in operation 1704, and the IMS protocol stack 1311*b* of the second UE 601*b* may transmit a SIP 180 RINGING message to the first UE 601*a* according to the reception of the SIP INVITE message in operation 1706. According to various embodiments, the IMS protocol stack 1311*b* of the second UE 601*b* may transmit a SIP 200 OK message to the first UE 601*a* in operation 1710 according to call answering in operation 1708. The message transmitted/received between the first UE 601*a* and the second UE 601*b* may be transmitted through a first NG-RAN 602*a*/first 5GC 700*a*, an IMS 609, and a second NG-RAN 602*b*/second 5GC 700*b*. According to various embodiments, as described above with reference to FIGS. 8 and 9, when the electronic device (e.g., the first UE 601*a*), which has completed registration with the IMS network 609 through the first NG-RAN 602*a* connected to the first 5GC 700*a* attempts a call, the first NG-RAN 602*a* may receive a quality-of-service (QoS) flow generation request for IMS voice call and, if the first NG-RAN 602*a* cannot support the QoS flow, it may perform EPS fallback or RAT fallback.

According to various embodiments, the second UE 601*b* may complete EPS fallback in operation 1712, and the first UE 601*a* may complete EPS fallback in operation 1714. If the EPS fallback is completed, the first UE 601*a* and the second UE 601*b* may proceed with a call (e.g., VoLTE call) (call ongoing) in operation 1716. According to various embodiments, the EPS fallback of operation 1712 or 1714 may include the redirection or handover and TAU operations described above with reference to FIGS. 8 and 9. The call ongoing operation in operation 1716 may refer, for example, to the call setup being completed and the user is on the phone or may refer, for example, to the state before the call is terminated.

According to various embodiments, a call termination may be caused by user triggering (e.g., the user presses the end button) in operation 1718. The first UE 601*a* may detect the call termination and determine whether to drive the timer according to the call disconnected cause. For example, according to the call termination, the IMS protocol stack 1311*a* of the first UE 601*a* may transmit a SIP BYE message including "User triggered" to the second UE 601*b* in operation 1720. The IMS protocol stack 1311*a* of the first UE 601*a* may transmit the SIP BYE message through the CP 1320*a*, and the CP 1320*a* may identify that the call disconnected cause is user triggering through the SIP BYE message in operation 1722.

According to various embodiments, the first UE 601*a* may determine that the user triggering, which is the call disconnected cause, does not meet a condition set for driving the timer and may not start the timer in operation 1724. According to various embodiments, the first UE 601*a* may perform L2N redirection or handover according to the call termination in operation 1726. The first UE 601*a* may register with the 5GC 700*a* according to the redirection or handover in operation 1728.

According to various embodiments, in operation 1730, the second UE 601*b* may identify that the call disconnected cause is user triggering through the SIP BYE message transmitted from the first UE 601*a*. The second UE 601*b* may determine that the user triggering, which is the call disconnected cause, does not meet a condition set for driving the timer and may not start the timer in operation 1732. According to various embodiments, the second UE 601*b* may perform L2N redirection or handover according to the call termination in operation 1734. The second UE 601*b* may register with the 5GC 700*b* according to the redirection or handover in operation 1736.

Figure 18:
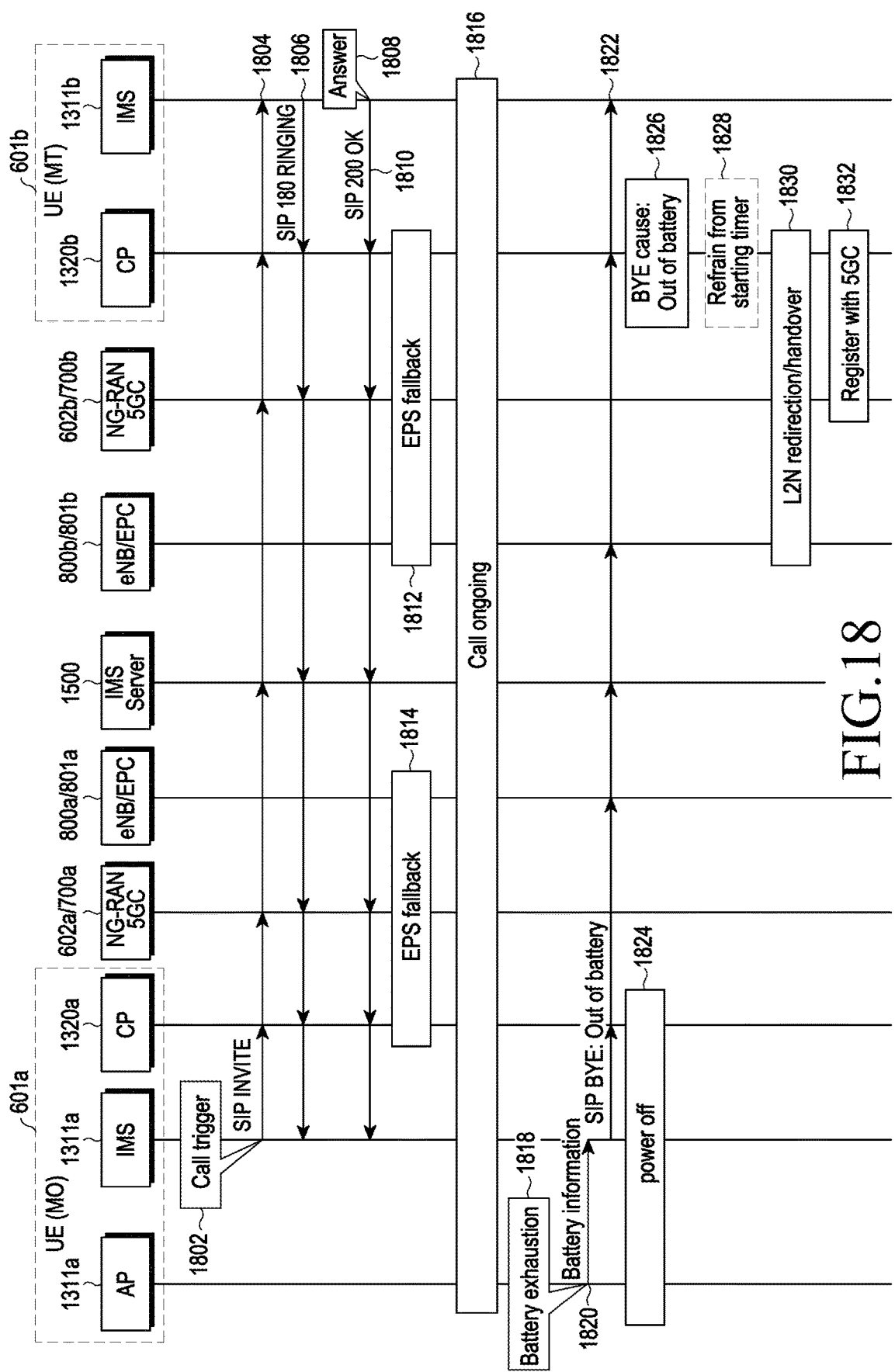
FIG. 18 is a signal flow diagram illustrating example call connection operations according to various embodiments.

FIG. 18 is a signal flow diagram illustrating example call connection operations according to various embodiments. Referring to FIG. 18, if a call is made from the first UE 601*a* to the second UE 601*b*, a call may be triggered through the IMS protocol stack 1311*a*, and a call setup may be performed in operation 1802. The first UE 601*a* requesting the call may be referred to as an MO terminal, and the second UE 601*b* receiving the call according to the call request may be referred to as an MT terminal. According to various embodiments, in the call setup procedure, the IMS protocol stack 1311*a* of the first UE 601*a* may transmit a SIP INVITE message to the second UE 601*b* in operation 1804, and the IMS protocol stack 1311*b* of the second UE 601*b* may transmit a SIP 180 RINGING message to the first UE 601*a* according to the reception of the SIP INVITE message in operation 1806. According to various embodiments, the IMS protocol stack 1311*b* of the second UE 601*b* may transmit a SIP 200 OK message to the first UE 601*a* in operation 1810 according to call answering in operation 1808. The message transmitted/received between the first UE 601*a* and the second UE 601*b* may be transmitted through a first NG-RAN 602*a*/first 5GC 700*a*, an IMS 609, and a second NG-RAN 602*b*/second 5GC 700*b*. According to various embodiments, as described above with reference to FIGS. 8 and 9, when the electronic device (e.g., the first UE 601*a*), which has completed registration with the IMS network 609 through the first NG-RAN 602*a* connected to the first 5GC 700*a* attempts a call, the first NG-RAN 602*a* may receive a quality-of-service (QoS) flow generation request for IMS voice call and, if the first NG-RAN 602*a* cannot support the QoS flow, it may perform EPS fallback or RAT fallback.

According to various embodiments, the second UE 601*b* may complete EPS fallback in operation 1812, and the first UE 601*a* may complete EPS fallback in operation 1814. If the EPS fallback is completed, the first UE 601*a* and the second UE 601*b* may proceed with a call (e.g., VoLTE call) (call ongoing) in operation 1816. According to various embodiments, the EPS fallback of operation 1812 or 1814 may include the redirection or handover and TAU operations described above with reference to FIGS. 8 and 9. The call ongoing operation in operation 1816 may refer, for example, to the call setup being completed and the user is on the phone or may refer, for example, to the state before the call is terminated.

According to various embodiments, the AP 1311*a* of the first UE 601*a* may identify the battery capacity and, upon identifying that the battery runs out (e.g., the remaining power of the battery is less than 1%) in operation 1818, may transmit battery information to the IMS protocol stack 1311*a* in operation 1820. For example, according to the battery information, the IMS protocol stack 1311*a* of the first UE 601*a* may transmit a SIP BYE message including "Out of battery" to the second UE 601*b* in operation 1822. The first UE 601*a* may perform a power-off procedure according to the discharge of the battery in operation 1824.

According to various embodiments, the IMS protocol stack 1311*a* of the first UE 601*a* may transmit the SIP BYE message through the CP 1320*a*. In operation 1826, the second UE 601*b* may identify that the call disconnected cause is the battery exhaustion of the first UE 601*a* through the SIP BYE message transmitted from the first UE 601*a* in operation 1826. The second UE 601*b* may determine that battery exhaustion, which is the call disconnected cause, does not meet a condition set for driving the timer and may not start the timer in operation 1828. For example, the second UE 601*b* may determine that it is difficult for the first UE 601*a*, which is the counterpart of the call, to proceed with the call any longer and may immediately perform redirection or handover without driving the timer. For example, the second UE 601*b* may perform L2N redirection or handover by identifying battery exhaustion as the call disconnected cause in operation 1830. The second UE 601*b* may register with the 5GC 700*b* according to the redirection or handover in operation 1832.

Figure 19A:
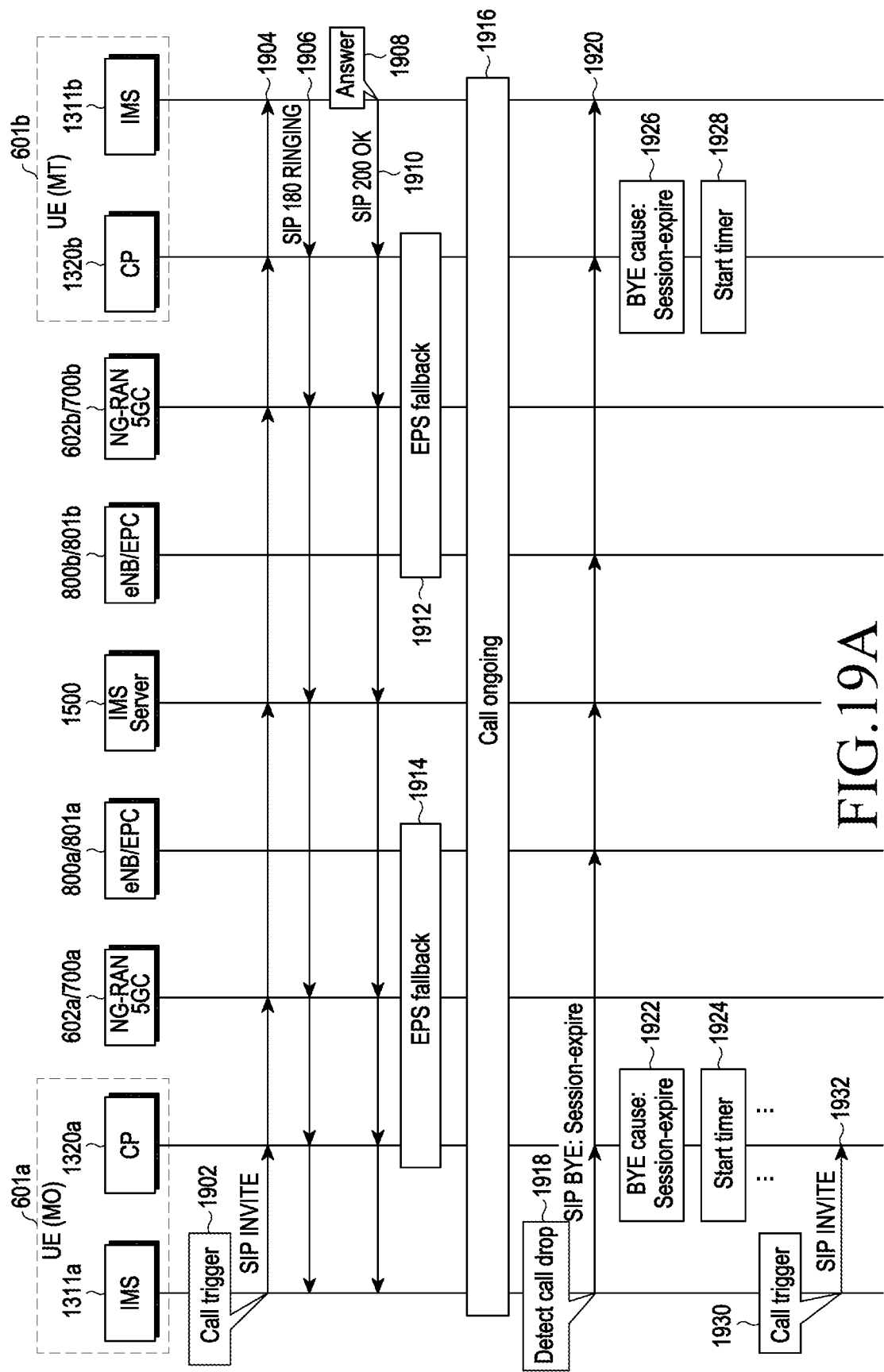
FIGS. 19A and 19B are signal flow diagrams illustrating example call connection operations according to various embodiments.
Figure 19B:
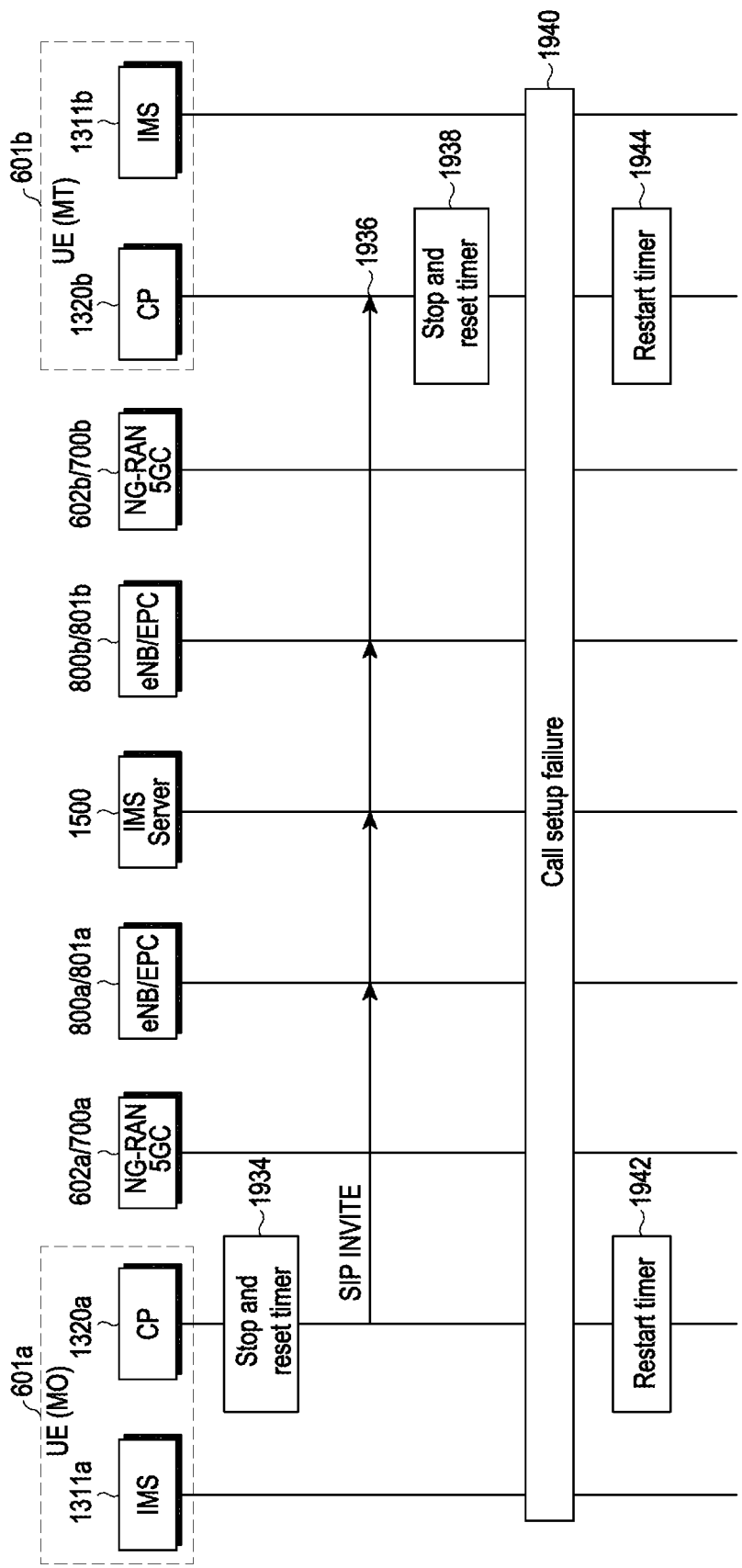

FIGS. 19A and 19B are signal flow diagrams illustrating example call connection operations according to various embodiments. Referring to FIGS. 19A and 19B, if a call is made from the first UE 601*a* to the second UE 601*b*, a call may be triggered through the IMS protocol stack 1311*a*, and a call setup may be performed in operation 1902. The first UE 601*a* requesting the call may be referred to as an MO terminal, and the second UE 601*b* receiving the call according to the call request may be referred to as an MT terminal. According to various embodiments, in the call setup procedure, the IMS protocol stack 1311*a* of the first UE 601*a* may transmit a SIP INVITE message to the second UE 601*b* in operation 1904, and the IMS protocol stack 1311*b* of the second UE 601*b* may transmit a SIP 180 RINGING message to the first UE 601*a* according to the reception of the SIP INVITE message in operation 1906. According to various embodiments, the IMS protocol stack 1311*b* of the second UE 601*b* may transmit a SIP 200 OK message to the first UE 601*a* in operation 1910 according to call answering in operation 1908. The message transmitted/received between the first UE 601*a* and the second UE 601*b* may be transmitted through a first NG-RAN 602*a*/first 5GC 700*a*, an IMS 609, and a second NG-RAN 602*b*/second 5GC 700*b*. According to various embodiments, as described above with reference to FIGS. 8 and 9, when the electronic device (e.g., the first UE 601*a*), which has completed registration with the IMS network 609 through the first NG-RAN 602*a* connected to the first 5GC 700*a* attempts a call, the first NG-RAN 602*a* may receive a quality-of-service (QoS) flow generation request for IMS voice call and, if the first NG-RAN 602a cannot support the QoS flow, it may perform EPS fallback or RAT fallback.

According to various embodiments, the second UE 601b may complete EPS fallback in operation 1912, and the first UE 601a may complete EPS fallback in operation 1914. If the EPS fallback is completed, the first UE 601a and the second UE 601b may proceed with a call (e.g., VoLTE) (call ongoing) in operation 1916. According to various embodiments, the EPS fallback of operation 1912 or 1914 may include the redirection or handover and TAU operations described above with reference to FIGS. 8 and 9. The call ongoing operation in operation 1916 may refer, for example, to the call setup being completed and the user is on the phone or may refer, for example, to the state before the call is terminated.

According to various embodiments, a call drop may occur due to session expiration while the call is ongoing, and the first UE 601a may detect the call drop in operation 1918 and determine whether to drive the timer according to the call disconnected cause. For example, the IMS protocol stack 1311a of the first UE 601a may transmit a SIP BYE message including the session expiration to the second UE 601b in operation 1920. The IMS protocol stack 1311a of the first UE 601a may transmit the SIP BYE message through the CP 1320a, and the CP 1320a may identify that the call disconnected cause is session expiration through the SIP BYE message in operation 1922.

According to various embodiments, the first UE 601a may determine that the session expiration, which is the call disconnected cause, meets a condition set for driving the timer and may drive the timer for the set time in operation 1924. According to various embodiments, in operation 1926, the second UE 601b may identify that the call disconnected cause is the session expiration through the SIP BYE message transmitted from the first UE 601a. The second UE 601b may determine that the session expiration, which is the call disconnected cause, meets a condition set for driving the timer and may drive the timer for the set time in operation 1928.

According to various embodiments, during the timer operation, the first UE 601a does not return to the first 5GC 700a but may stay on the first EPC 801a while maintaining the LTE registration state. According to various embodiments, if a call is retried by the user before the running timer expires so that a call is triggered in operation 1930, a call setup may be performed. According to various embodiments, if a call is retried before the timer expires, a call setup operation for VoLTE may be performed in the state of being connected to the LTE communication network. For example, the IMS protocol stack 1311a of the first UE 601a may transmit a SIP INVITE message to the second UE 601b through the CP 1320a according to the call triggering in operation 1932. The CP 1320a may receive the SIP INVITE message from the IMS protocol stack 1311a and stop and reset the running timer in operation 1934. The CP 1320a may transmit the SIP INVITE message received from the IMS protocol stack 1311a to the second UE 601b in operation 1936.

According to various embodiments, the CP 1320b of the second UE 601b receiving the SIP INVITE message transmitted from the first UE 601a may stop and reset the currently running timer in operation 1938. According to various embodiments, if normal call setup is not completed in the call setup process between the first UE 601a and the second UE 601b in operation 1940, the first UE 601a or the second UE 601b may restart the timer in operation 1942 or operation 1944. The restart of the timer and the call setup operation may be repeatedly performed a set number of times (e.g., 3 times) considering the number of reattempts due to a call setup failure.

Figure 20:
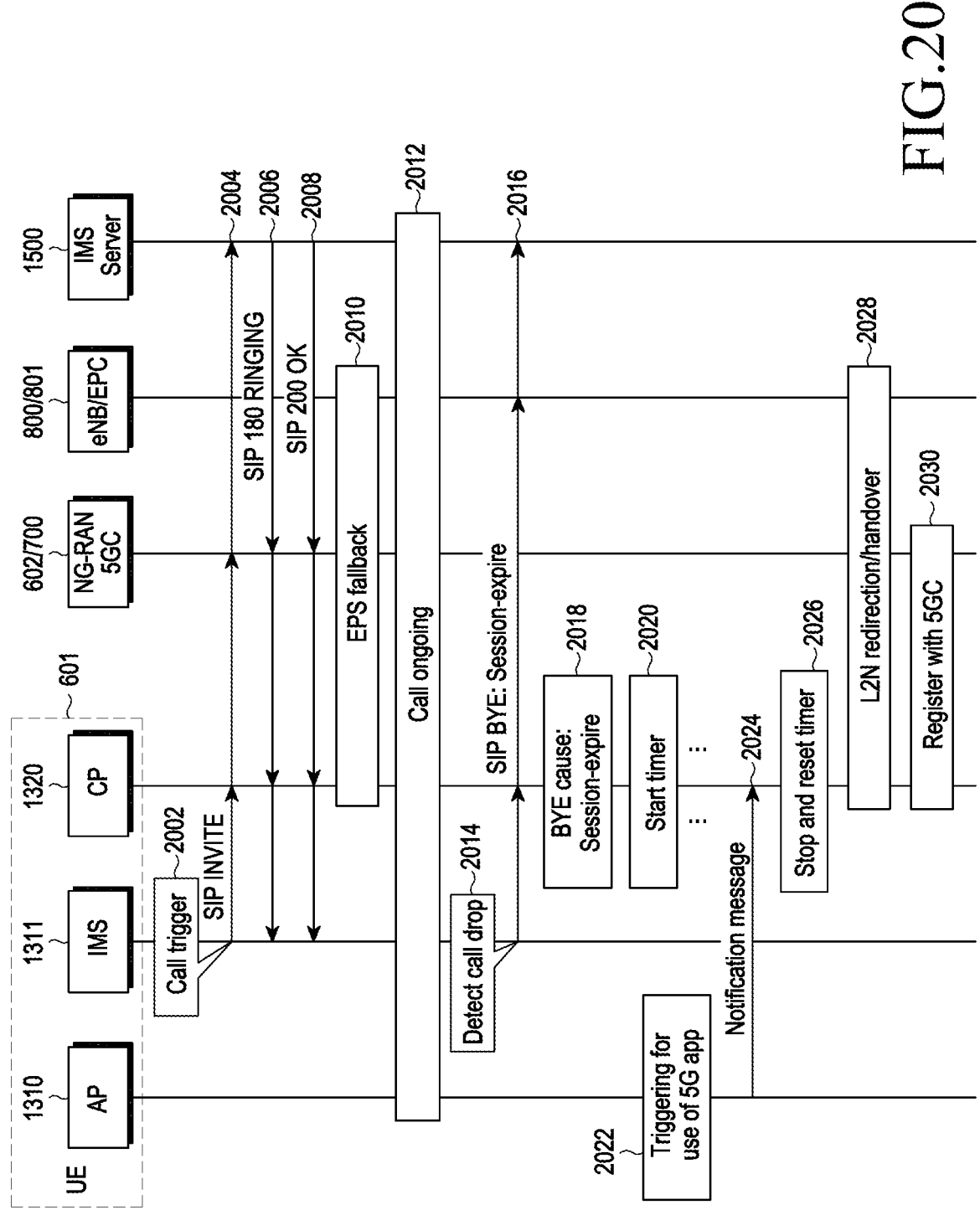
FIG. 20 is a signal flow diagram illustrating example call connection operations according to various embodiments.

FIG. 20 is a signal flow diagram illustrating example call connection operations according to various embodiments. Referring to FIG. 20, if a call is made from the UE 601a to the counterpart UE, a call may be triggered through the IMS protocol stack 1311, and a call setup may be performed in operation 2002. The UE 601a requesting the call may be referred to as an MO terminal, and the counterpart UE receiving the call according to the call request may be referred to as an MT terminal. According to various embodiments, in the call setup procedure, the IMS protocol stack 1311 of the UE 601 may transmit a SIP INVITE message to the counterpart UE through the IMS server 1500 in operation 2004, and the counterpart UE may transmit the SIP 180 RINGING message to the UE 601 through the IMS server 1500 according to reception of the SIP INVITE message in operation 2006. According to various embodiments, the counterpart UE may transmit a SIP 200 OK message to the UE 601 through the IMS server 1500 according to a call answer in operation 2008. According to various embodiments, as described above with reference to FIGS. 8 and 9, when the electronic device (e.g., the UE 601), which has completed registration with the IMS network 609 through the NG-RAN 602 connected to the 5GC 700 attempts a call, the NG-RAN 602 may receive a quality-of-service (QoS) flow generation request for IMS voice call and, if the NG-RAN 602a cannot support the QoS flow, it may perform EPS fallback or RAT fallback.

According to various embodiments, the UE 601 may complete EPS fallback in operation 2010. If the EPS fallback is completed, the UE 601 and the counterpart UE may proceed with a call (e.g., VoLTE call) (call ongoing) in operation 2012. According to various embodiments, the EPS fallback of operation 2010 may include the redirection or handover and TAU operations described above with reference to FIGS. 8 and 9. The call ongoing operation in operation 2012 may refer, for example, to the call setup being completed and the user is on the phone or may refer, for example, to the state before the call is terminated.

According to various embodiments, a call drop may occur due to session expiration while the call is ongoing, and the UE 601 may detect the call drop in operation 2014 and determine whether to drive the timer according to the call disconnected cause. For example, the IMS protocol stack 1311 of the UE 601 may transmit a SIP BYE message including the session expiration to the counterpart UE in operation 2016. The IMS protocol stack 1311 of the UE 601 may transmit the SIP BYE message through the CP 1320, and the CP 1320 may identify that the call disconnected cause is session expiration through the SIP BYE message in operation 2018. According to various embodiments, the UE 601 may determine that the session expiration, which is the call disconnected cause, meets a condition set for driving the timer and may drive the timer for the set time in operation 2020. According to various embodiments, the AP 1310 may detect triggering for use of the 5G app in operation 2022. The AP 1310 may notify that use of the application using 5G communication has been attempted by transmitting a notification message to the CP 1320 according to the detection of triggering for using the 5G app in operation 2024. For example, the notification message may be an interface-only message between the AP 1310 and the CP 1320. According to various embodiments, the CP 1320 receiving the notification message may stop and reset the timer in operation 2026 and may perform L2N redirection or handover in operation 2028. The UE 601 may register with the 5GC 700 according to the redirection or handover in operation 2030.

Figure 21:
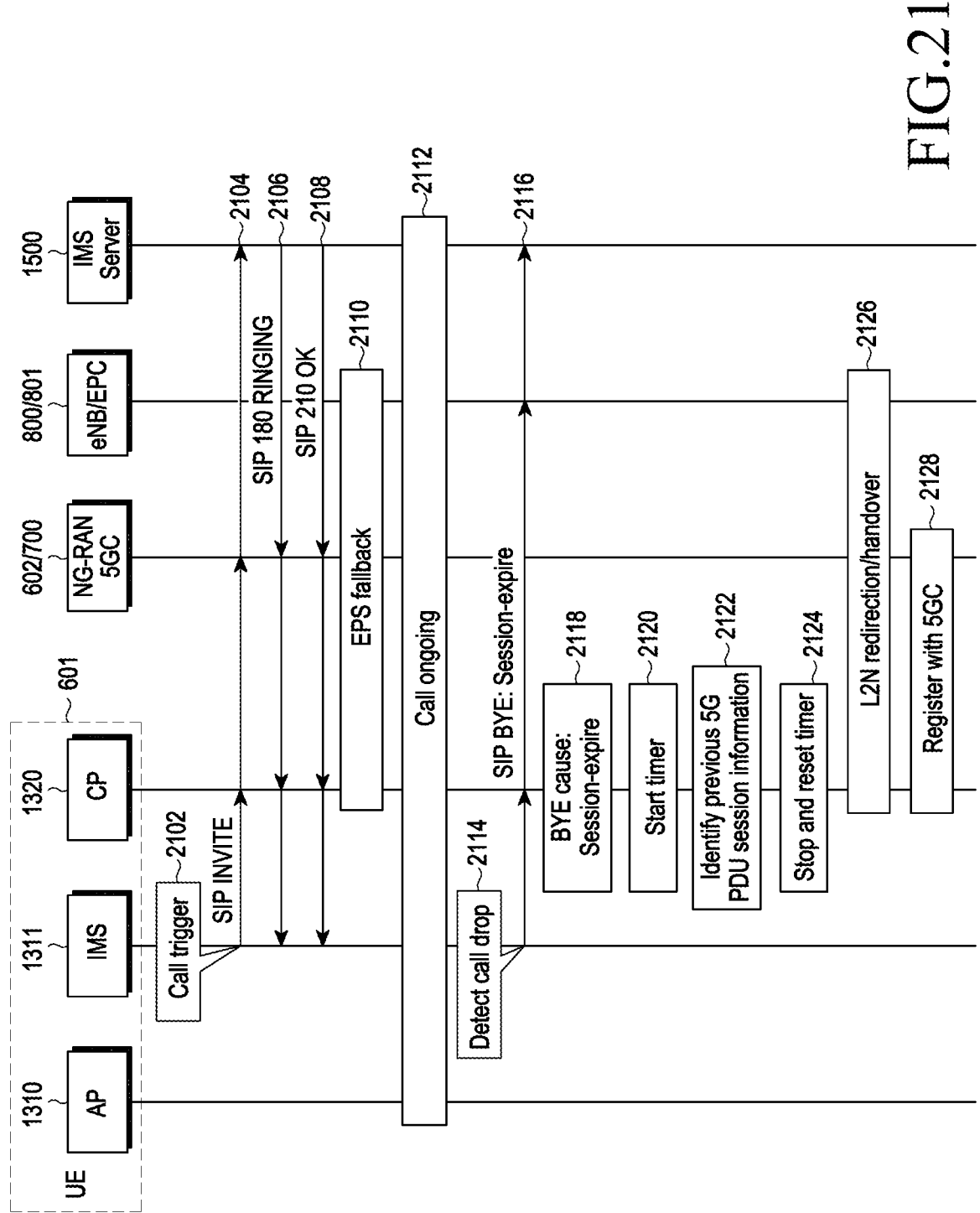
FIG. 21 is a signal flow diagram illustrating example call connection operations according to various embodiments.

FIG. 21 is a signal flow diagram illustrating example call connection operations according to various embodiments. Referring to FIG. 21, if a call is made from the UE 601a to the counterpart UE, a call may be triggered through the IMS protocol stack 1311, and a call setup may be performed in operation 2102. Since operations 2104 to 2120 are identical or similar to operations 2004 to 2020 of FIG. 20, no detailed description thereof is given below.

According to various embodiments, while the timer is running, the CP 1320 may identify previous 5G PDU session information in operation 2122. For example, the UE 601 may identify the previous PDU session information for the application using 5G communication used in the state of having been registered in the 5G communication network before EPS fallback internally in the CP while driving the timer operation according to the call disconnected cause in the state connected to the LTE communication network by EPS fallback 2110. According to the identification of the previous PDU session information for the application using 5G communication, the CP 1320 by itself may stop and reset the timer running for establishing the PDU session connection in operation 2124. According to various embodiments, the PDU session information may be UE route selection policy (URSP) information including the 5G app, a 5G-dedicated data network name (DNN), and NSSAI. According to various embodiments, the CP 1320 may perform L2N redirection or handover in operation 2126. The UE 601 may register with the 5GC 700 according to the redirection or handover in operation 2128.

Figure 22:
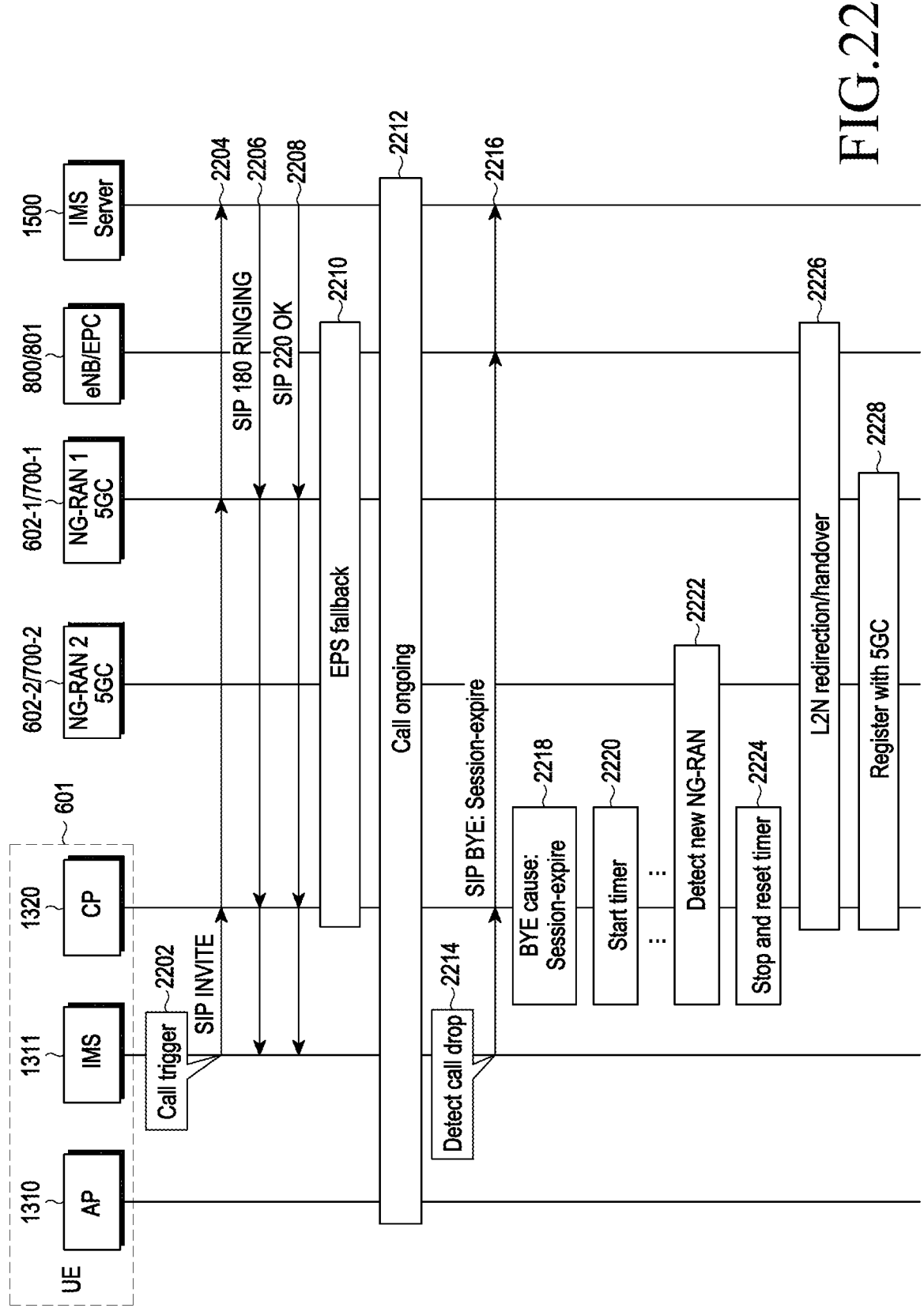
FIG. 22 is a signal flow diagram illustrating example call connection operations according to various embodiments.

FIG. 22 is a signal flow diagram illustrating call connection operations according to various embodiments. Referring to FIG. 22, if a call is made from the UE 601a to the counterpart UE, a call may be triggered through the IMS protocol stack 1311, and a call setup may be performed in operation 2202. Since operations 2204 to 2220 are identical or similar to operations 2004 to 2020 of FIG. 20, no detailed description thereof is given below.

According to various embodiments, while the timer is running, the CP 1320 may detect a new NG-RAN (hereinafter referred to as a second NG-RAN 602-2) rather than the previously connected first NG-RAN 602-1 in operation 2222. For example, if detecting a second NG-RAN 602-2, not the first NG-RAN 602-1 previously connected, while driving the timer in the state connected to the LTE communication network by EPS fallback 2210, the CP 1320 may stop and reset the running timer in operation 2224. According to various embodiments, the CP 1320 may perform L2N redirection or handover to the detected second NG-RAN 602-2 in operation 2226. The UE 601 may register with the 5GC 700 corresponding to the second NG-RAN 602-2 according to the redirection or handover in operation 2228.

Figure 23:
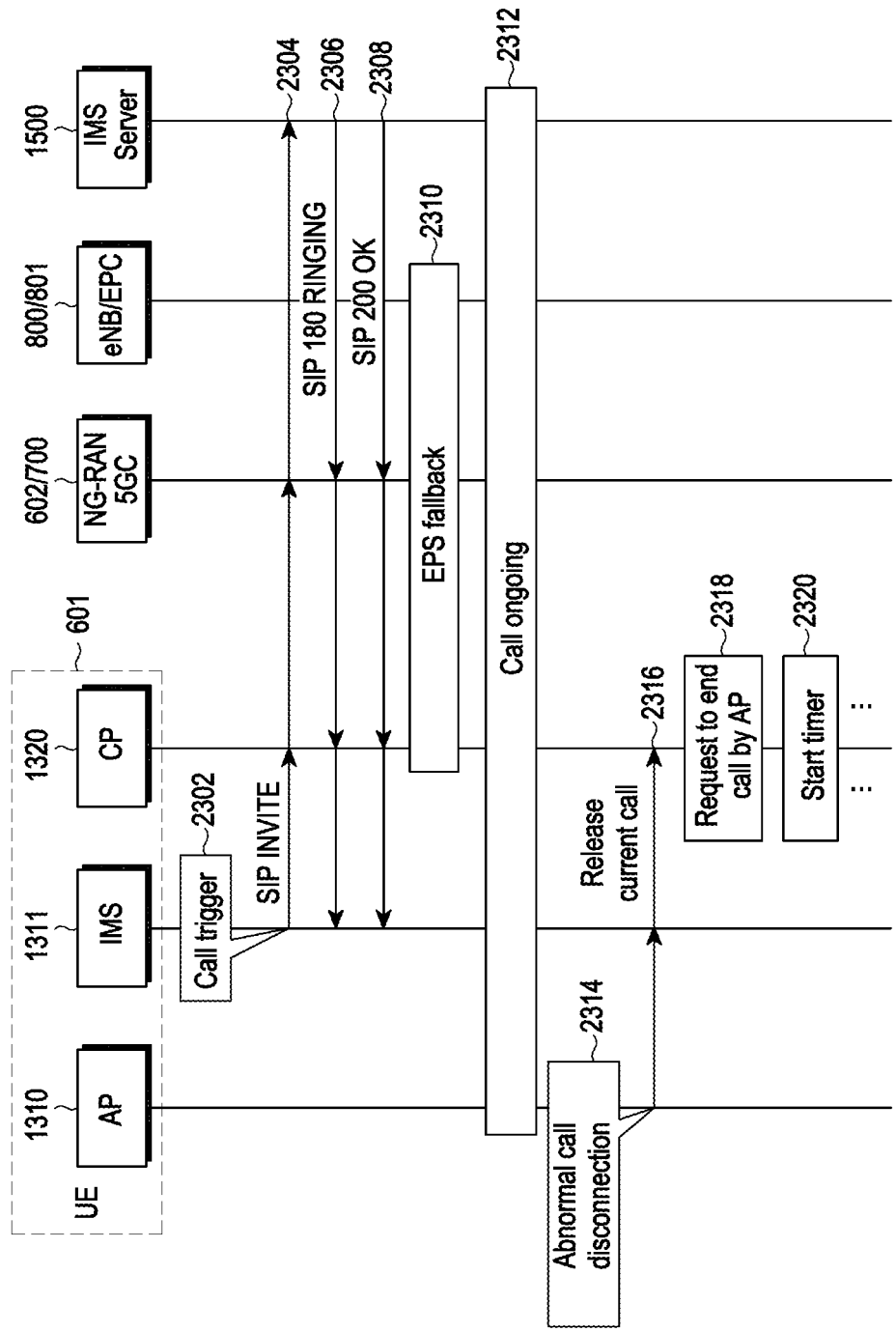
FIG. 23 is a signal flow diagram illustrating example call connection operations according to various embodiments.

FIG. 23 is a signal flow diagram illustrating example call connection operations according to various embodiments. Referring to FIG. 23, if a call is made from the UE 601a to the counterpart UE, a call may be triggered through the IMS protocol stack 1311, and a call setup may be performed in operation 2302. Since operations 2304 to 2320 are identical or similar to operations 2004 to 2020 of FIG. 20, no detailed description thereof is given below.

According to various embodiments, the AP 1310 of the UE 601 may identify an abnormal call end due to other causes in operation 2314. The AP 1310 may request the IMS protocol stack 1311 and the CP 1320 to release the current call in operation 2316. The CP 1320 may identify the call release request transmitted from the AP 1310 and terminate the call in operation 2318. According to various embodiments, the CP 1320 may drive the timer for deferring the connection to the 5GC 700 in response to the call termination in operation 2320.

Figure 24A:
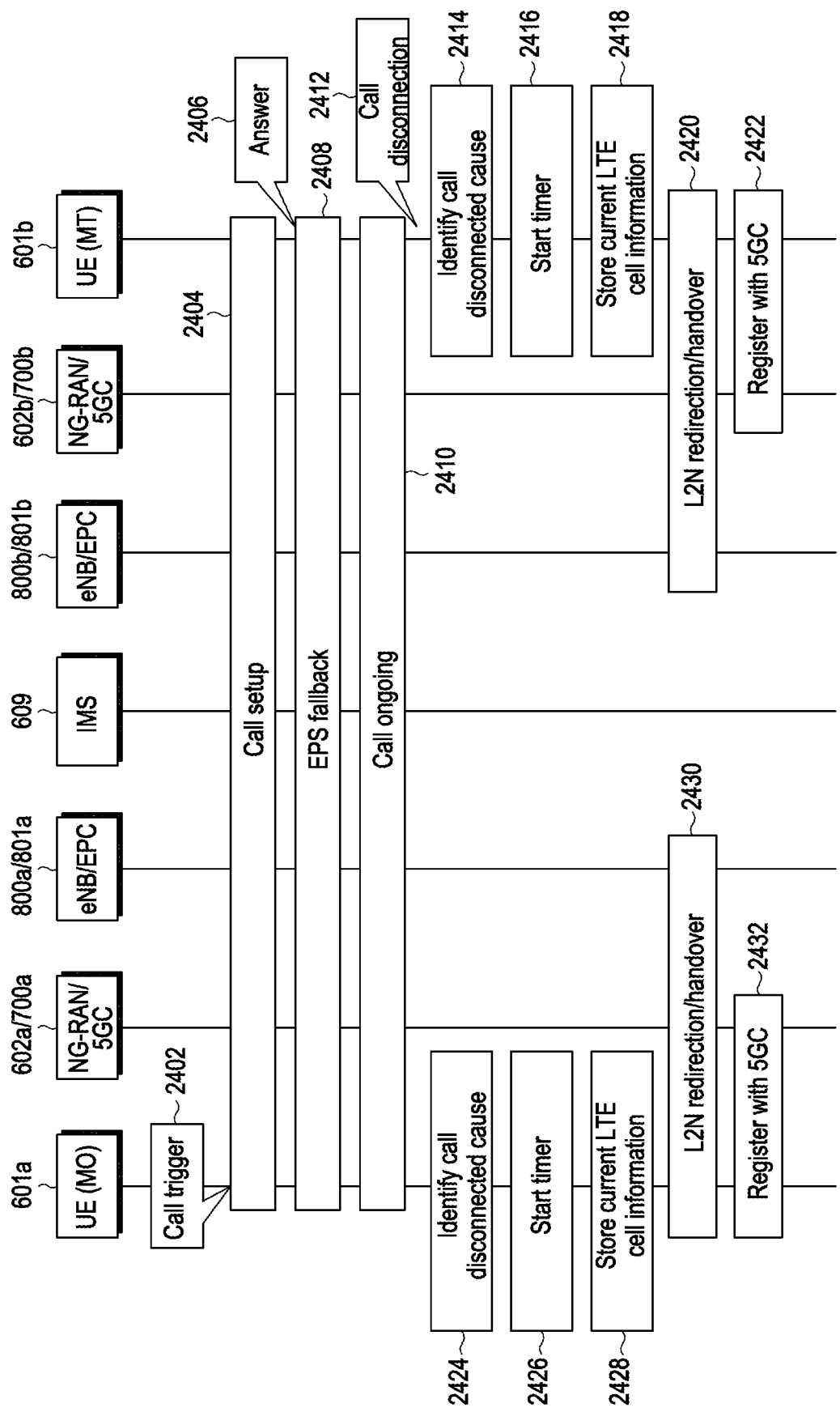
FIGS. 24A and 24B are signal flow diagrams illustrating example call connection operations according to various embodiments.
Figure 24B:
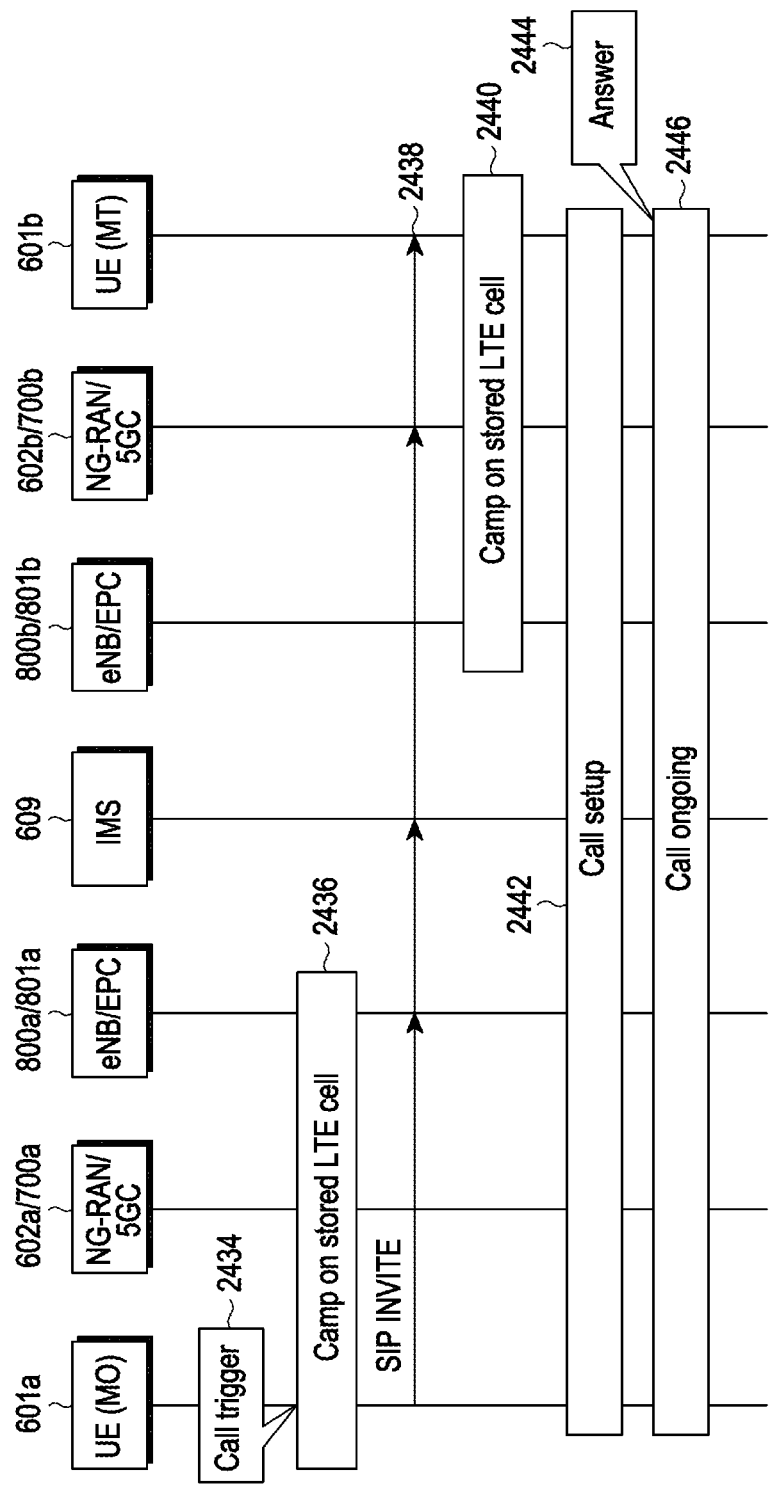

FIGS. 24A and 24B are signal flow diagrams illustrating example call connection operations according to various embodiments. Referring to FIGS. 24A and 24B, if the first UE 601a makes a call to the second UE 601b, a call may be triggered in operation 2402, and a call may be set up in operation 2404. The first UE 601a requesting the call may be referred to as an MO terminal, and the second UE 601b receiving the call according to the call request may be referred to as an MT terminal. According to various embodiments, the call setup in operation 2404 may include the operations of transmitting the SIP INVITE (804, 904), SIP 180 RINGING (806, 906), and SIP 200 OK (808, 908) according to answering call in operation 2406, as described above in connection with FIGS. 8 and 9. According to various embodiments, the call setup may further include receiving an ACK from the first UE 601a after the second UE 601b transmits a SIP 200 OK. The message transmitted/received between the first UE 601a and the second UE 601b may be transmitted through a first NG-RAN 602a/first 5GC 700a, an IMS 609, and a second NG-RAN 602b/second 5GC 700b. According to various embodiments, as described above with reference to FIGS. 8 and 9, when the electronic device (e.g., the first UE 601a), which has completed registration with the IMS network 609 through the first NG-RAN 602a connected to the first 5GC 700a attempts a call, the first NG-RAN 602a may receive a quality-of-service (QoS) flow generation request for IMS voice call and, if the first NG-RAN 602a cannot support the QoS flow, it may perform EPS fallback or RAT fallback. According to various embodiments, after completing the EPS fallback in operation 2408, the first UE 601a may perform a call (e.g., VoLTE call) ongoing in operation 2410. According to various embodiments, the EPS fallback of operation 2408 may include the redirection or handover and TAU operations described above with reference to FIGS. 8 and 9. The call ongoing operation in operation 2410 may refer, for example, to the call setup being completed and the user is on the phone or may refer, for example, to the state before the call is terminated. According to various embodiments, if a call end (exit call) situation occurs in operation 2412 while the call is ongoing, the second UE 601b may identify a call disconnected cause (call end cause) in operation 2414. The call end cause may be set as shown in Table 1 above but is not limited thereto. For example, the call disconnected causes may include at least one of when the user presses the end button, when the call is terminated due to a real-time transport protocol (RTP) timeout, when the call is terminated as the session expires, switch to the 3G communication network during the call, the end of video due to low battery, the end of voice due to battery exhaustion, or other cases. According to various embodiments, if the identified call disconnected cause corresponds to a designated type, the second UE 601b may drive a timer in operation 2416. According to various embodiments, the second UE 601b may store current LTE cell information in the memory and may return to the second 5GC 700b in operation 2418. For example, the second UE 601b may perform L2N redirection or handover to the second NG-RAN 602b in operation 2420. The UE 601 may register with the second 5GC 700b corresponding to the second NG-RAN 602b according to the redirection or handover in operation 2422.

According to various embodiments, the first UE 601*a* may identify the call disconnected cause in operation 2424 and, if the identified call disconnected cause corresponds to a designated type, the first UE 601*a* may drive the timer in operation 2426. According to various embodiments, the first UE 601*a* may store, in the memory, information for the LTE cell where it is currently camping, in an LTE stored cell list, along with driving the timer and may immediately return to the first 5GC 700*a* in operation 2428. For example, the first UE 601*a* may perform L2N redirection or handover to the first NG-RAN 602*a* in operation 2430. The UE 601 may register with the first 5GC 700*a* corresponding to the first NG-RAN 602*a* according to the redirection or handover in operation 2432.

According to various embodiments, if a call is retried by the user before the running timer expires so that a call is triggered in operation 2434, a call setup may be performed. According to various embodiments, if a call is retried before the timer expires, the first UE 601*a* may select the LTE cell, first, stored in the memory in the form of system selection and attempt to camp on in operation 2436. If registration with the LTE communication network is completed according to the camp-on attempt, the first UE 601*a* may transmit a SIP INVITE message to the IMS network 609 through the EPC 801*a* and the eNB 800*a* corresponding to the stored LTE cell in operation 2438. The second UE 601*b* may receive the SIP INVITE message from the first UE 601*a* before the timer expires and may camp on the LTE cell stored in the memory in operation 2440. The first UE 601*a* and the second UE 601*b* may perform a call setup operation for VoLTE in the state connected to the LTE communication network in operation 2442. According to various embodiments, the call setup in operation 2442 may include the operations of transmitting the SIP INVITE, SIP 180 RINGING, and SIP 200 OK according to answering call in operation 2444. According to various embodiments, the call setup may further include receiving an ACK from the first UE 601*a* after the second UE 601*b* transmits a SIP 200 OK. If the call setup is completed, the first UE 601*a* and the second UE 601*b* may proceed with a call (call ongoing) in operation 2446.

According to various embodiments, if a call is not retried until the timer driven in operation 2416 or operation 2426 expires, the first UE 601*a* or the second UE 601*b* may initialize the list of LTE cells stored in the memory.

Figure 25:
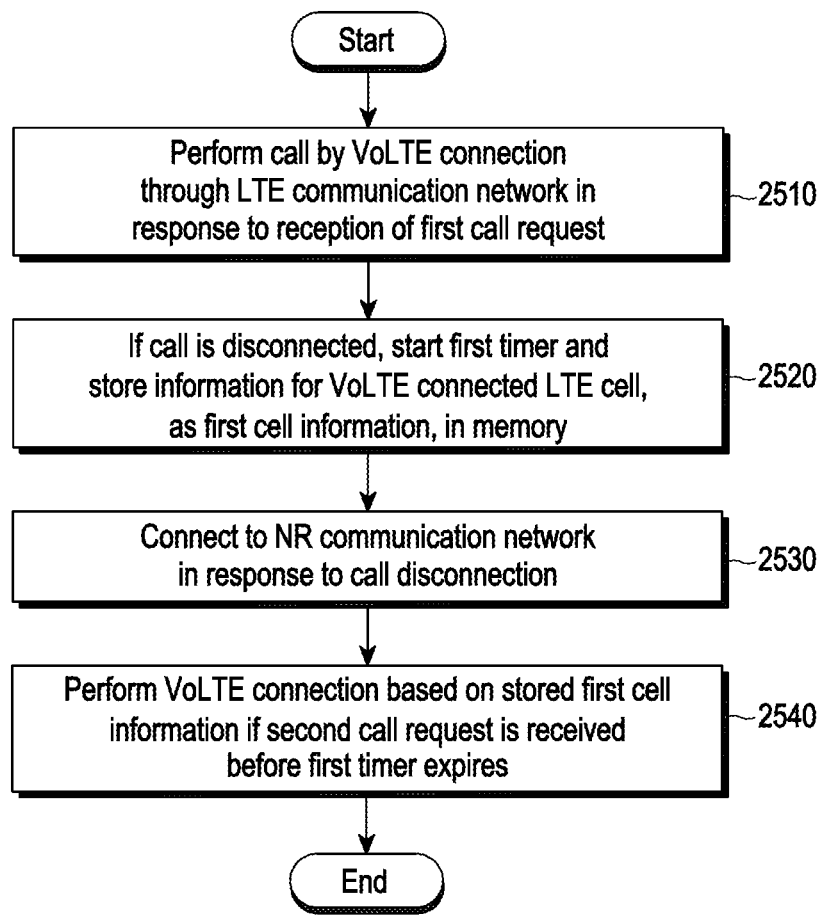
FIG. 25 is a flowchart illustrating example operations of an electronic device according to various embodiments.

FIG. 25 is a flowchart illustrating example operations of an electronic device according to various embodiments. Referring to FIG. 25, an electronic device (e.g., the electronic device 101 of FIG. 1 or the first UE 601*a* of FIG. 11) may receive a first call request in the state of being connected to the first communication network (e.g., an NR communication network). According to various embodiments, in operation 2510, in response to the reception of the first call request, the electronic device may make a call by connecting an IMS voice service (e.g., VoLTE) through a second communication network (e.g., an LTE communication network). The operation of switching from the first communication network to the second communication network to perform an IMS voice service may include an EPS fallback operation. For example, if the connection of VoNR fails, the electronic device may proceed with EPS fallback to conduct a call by connection of VoLTE.

According to various embodiments, if the call connection is interrupted (e.g., if the call is terminated or disconnected) in operation 2520, the electronic device may identify information related to the call disconnected cause. For example, the information related to the call disconnected cause may include at least part of Table 1 described above. If the identified information related to the call disconnected cause meets a designated condition (e.g., if corresponding to a specific call disconnected cause), the electronic device may drive the first timer. According to various embodiments, the electronic device may store information for the LTE cell connected to the second communication network (e.g., the LTE communication network), as first cell information, in the memory along with driving the timer, in operation 2520.

According to various embodiments, in operation 2530, the electronic device may connect to the first communication network (e.g., the NR communication network) in response to the call disconnection. According to various embodiments, in operation 2540, if a second call request is received from the electronic device before the running first timer expires, the electronic device may initialize the first timer and perform connection to the second communication network based on the first cell information stored in the memory. For example, the electronic device may connect to the second communication network (e.g., the LTE communication network) based on the first cell information and perform IMS voice service (e.g., VoLTE) connection through the connected second communication network.

According to various embodiments, if the electronic device fails to register with the LTE communication network or, after succeeding in registration with the LTE communication network, fails in call setup before the first timer expires, the terminal may return to the 5GC 700 along with the restart of the timer. According to various embodiments, after succeeding in both registration with the LTE communication network and call setup, the electronic device may initialize the LTE cell information stored in the memory and perform subsequent call processes.

According to various embodiments, if use of the 5G app is tried or a new NG-RAN is discovered in a situation where there is no call attempt while the first timer is running, or if an LTE cell stored in the LTE cell list is deleted from the neighbor cell list or a signal for the cell is not measured, the electronic device may initialize the first timer and the LTE stored cell list and maintain the registered state of the 5G communication network. According to various embodiments, even when the first timer expires, the electronic device may initialize the first timer and the LTE cell list and maintain the registered state of the 5G communication network.

Figure 26:
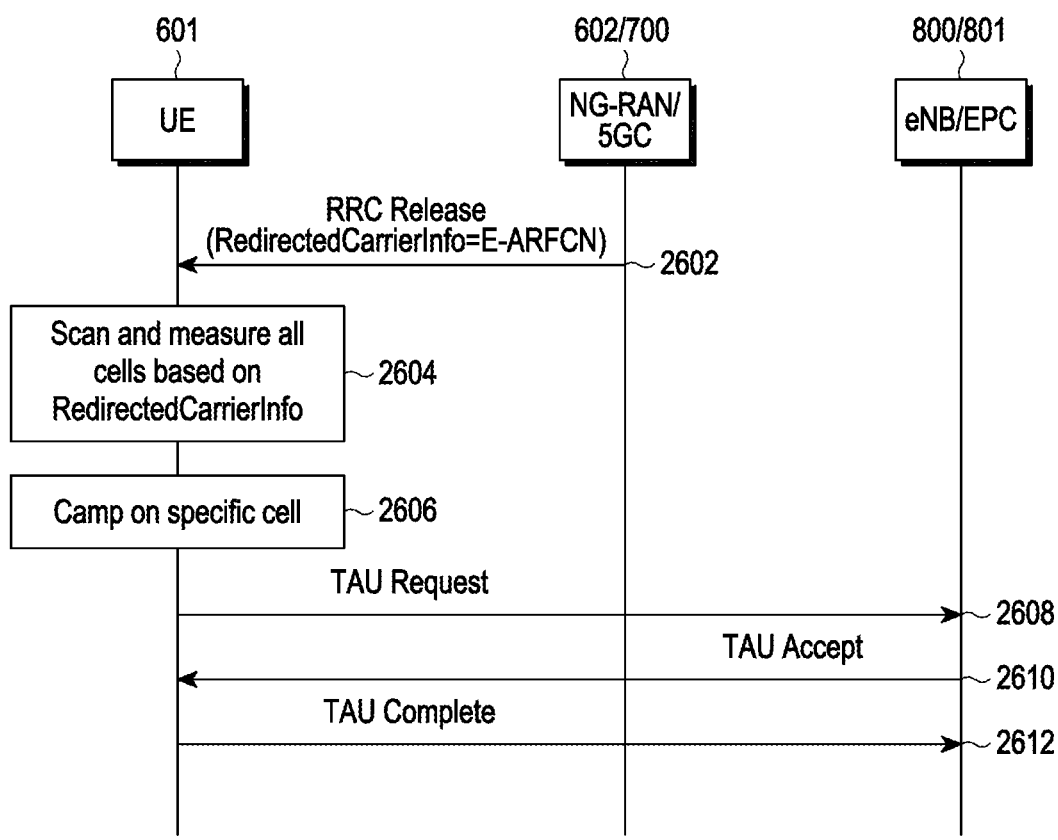
FIG. 26 is a signal flow diagram illustrating example call connection operations according to various embodiments.

FIG. 26 is a signal flow diagram illustrating example call connection operations according to various embodiments. Referring to FIG. 26, if redirection-based EPS fallback is configured in the 5G communication network (e.g., the NG-RAN 602 and the 5GC 700), the 5G communication network may include a specific LTE E-ARFCN (absolute radio frequency channel number) in an RRC release message and transmit it to the UE 601 in operation 2602. The UE 601 may scan and measure all cells based on RedirectedCarrierInfo in operation 2604. The UE 601 may move to the LTE communication network, perform a cell scan on the corresponding E-ARFCN, and then proceed with a TAU procedure for camping on any one cell in operation 2606. For example, the UE 601 may perform a TAU procedure with the corresponding LTE communication network (e.g., the eNB 800/EPC 801) according to the cell scan. For example, the UE 601 may transmit a TAU request to the LTE communication network in operation 2608 and, in operation 2610, may receive a TAU accept from the LTE communication network. The UE 601 may receive the TAU accept and, in operation 2612, may complete the inter-RAT handover process for EPS fallback by transmitting a TAU complete to the LTE communication network.

Referring to FIG. 26, according to the redirection-based EPS fallback operation, until an RRC release for redirection is received after call setup starts, it may take time, and it may be required to scan all cells for a specific E-ARFCN in the RedirectedCarrierInfo specified in the message.

Figure 27:
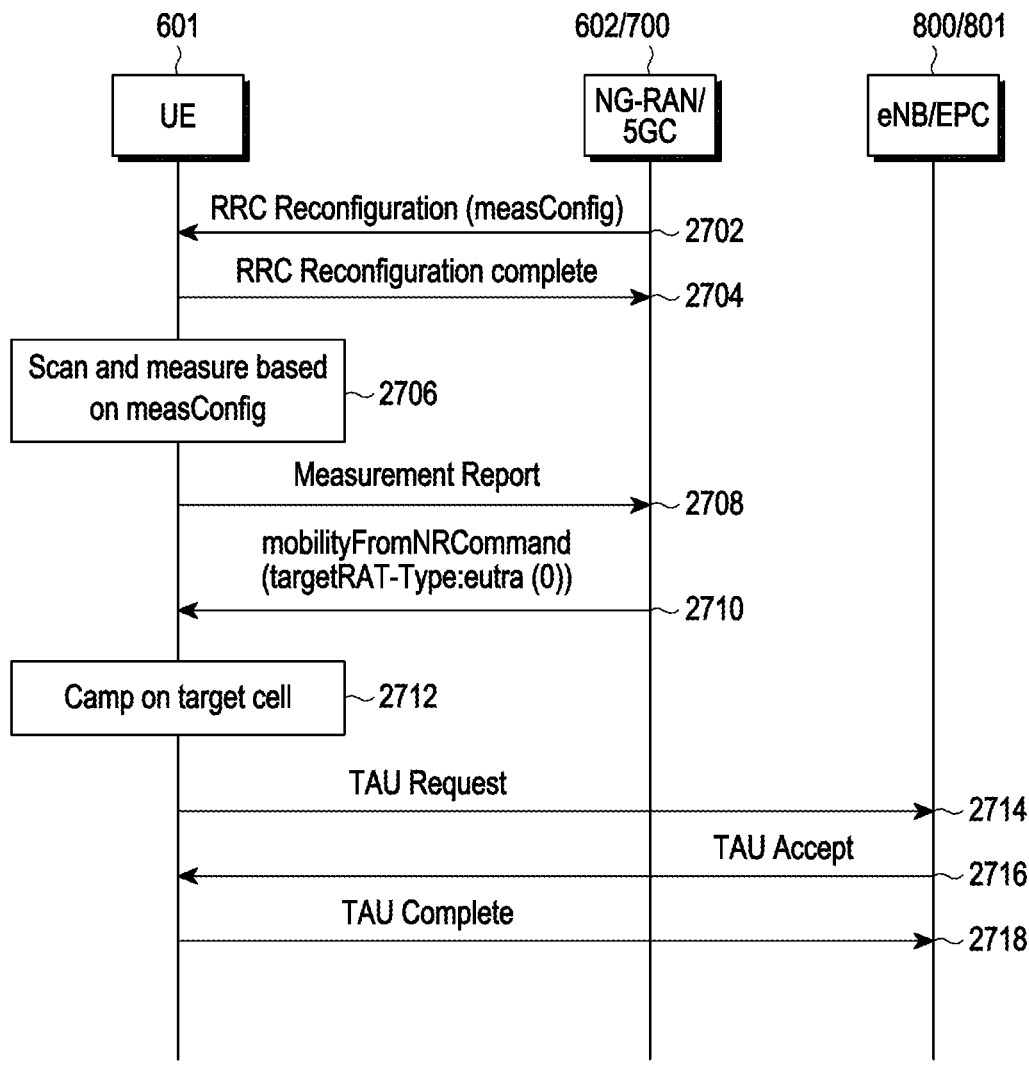
FIG. 27 is a signal flow diagram illustrating example call connection operations according to various embodiments.

FIG. 27 is a signal flow diagram illustrating example call connection operations according to various embodiments. Referring to FIG. 27, according to various embodiments, if handover-based EPS fallback is set, the 5G communication network (e.g., the NG-RAN 602 and the 5GC 700) may transmit a measConfig for LTE band measurement to the UE 601 through RRC reconfiguration in operation 2702. According to the reception of the RRC reconfiguration, the UE 601 may transmit a RRC reconfiguration complete to the 5G communication network in operation 2704. According to various embodiments, the UE 601 may perform scan and measurement based on the measConfig included in the RRC reconfiguration in operation 2706 and may report the measured information to the NG-RAN 602 through a measurement report (MR) message in operation 2708. Based on the received MR, the NG-RAN 602 and the 5GC 700 may transmit information for the LTE band and cell to which the UE 601 is to be handed over to the UE 601 through a mobilityFromNRCommand in operation 2710.

According to various embodiments, the UE 601 may camp on the target cell based on the corresponding LTE band and cell information in operation 2712. For example, the UE 601 may perform a tracking area update (TAU) procedure with the LTE communication network (e.g., the eNB 800/EPC 801). For example, the UE 601 may transmit a TAU request to the LTE communication network in operation 2714 and, in operation 2716, may receive a TAU accept from the LTE communication network. The UE 601 may receive the TAU accept and, in operation 2718, may complete the inter-RAT handover process for EPS fallback by transmitting a TAU complete to the LTE communication network.

Figure 28:
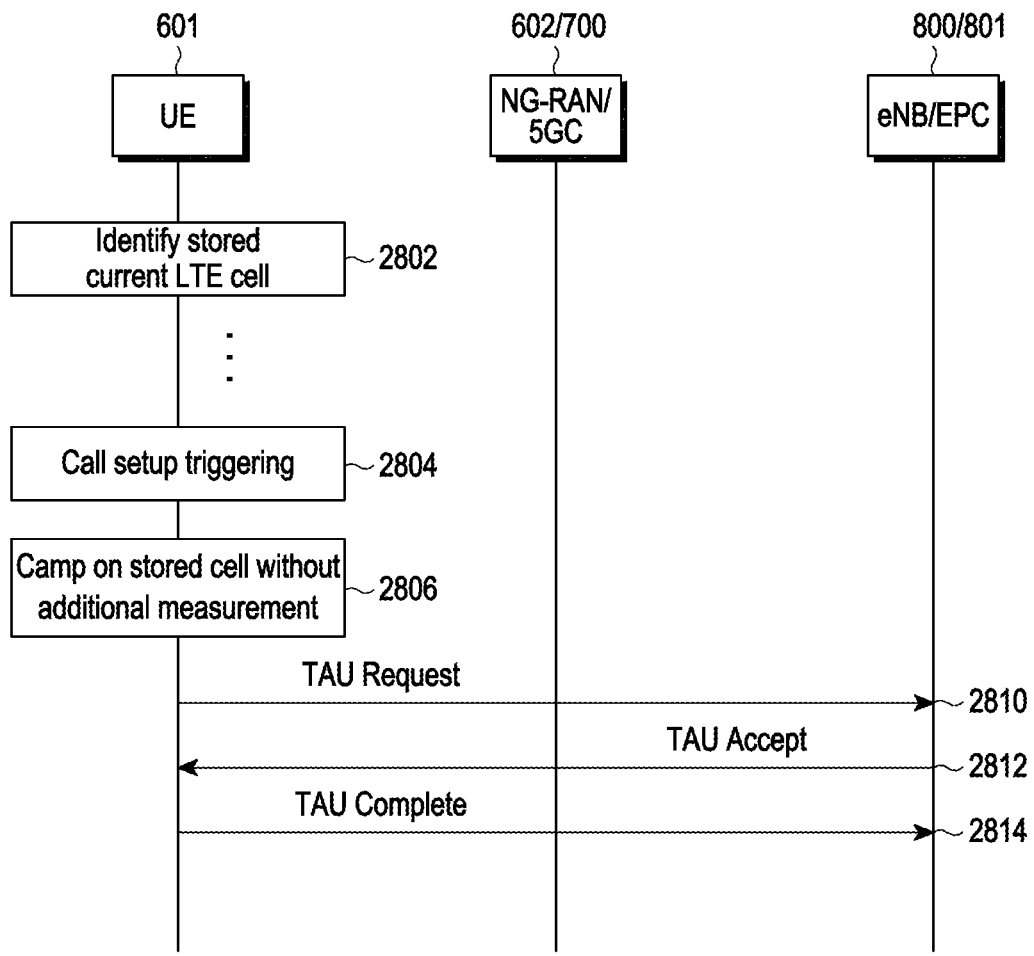
FIG. 28 is a signal flow diagram illustrating example call connection operations according to various embodiments.

FIG. 28 is a signal flow diagram illustrating example call connection operations according to various embodiments. Referring to FIG. 28, in operation 2802, the UE 601 may identify the stored, current LTE cell as described above in FIG. 25. According to various embodiments, if a call setup is triggered in the UE 601 in operation 2804 before the running timer expires, it may camp on the stored LTE cell without an additional measurement process in operation 2806. For example, the UE 601 may perform a tracking area update (TAU) procedure with the LTE communication network (e.g., the eNB 800/EPC 801). For example, the UE 601 may transmit a TAU request to the LTE communication network in operation 2810 and, in operation 2812, may receive a TAU accept from the LTE communication network. The UE 601 may receive the TAU accept and, in operation 2814, may complete the inter-RAT handover process for EPS fallback by transmitting a TAU complete to the LTE communication network.

According to various embodiments, as compared with the operations of FIG. 26 or 27, in the LTE camp-on operations according to the method of FIG. 28, the LTE cell to be camped on is specified, so that it is possible to quickly camp on the LTE communication network simultaneously with call setup start without a separate scan process on another band or cell.

According to any one of various example embodiments, an electronic device (e.g., the electronic device 101 or the UE 601) may comprise: a memory (e.g., the memory 130), at least one antenna module (e.g., the antenna module 197, the first antenna module 242, the second antenna module 244, or the third antenna module 246) comprising at least one antenna, and at least one communication processor (e.g., the auxiliary processor 123, the wireless communication module 192, the first communication processor 212, the second communication processor 214, or the integrated communication processor 260) configured to: communicate with a first communication network (e.g., the second cellular network 294 or the first communication network 410), a second communication network (e.g., the first cellular network 262 or the second communication network 420), and an IP multimedia subsystem (IMS) network (e.g., the IMS network 430 or the IMS network 609), through the at least one antenna module. The at least one communication processor may be configured to: control the electronic device to perform a call by voice communication connection through the second communication network, in response to receiving of a first call request, based on identifying that the call is disconnected, identify information related to a call disconnected cause, based on identifying that the identified information related to the call disconnected cause corresponds to a designated condition, start a timer for deferring connection to the first communication network, and in response to receiving a second call request before the timer expires, control the electronic device to perform a voice communication connection through the second communication network currently connected the electronic device.

According to various example embodiments, the first communication network may be a 5G communication network, and the second communication network may be a long term evolution (LTE) communication network.

According to various example embodiments, the at least one communication processor may be configured to: based on identifying that the voice communication connection through the 5G communication network fails, control the electronic device to perform an evolved packet system (EPS) fallback procedure to the LTE communication network.

According to various example embodiments, the at least one communication processor may be configured to: based on identifying that a message indicating redirection or handover from the second communication network to the first communication network is received before the timer expires, control the electronic device to return to the first communication network.

According to various example embodiments, the at least one communication processor may be configured to: based on identifying that a triggering signal of an application corresponding to the first communication network is received before the timer expires, control the electronic device to return to the first communication network.

According to various example embodiments, the at least one communication processor may be configured to: based on identifying that a second cell of the first network, different from a previously connected first cell of the first communication network is discovered before the timer expires, control the electronic device to return to the first communication network based on the discovered second cell.

According to various example embodiments, the at least one communication processor may be configured to: based on identifying that the identified information related to the call disconnected cause corresponds to an abnormal end, start the timer for deferring the connection to the first communication network.

According to various example embodiments, the at least one communication processor may be configured to: based on identifying that the identified information related to the call disconnected cause corresponds to a time-out of a real-time transport protocol (RTP), start the timer for deferring the connection to the first communication network.

According to various example embodiments, the at least one communication processor may be configured to: based on identifying that the identified information related to the call disconnected cause corresponds to session expiration, start the timer for deferring the connection to the first communication network.

According to any one of various example embodiments, an electronic device may comprise: a memory, at least one antenna module comprising at least one antenna, and at least one communication processor configured to communicate with a first communication network, a second communication network, and an IP multimedia subsystem (IMS) network, through the at least one antenna module. The at least one communication processor may be configured to: control the electronic device to perform a call by voice communication connection through the second communication network, in response to receiving a first call request, based on identifying that the call is disconnected, start a first timer and store information for a cell of the second communication network, as first cell information, in the memory, in response to a disconnection of the call, connect to the first communication network, and based on identifying that a second call request is received before the first timer expires, control the electronic device to perform connection with the second communication network based on the first cell information stored in the memory.

According to any one of various example embodiments, a method for processing a call request by an electronic device may comprise: performing a call by voice communication connection through a second communication network, in response to receiving a first call request, based on identifying that the call is disconnected, identifying information related to a call disconnected cause, based on identifying that the identified information related to the call disconnected cause corresponds to a designated condition, starting a timer for deferring connection to a first communication network, and based on a second call request being received before the timer expires, performing voice communication connection through the currently connected second communication network.

According to various example embodiments, the first communication network may be a 5G communication network, and the second communication network may be a long term evolution (LTE) communication network.

According to various example embodiments, the method may further comprise: based on identifying that the voice communication connection through the 5G communication network fails, performing an evolved packet system (EPS) fallback procedure to the LTE communication network.

According to various example embodiments, the method may further comprise: based on identifying that a message indicating redirection or handover from the second communication network to the first communication network is received before the timer expires, returning to the first communication network.

According to various example embodiments, the method may further comprise: based on identifying that a triggering signal of an application corresponding to the first communication network is received before the timer expires, returning to the first communication network.

According to various example embodiments, the method may further comprise: based on identifying that a second cell of the first network, different from a previously connected first cell of the first communication network is discovered before the timer expires, returning to the first communication network based on the discovered second cell.

According to various example embodiments, the method may further comprise: based on identifying that the identified information related to the call disconnected cause corresponds to an abnormal end, starting the timer for deferring the connection to the first communication network.

According to various example embodiments, the method may further comprise: based on identifying that the identified information related to the call disconnected cause corresponds to a time-out of a real-time transport protocol (RTP), starting the timer for deferring the connection to the first communication network.

According to various example embodiments, the method may further comprise: based on identifying that the identified information related to the call disconnected cause corresponds to session expiration, starting the timer for deferring the connection to the first communication network.

According to any one of various example embodiments, a method for processing a call request by an electronic device may comprise: performing a call by a voice communication connection through a second communication network, in response to receiving a first call, based on identifying that the call is disconnected, starting a first timer, storing information for a cell of the second communication network, as first cell information, in the memory, connecting to the first communication network, in response to a disconnection of the call, and based on identifying that a second call request is received before the first timer expires, performing connection with a second communication network based on the first cell information stored in the memory.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising,
a memory;
at least one antenna module comprising at least one antenna; and
at least one communication processor configured to communicate with a first communication network, a second communication network, and an IP multimedia subsystem (IMS) network, through the at least one antenna module,
wherein the at least one communication processor is configured to:
in response to receiving a first call request, control the electronic device to perform a call by voice communication connection through the second communication network,
based on identifying that the call is disconnected, identify information related to a call disconnected cause,
based on identifying that the identified information related to the call disconnected cause corresponds to a designated condition, start a timer for deferring connection to the first communication network,
in response to receiving a second call request before the timer expires, control the electronic device to perform a voice communication connection through the second communication network currently connected the electronic device, and
based on identifying that a message indicating redirection and/or handover from the second communication network to the first communication network is received before the timer expires, control the electronic device to return to the first communication network.

2. The electronic device of claim 1, wherein the first communication network comprises a 5G communication network, and the second communication network comprises a long term evolution (LTE) communication network.

3. The electronic device of claim 2, wherein the at least one communication processor is configured to:
based on identifying that the voice communication connection through the 5G communication network fails, control the electronic device to perform an evolved packet system (EPS) fallback to the LTE communication network.

4. The electronic device of claim 1, wherein the at least one communication processor is configured to:
based on identifying that a triggering signal of an application corresponding to the first communication network is received before the timer expires, control the electronic device to return to the first communication network.

5. The electronic device of claim 1, wherein the at least one communication processor is configured to:
based on identifying that a second cell of the first network, different from a previously connected first cell of the first communication network is discovered before the timer expires, control the electronic device to return to the first communication network based on the discovered second cell.

6. The electronic device of claim 1, wherein the at least one communication processor is configured to:

based on identifying that the identified information related to the call disconnected cause corresponds to an abnormal end, start the timer for deferring the connection to the first communication network.

7. The electronic device of claim 1, wherein the at least one communication processor is configured to:
based on identifying that the identified information related to the call disconnected cause corresponds to a time-out of a real-time transport protocol (RTP), start the timer for deferring the connection to the first communication network.

8. The electronic device of claim 1, wherein the at least one communication processor is configured to:
based on identifying that the identified information related to the call disconnected cause corresponds to session expiration, start the timer for deferring the connection to the first communication network.

9. An electronic device, comprising,
a memory;
at least one antenna module comprising at least one antenna; and
at least one communication processor configured to communicate with a first communication network, a second communication network, and an IP multimedia subsystem (IMS) network, through the at least one antenna module,
wherein the at least one communication processor is configured to:
in receiving a first call request, control the electronic device to perform a call by voice communication connection through the second communication network,
based on identifying that the call is disconnected, start a first timer associated with returning to the second communication network from the first communication network and store information for a cell of the second communication network, as first cell information, in the memory, and
connect to the first communication network,
based on identifying that a second call request is received before the first timer expires, control the electronic device to perform connection with the second communication network based on the first cell information stored in the memory, and
based on identifying that a triggering signal of an application corresponding to the first communication network is received before the timer expires, control the electronic device to initialize the first timer and the stored first cell information and maintain the connection to the first communication network.

10. The electronic device of claim 9, wherein the first communication network comprises a 5G communication network, and the second communication network comprises a long term evolution (LTE) communication network.

11. A method for processing a call request by an electronic device, the method comprising:

in response to receiving a first call request, performing a call by voice communication connection through a second communication network;
based on identifying that the call is disconnected, identifying information related to a call disconnected cause;
based on identifying that the identified information related to the call disconnected cause corresponds to a designated condition, starting a timer for deferring connection to a first communication network;
based on identifying that a second call request is received before the timer expires, performing voice communication connection through the currently connected second communication network; and
based on identifying that a message indicating redirection and/or handover from the second communication network to the first communication network is received before the timer expires, returning to the first communication network.

12. The method of claim 11, wherein the first communication network comprises a 5G communication network, and the second communication network comprises a long term evolution (LTE) communication network.

13. The method of claim 12, further comprising,
based on identifying that the voice communication connection through the 5G communication network fails, performing an evolved packet system (EPS) fallback procedure to the LTE communication network.

14. The method of claim 11, further comprising,
based on identifying that a triggering signal of an application corresponding to the first communication network is received before the timer expires, returning to the first communication network.

15. The method of claim 11, further comprising,
based on identifying that a second cell of the first network, different from a previously connected first cell of the first communication network is discovered before the timer expires, returning to the first communication network based on the discovered second cell.

16. The method of claim 11, further comprising,
based on identifying that the identified information related to the call disconnected cause corresponds to an abnormal end, starting the timer for deferring the connection to the first communication network.

17. The method of claim 11, further comprising,
based on identifying that the identified information related to the call disconnected cause corresponds to a time-out of a real-time transport protocol (RTP), starting the timer for deferring the connection to the first communication network.

18. The method of claim 11, further comprising,
based on identifying that the identified information related to the call disconnected cause corresponds to session expiration, starting the timer for deferring the connection to the first communication network.

* * * * *